TELEGRAPH STORAGE SYSTEM

Filed May 17, 1946 24 Sheets-Sheet 1

INVENTOR
G. A. LOCKE
BY J W Schmied
ATTORNEY

Oct. 2, 1951 G. A. LOCKE 2,569,478

TELEGRAPH STORAGE SYSTEM

Filed May 17, 1946 24 Sheets-Sheet 2

INVENTOR
G. A. LOCKE
BY J W Schmied
ATTORNEY

TELEGRAPH STORAGE SYSTEM

Filed May 17, 1946 24 Sheets-Sheet 3

INVENTOR
G. A. LOCKE
BY
J W Schmied
ATTORNEY

Oct. 2, 1951 G. A. LOCKE 2,569,478

TELEGRAPH STORAGE SYSTEM

Filed May 17, 1946 24 Sheets-Sheet 4

INVENTOR
G. A. LOCKE
BY: J W Schmied
ATTORNEY

INVENTOR
G. A. LOCKE
BY J. W. Schmied
ATTORNEY

TELEGRAPH STORAGE SYSTEM

Filed May 17, 1946 24 Sheets-Sheet 6

INVENTOR
G. A. LOCKE
BY: J. W. Schmied
ATTORNEY

Oct. 2, 1951 G. A. LOCKE 2,569,478

TELEGRAPH STORAGE SYSTEM

Filed May 17, 1946 24 Sheets-Sheet 7

INVENTOR
G. A. LOCKE
BY J. W. Schmied
ATTORNEY

INVENTOR
G.A.LOCKE
BY J.W. Schmied
ATTORNEY

Oct. 2, 1951 G. A. LOCKE 2,569,478

TELEGRAPH STORAGE SYSTEM

Filed May 17, 1946 24 Sheets-Sheet 9

INVENTOR
G.A. LOCKE
BY J W Schmied
ATTORNEY

Oct. 2, 1951 G. A. LOCKE 2,569,478

TELEGRAPH STORAGE SYSTEM

Filed May 17, 1946 24 Sheets-Sheet 10

G. A. LOCKE

J. W. Schmied

Oct. 2, 1951 G. A. LOCKE 2,569,478

TELEGRAPH STORAGE SYSTEM

Filed May 17, 1946 24 Sheets-Sheet 11

INVENTOR
G. A. LOCKE
BY J. W. Schmied
ATTORNEY

INVENTOR
G. A. LOCKE
BY: J W Schmied
ATTORNEY

TELEGRAPH STORAGE SYSTEM

Filed May 17, 1946 24 Sheets-Sheet 13

INVENTOR
G. A. LOCKE
BY: J W Schmied
ATTORNEY

INVENTOR
G. A. LOCKE
BY: J. W. Schmied
ATTORNEY

Oct. 2, 1951 G. A. LOCKE 2,569,478

TELEGRAPH STORAGE SYSTEM

Filed May 17, 1946 24 Sheets-Sheet 15

INVENTOR
G. A. LOCKE
BY: J W Schmied
ATTORNEY

TELEGRAPH STORAGE SYSTEM

Filed May 17, 1946 24 Sheets-Sheet 16

INVENTOR
G. A. LOCKE
BY: J. W. Schmied
ATTORNEY

CODE RELAYS

INVENTOR
G. A. LOCKE
BY: G. W. Schmied
ATTORNEY

TELEGRAPH STORAGE SYSTEM

Filed May 17, 1946 24 Sheets-Sheet 18

INVENTOR
G. A. LOCKE
BY: J. W. Schmied
ATTORNEY

Oct. 2, 1951 G. A. LOCKE 2,569,478

TELEGRAPH STORAGE SYSTEM

Filed May 17, 1946 24 Sheets-Sheet 19

INVENTOR
G.A. LOCKE
BY J W Schmied
ATTORNEY

INVENTOR
G.A.LOCKE
BY: J W Schmied
ATTORNEY

INVENTOR
G. A. LOCKE
BY: J W Schmied
ATTORNEY

INVENTOR
G. A. LOCKE
BY: J W Schmied
ATTORNEY

Oct. 2, 1951 G. A. LOCKE 2,569,478

TELEGRAPH STORAGE SYSTEM

Filed May 17, 1946 24 Sheets-Sheet 23

FIG. 27. SWITCHING CENTER

INVENTOR
G. A. LOCKE
BY J. W. Schmied
ATTORNEY

OUTLYING STATIONS

INVENTOR
G. A. LOCKE
BY J W Schmied
ATTORNEY

Patented Oct. 2, 1951

2,569,478

UNITED STATES PATENT OFFICE 2,569,478

TELEGRAPH STORAGE SYSTEM

George A. Locke, Glenwood Landing, N. Y., assignor to Bell Telephone Laboratories, Incorporated, New York, N. Y., a corporation of New York Application May 17, 1946, Serial No. 670,355

21 Claims. (Cl. 178—3)

This invention relates to telegraph exchange systems and particularly to the type of exchange system which uses a so-called manual tape relay office.

A system of this type comprises a plurality of outlying stations each having lines or transmission channels terminating in a central switching station or message center. The message center is of the type in which records of incoming messages are torn or cut off at the receiving recorder and are inserted in a transmitting machine for retransmission to the addressed station or stations. Thus the messages are exchanged between the stations by actuating transmitters by tapes, usually on the basis of one piece of tape per message.

The invention has the following main objects:

To provide a telegraph exchange system adapted for sending individual messages to a single station or for broadcasting them simultaneously to a plurality of stations, in which system various ancillary functions, usually desired in telegraph systems for more efficient operation, may readily be incorporated;

To provide a system of this kind in which messages whether single or multiple addressed may or may not be preceded by channel identification and message numbering in accordance with requirements in each case;

To provide a system of this type in which all lines may be operated on the full-duplex basis and some of the lines may readily be conditioned for operation on the half-duplex basis;

To provide a system of this type which is adapted for monitoring of messages on all lines at a service board common to all lines of a central station.

In accordance with the invention the telegraph system comprises a central message transferring or switching station and a plurality of outlying stations, each connected to the switching station over a suitable channel of transmission.

Each outlying station is equipped with a perforator for recording outgoing messages on a tape and with a transmitter-distributor for transmitting the outgoing message to the switching center. The message may be addressed to one station or to a plurality of stations and is transmitted to the switching center for retransmission at the center to the addressed station or stations. The outlying station also includes a typing reperforator for recording of messages incoming to the station from the switching center.

At the switching center the line or channel from each outlying station is terminated in a line circuit.

Each such terminal or line circuit includes a receiving typing reperforator for the recording of messages incoming from the outlying station. Each line circuit also includes a transmitter distributor in which a message tape may be inserted for retransmission of the message to the outlying station.

The tape produced by the receiving reperforator at the switching center in accordance with a particular message will be torn or cut off by the attendant at the end of the message and brought to and inserted in the transmitter for the addressed station for retransmission.

The switching center includes a plurality of broadcasting transmitter-distributors for broadcasting the received messages addressed to a plurality of outlying stations. The number of broadcast levels is determined by traffic requirements. Each broadcast transmitter-distributor is connected to all the line circuits in the switching center through suitable cross-connection circuits at which the addressed stations may be manually selected. Thus a message tape, received at the center from any one of the outlying stations and in which the message proper is preceded by the addresses of two or more outlying stations, will be inserted in the transmitter-distributor of an idle broadcast level for simultaneous retransmission to all the addressed stations that are idle at the time of starting.

The word "broadcasting" is loosely used herein with reference to transmission of a message to a plurality of receiving stations or over a plurality of outgoing lines. In a strict sense, this term applies more properly to transmission of a message to all stations available to a particular transmitting station. As used herein, however, the term is applicable to any transmission over any plural number of lines and, to a certain extent, is applicable to transmission from one of those transmitters designated as "broadcasting" transmitters over a single line.

In systems wherein so-called message number transmitters are utilized to transmit ahead of or accompanying each message, certain information comprising identification of the sending station, identification of the transmission channel employed, or identification of the consecutive ordinal of a message, or of two or more kinds of such information with or without other service information, it is often desirable or necessary, in transmitting messages over a plurality of lines, to transmit service codes over the various lines over which the multiple transmission occurs which differ in information content with respect to the various lines. Unless all the service transmitters are carefully synchronized the possibility arises that they may finish their respective cycles of service information transmission in different times. This circumstance is true in the general case but is peculiarly true in the case of the exemplary system herein disclosed because part of the service transmission accompanying each message may include a group of identical code combinations, specifically, and in the present case, spacing code combinations, the number of which is determined by a timing device. In the present case these timing devices are discharge tubes having associated therewith condenser-resistance arrangements for determining the timing, and, consequently, the number of consecutive identical code combinations, and it is known that such timing devices do not time in an accurate manner. For this reason, in addition to other factors of variability, the service transmission cycles will be completed in different times. The exemplary system disclosed provides, in the case of a multiple address message, a conditioning circuit which withholds transmission from the multiple address transmitter until each service transmitter associated with the multiple address transmitter for the particular message has completed its cycle. This withholding circuit is conditioned by each service transmitter as it completes its cycle. Each condition thus established remains fixed until finally the conditioning circuit is conditioned by all of the service transmitters associated with the particular transmission whereupon transmission from the message transmitter may begin. In the exemplary embodiment this conditioning circuit remains fixed throughout the message transmission. From a theoretical standpoint it is only necessary that all these conditions when once established remain fixed until the last condition has been applied and the message transmitter has entered upon its transmitting function; from a practical standpoint, however, it is simpler for the condition to remain fixed throughout the transmission of the message.

In accordance with the invention the system is arranged for operation with the standard five-unit start-stop code, but the principles may be employed in a system operating with a start-stop code with more or less than five selecting units.

Each line circuit may be operated on a full-duplex basis but any number of line circuits may be equipped so that they may readily be converted for operation on a half-duplex basis.

Features of the invention include:

Apparatus for and methods of numbering messages in consecutive order;

Apparatus for and methods of transmitting messages at will with code combinations representing consecutive numbers, repeated numbers or no numbers;

Apparatus for and methods of automatically transmitting at the head end of message material codes which may perform the double purpose of spacing tape out of a distant receiving machine or furnishing non-intelligence codes which may be garbled without loss of significant message codes in case of interfering transmission;

Apparatus for and methods of transmitting at the leading or trailing end of message material a sufficient number of non-intelligence codes, such as letters codes for the various purposes of spacing tape out of a receiving reperforator, supplying adequate tape for tearing or cutting, and supplying adequate tape impressed with non-intelligence signals to properly space tape from receiving machines on other lines upon retransmission of individual messages recorded in pieces of tape;

Apparatus for and methods of transmitting messages over half-duplex lines by automatic transmitters with less risk or loss of message material than heretobefore due to sending against break signals or interfering transmission, or sending over grounded or interrupted lines;

Improved methods of and apparatus for multiply transmitting the same message over a plurality of lines or channels some of which may be duplex and some half-duplex;

Improved methods and apparatus for preventing loss of line time in systems for multiply transmitting the same message material over several lines;

Improved methods and apparatus for preliminarily associating multiple address transmitters with a plurality of lines regardless of their idle or busy condition and disassociating such of said lines which do not become idle and available for use of said multiple address transmitters in a measured time;

Improved apparatus for and methods of giving multiple address transmitters access to a line with preference over transmitters individual to the line upon selective operation of the necessary instruments for associating said multiple address transmitters with a plurality of lines selectively;

Improved apparatus for and methods of supervising a plurality of lines controlled by automatic transmitters at a service board;

Improved apparatus for and methods of seizing any one or more of a series of automatic machine controlled telegraph transmission circuits for connection to supervisory or service board transmitters or receivers;

Improved apparatus for and methods of preventing loss or garbling of messages by interfering break signals or other transmission or the occurrence of open lines or line hits; and Improved apparatus for and methods of indicating the necessity of inspecting tapes or equivalent message storage records for retransmission in the case of interruption of transmission by interfering break signals or similar conditions.

The invention will now be described more in detail as applied to a telegraph system of the type outlined above and as represented in an exemplary preferred embodiment in accordance with the illustrations in the attached drawings. However, the invention involves a number of principles and features of which the exemplary embodiment illustrated is a specific example.

In the attached drawings:

Figs. 17 to 20 show the equipment at a typical outlying station and should be arranged side by side as shown diagrammatically in Fig. 21;

Figure 27:
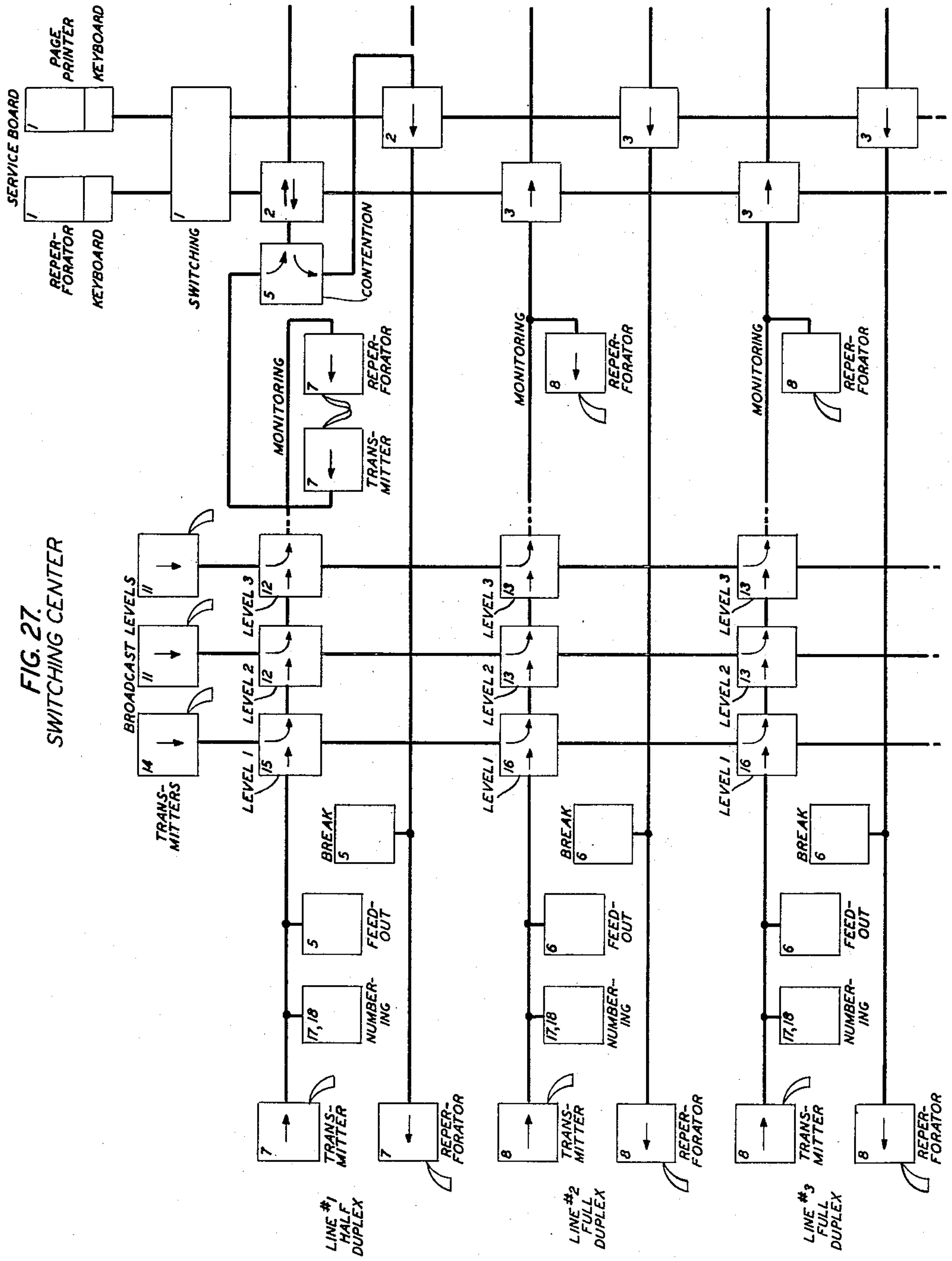
Figs. 27 and 28 show a block diagram of the main elements included in typical portions of the entire system; these figures should be arranged side by side as indicated in Fig. 29.
Figure 28:
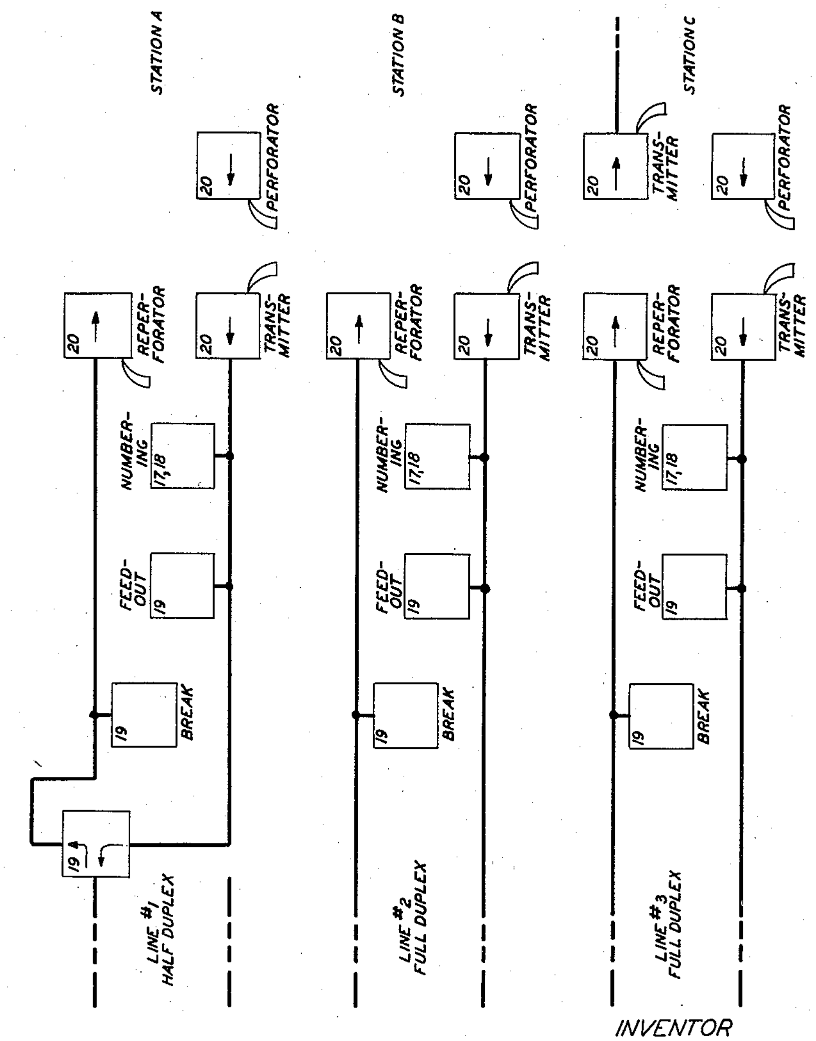

To first give a comprehensive picture of the entire system reference will now be made to Figs. 27 and 28 as arranged in Fig. 29. In these figures, the terminal equipment at the switching center for three outlying stations is shown in Fig. 27 and the corresponding three outlying stations are shown in Fig. 28. Station A is shown arranged for half-duplex operation and is connected over line #1 to its line equipment at the switching center. Stations B and C are arranged for full-duplex operation and are connected over lines #2 and 3 to their respective terminal equipments at the switching center. The principal portions of the circuit are shown in blocks with abbreviated titles. The numbers within each block refer to figure numbers in the detailed circuit drawings, Figs. 1 to 20, in which the same or similar circuits are shown in detail.

The lines indicated as leading from the outlying stations A, B and C to the switching center in Fig. 27 are merely representative of transmission channels of any desired kind, for example, metallic circuits, superimposed circuits, carrier channels, radio links. Each channel will include two parallel transmission paths. Thus for full-duplex operation both of these will be used, one for transmission in one direction, and the other for transmission in the opposite direction. For half-duplex operation either path may be used for transmission alternately in opposite directions.

Station A is equipped with a perforator, marked 20, for recording of the original message on a tape, with a transmitter, marked 20, for transmission of the message to the switching center over the sending side of the station circuit, and with a typing reperforator, marked 20, for reception of an incoming message from the switching center over the receiving side of the station circuit. A numbering circuit, marked 17 and 18, is associated with the sending side of the circuit for transmission of channel identification and message number ahead of the outgoing message. A feedout circuit 19 is provided to control tape feedout at the end of each message, to clear the end of the message so that it can be torn off at the distant receiving machine. A break circuit 19 is associated with the receiving side of the circuit. The sending and receiving sides of the station circuit are combined for transmission over the upper side of line #1.

At the switching center a message from station A arrives in the line #1 terminal equipment and passes through the contention circuit, marked 5, to the lower receiving circuit, which includes a break circuit 5 and the recording reperforator 7 for recording the incoming message from station A. A message to station A would be transmitted by the transmitter marked 7 over the upper side of the line #1 terminal equipment. This sending circuit includes a numbering circuit 17, 18 similar to that at station A, and a feedout circuit 5 for control of tape feedout signals at the end of the message to provide additional tape at the distant receiving machine after the message. In the particular case of a half-duplex line, such as line #1, the message passes through a monitoring equipment and is recorded on reperforator 7 for retransmission by transmitter 7 in the monitoring equipment. From the transmitter 7 the message passes through the contention circuit 5 into the half-duplex line circuit to station A. The main object of retransmitting the message by the monitoring equipment is to provide for storing of the message in the case of an incoming message arriving over the half-duplex line while transmitter 7 of line #1 is in the course of transmitting a message to station A; in such case the reperforator 7 will continue operating over the local or room circuit and store the message in the monitoring equipment while the incoming message from station A passes through the contention circuit to the receiving reperforator 7 of line #1. Similarly, if a broadcast transmitter is in the course of transmitting a message to station A, that message will also be stored in the monitoring equipment, if station A should start transmitting a message or send a break signal while the broadcasting is in progress; when the incoming message has been completed, the stored outgoing message will be continued.

The full-duplex station B is equipped the same as station A, but the sending side is directly connected over one side of the line or channel to the receiving side of line #2 at the switching center, and the receiving side of station B is directly connected over the other side of the line to the transmitting equipment of line #2 at the switching center. Thus messages may travel simultaneously in both directions between station B and its line equipment at the switching center without interference. For this reason the monitoring equipment at the switching center for line #2 merely serves to produce a home record of outgoing messages for station B and no contention circuit is provided at the switching center. In all other respects line #2 includes the same main circuit elements as line #1.

Full-duplex station C and its terminal equipment at the switching center are the same as in the case of station B. However station C is shown as an example of an outlying station at which a message received on the reperforator 20 may be retransmitted by insertion of the message tape in another transmitter connected over a suitable outgoing line to another distant station. It is obvious that station C may have one or more such transmitters to other outlying stations for retransmission to any one of them and that station C may also be a tape relay office. These transmitters have not been shown in the detailed circuit arrangement, inasmuch as their details form no part of the invention and they may be of any suitable well-known type. Thus messages incoming to station C may be directed to station C or to any one of the outlying stations associated with station C. It is further obvious that station C may include machines for receiving messages from such distant stations over suitable line circuits for retransmission by station C in the same manner as a message originating at station C.

It may be noted at this time that the half-duplex station A is arranged with cross-connecting blocks at which by simple changes in the connections the station may be converted for full-duplex operation; this is shown in the detailed circuits. Similarly, line #1 includes a transfer circuit at the switching center, omitted from Fig. 27 for the sake of clarity, in which the operation of a transfer key will convert the circuit to operation on a full-duplex basis, the circuit after such conversion being similar to that of the full-duplex line #2.

In Fig. 27 three broadcast levels are indicated at the switching center; additional levels may be provided in accordance with requirements. Thus level *l* includes a transmitter 14 connected over the cross-connection point 15 to line #1 and over the cross-connection point 16 to line #2 and over similar cross-connection points 16 to line #3 and any other lines. Thus a tape produced in accordance with incoming messages by any of the reperforators 7 or 8 may be torn off and inserted in the transmitter 14 for the transmission simultaneously to any or all of the addressed stations. The arrangement is such that two or more transmissions of multiple address messages may take place at the same time, but of course to two different groups of stations, a busy station being automatically excluded from a multiple address group at the time of starting. During a multiple address transmission, for example, over line #1 to station A, the transmitter 7 in line #1 is automatically prevented from operating.

Fig. 27 also shows a service or supervisory board at the switching center, which includes two supervising machines, each of which is adapted for recording messages and for transmitting messages. One machine, marked 1, is normally connected for supervision over the service position 2 of line #1 and over service position 3 of lines #2, 3 and any others, and the other machine is normally connected for supervision over the service position 2 of line #1 and service position 3 of lines #2, 3 and any others. Thus one machine is normally associated with the sending side of all full-duplex lines and the other machine with the receiving side of all full-duplex lines; at a half-duplex line, such as line #1, a somewhat analogous arrangement is provided, the details of which will appear from the following detailed description.

Each of the service board machines have transmitter contacts operated by a keyboard. One machine has a receiving reperforator which produces a record on tape, the other machine is a page printer. By means of the switching circuit 1 the two machines may be switched relative to the sending and receiving sides of the lines.

*Outlying station*

Figures 1, 21, 22, 29:
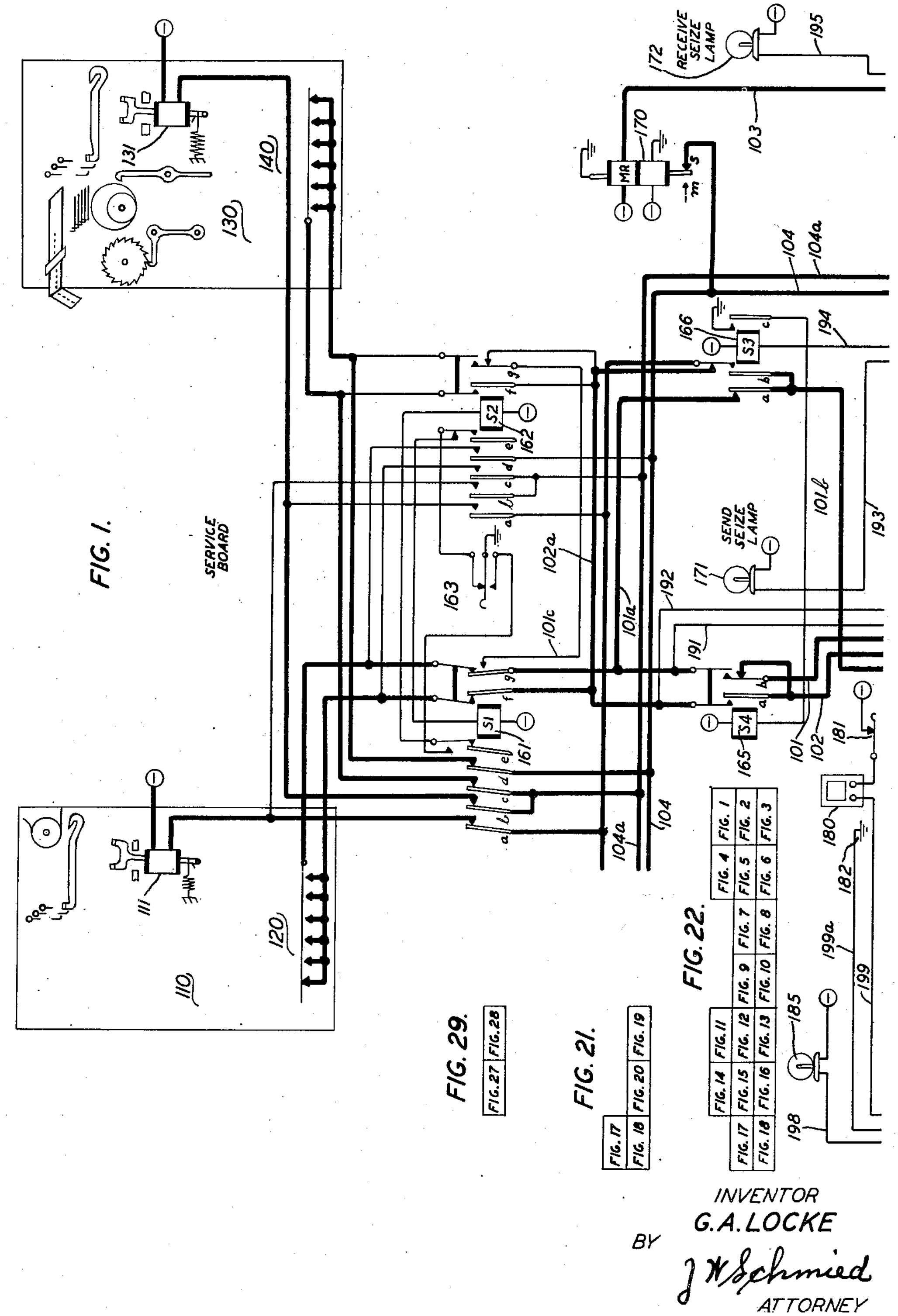
Figs. 1 to 18 show typical portions of the equipment at the switching center; these figures should be arranged side by side in the manner shown diagrammatically in Fig. 22.

In the following description of the circuit operation and equipment at an outlying station reference will be made to Figs. 17, 18, 19 and 20, arranged as indicated in Fig. 21. The circuits are shown in detail in these drawings and reference will also be made to Figs. 23 and 24 which show the transmission circuits of an outlying station in a more simplified form.

The outlying station includes a keyboard perforator 2030 in which an original message is manually recorded on a tape. After the message has been completely recorded, the tape is torn off and the leading end is inserted in the sending machine, which includes the tape transmitter 2040 and the distributor 2050, for transmission over the line or loop to the switching center.

The outlying station also includes a receiving-typing reperforator 2060 which responds to incoming signals for recording of messages on a tape. This enables the station to retransmit the message over a separate line or system to another distant station. If the station is not equipped for such retransmission the receiving machine 2060 may be a page printer.

Figure 17:
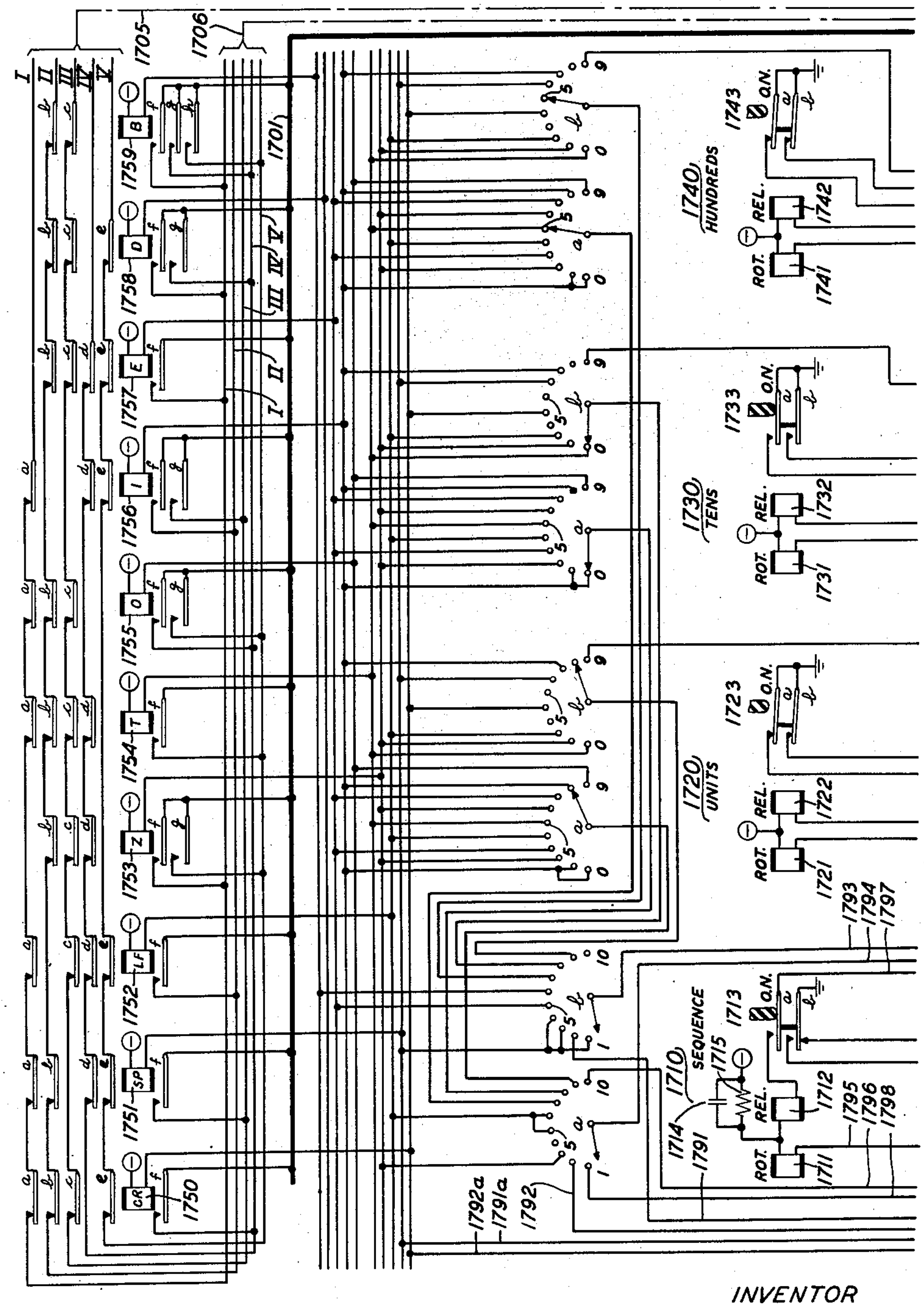
Figure 18:
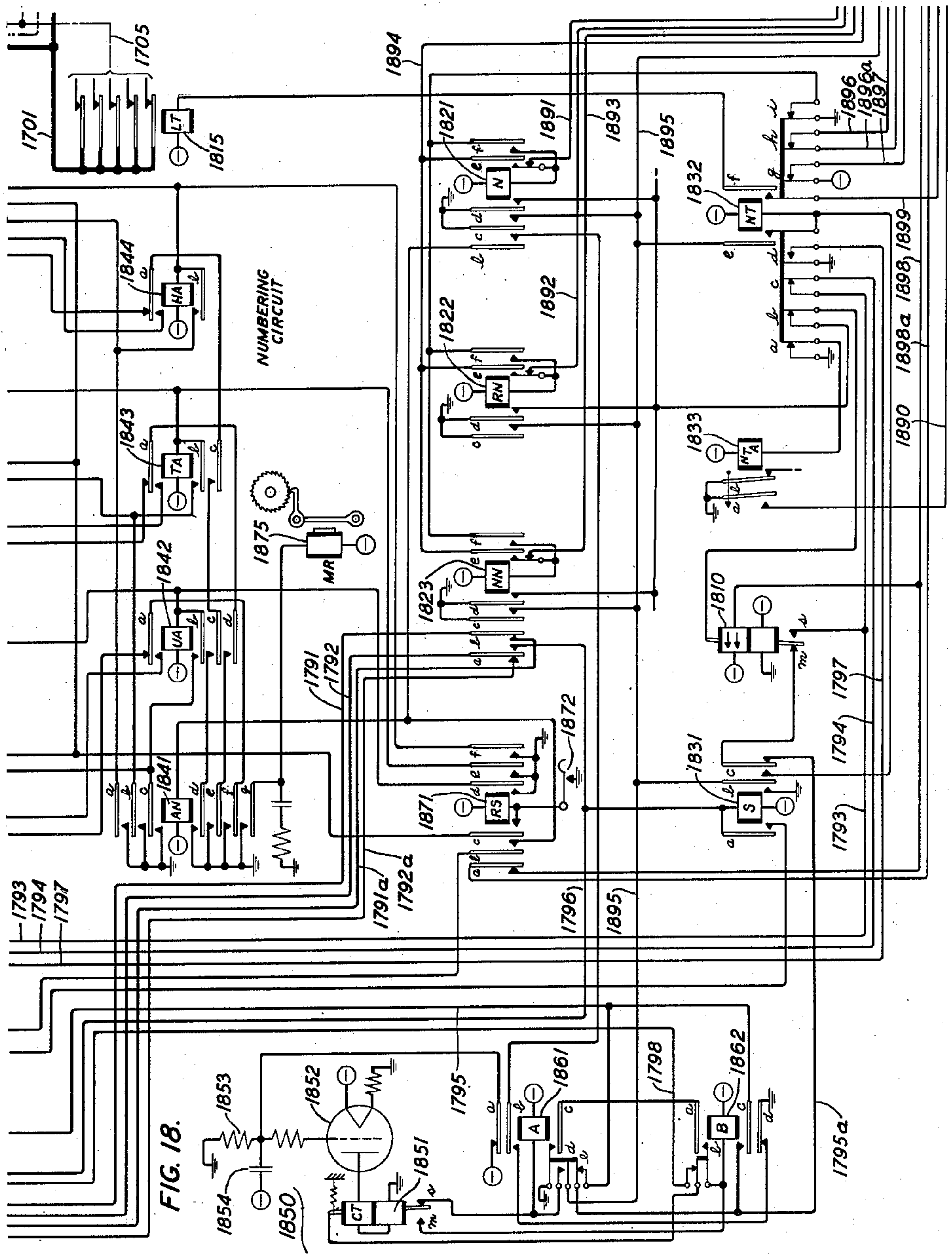
Figure 19:
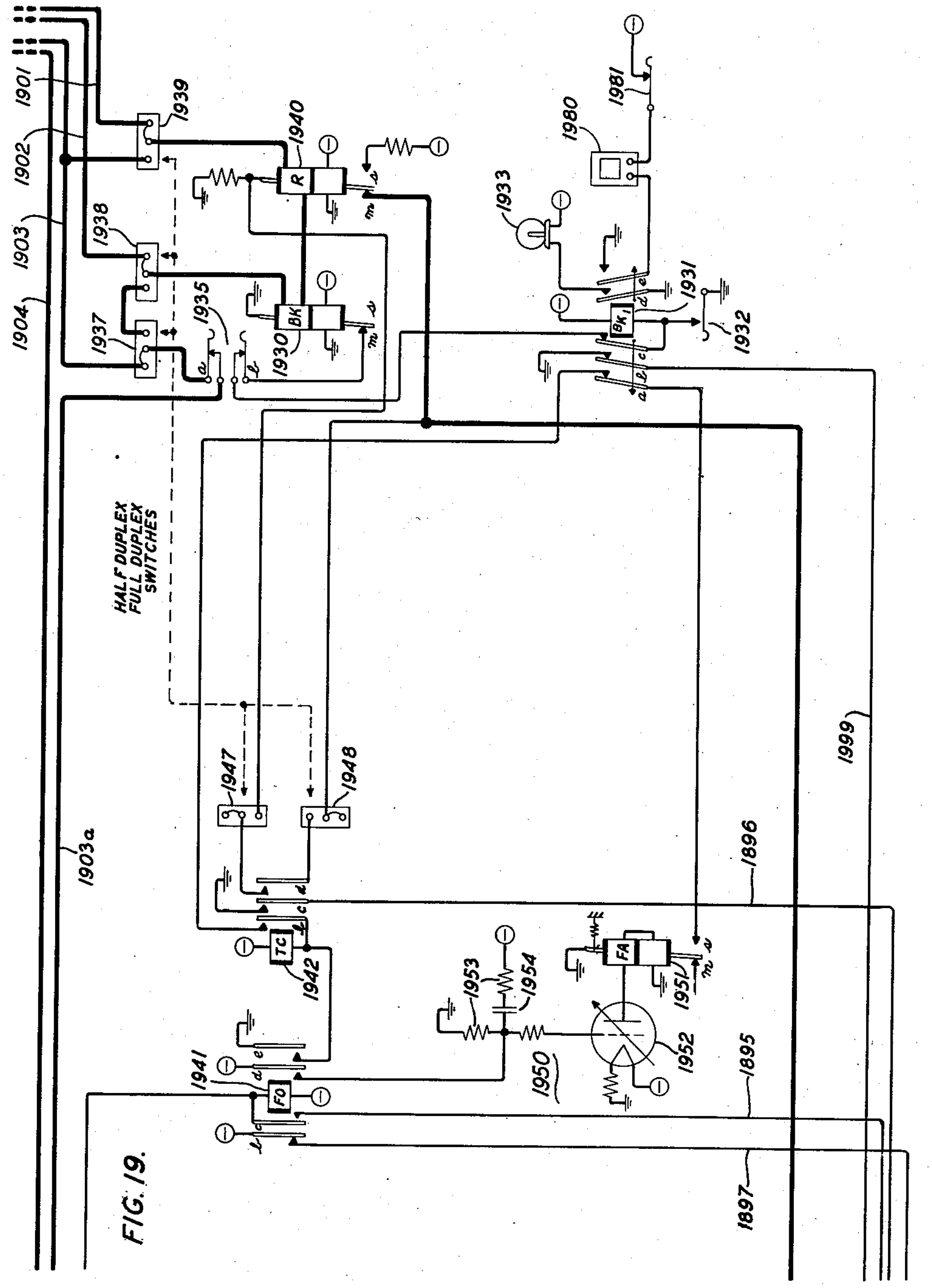
Figure 20:
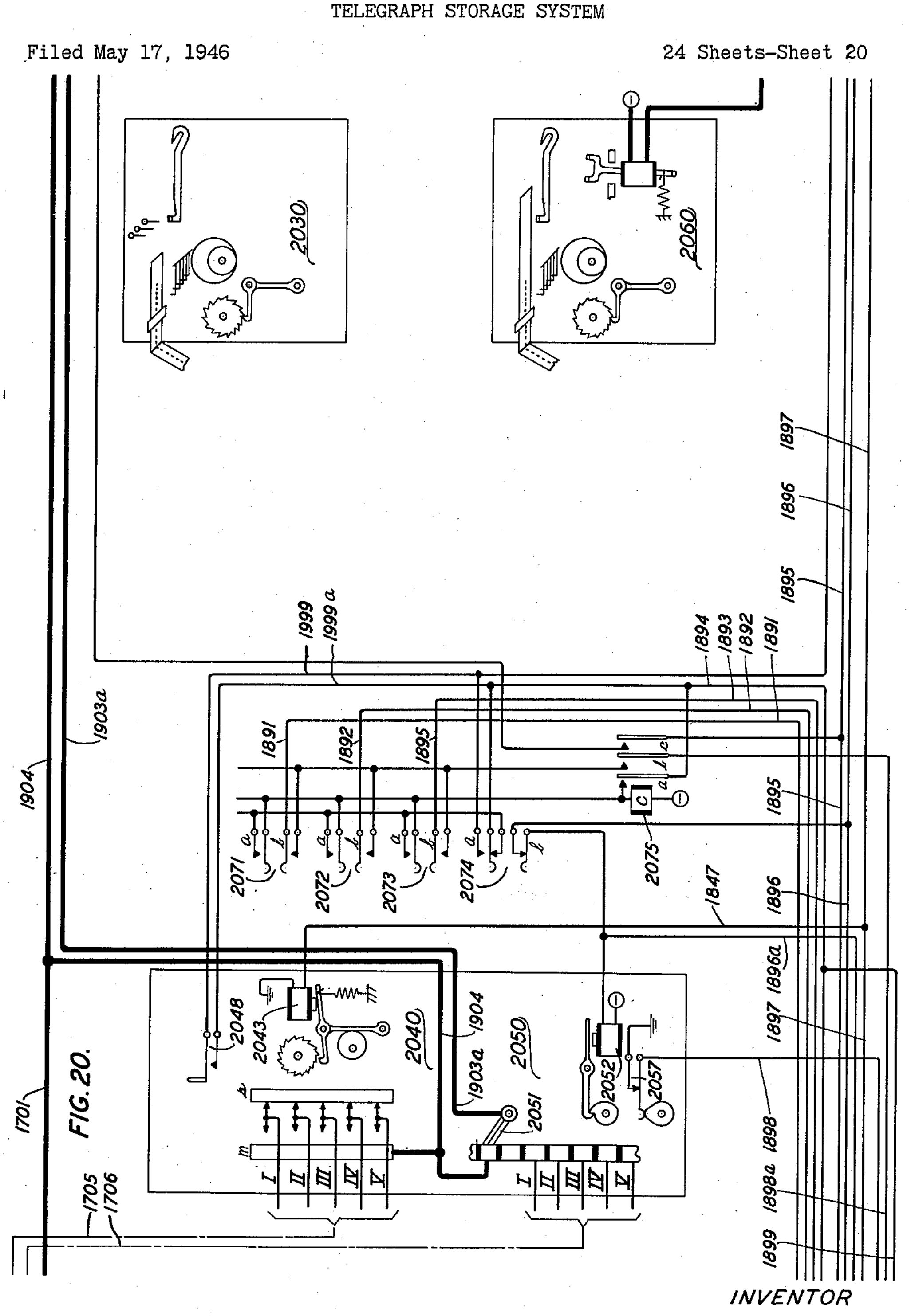

The station further includes a channel numbering circuit shown in Figs. 17 and 18.

As has already been stated the system is operated on the start-stop basis. It is shown in the drawings as using the five-unit code, but may of course, readily be arranged to use a smaller or a greater number of selecting units in the code.

The machine 2030 has a keyboard in which each key controls the punching pins and starts the machine for one revolution. The mechanical operations effect the actual perforations and advance the tape. This machine may be arranged to type a home record in page form or else to type the message on the punched tape, in which latter case a character counter is provided to signal the operator when a "carriage return" combination is to be inserted in the tape for proper recording in page form on a distant page printer.

The machine 2040, 2050 forms a single unit with a common drive. The setting of the transmitter contacts is in response to operations of the sensing pins under control of the tape perforations during the first part of a revolution and the signal combination is transmitted by the distributor in accordance with the setting of the transmitter contacts during the remainder of the revolution.

The sixth pin contacts 2048 in this machine are normally open, and will be depressed and closed when a tape is placed under the distributor gate, and will remain closed independently of the perforations in the tape until the tape end passes out, when the contacts will rise and open.

The transmitter contacts are normally held in engagement with the spacing bar. When a tape is present, the sensing pins that enter punchings will cause the corresponding contacts to engage the marking bar, and the sensing pins held down by unpunched portions of the tape will hold the contacts away from the marking bar or in engagement with the spacing bar.

For open line and closed signals or impulses, as in the present system, the spacing bar is disconnected from the circuit and the line circuit will be closed over the marking bar and any contact in engagement therewith for the "marking" condition and will be open at any contact not in engagement therewith for the "spacing" condition.

With the machine at rest, the line circuit is normally closed over the stop segment during the "stop" pulse, which thus is a "marking" condition. Immediately after starting the distributor brush 2051 passes over the start segment, which is disconnected, thereby imposing the "spacing" condition for the start pulse upon the line. Thereafter the brush passes over segments I, II, III, IV and V for sending marking or spacing impulses in accordance with the setting of the transmitter contacts I, II, III, IV and V.

The machine 2040, 2050 is normally held against operation by the stop mechanism and will be released by energization of the start magnet 2052. The transmitter-distributor being a pace-setting device, the start magnet is held continuously energized for the duration of a message, and the machine continues to operate at a constant speed. The speed may be adjusted for the desired speed of operation, as required by the isochronous receiving apparatus at the distant station. Thus the speed may, for example, be set for 40, 60, 75 or 100 words per minute.

The tape is advanced or fed out one step for each revolution by a stepping device. By means of the tape withholding magnet 2043 the feed mechanism may be rendered ineffective and the tape withheld when magnet 2043 is energized, even though the distributor keeps operating to send signals. The transmitter contacts in such case would, of course, remain in the setting corresponding to the punchings at which the tape has been stopped.

It will be noted that the code segments of the distributor are not connected directly to the transmitter contacts. These circuits include other control contacts for transmission of signal combinations independently of the transmitter setting whenever the tape is being withheld, as will be described hereinafter.

The receiving machine 2060 has a sensitive polar magnet for receiving incoming signal pulses for control of punching pins and type bars. The machine starts in response to each start pulse by the magnet and the signals are punched in the tape and also printed thereon by mechanical action. The tape is also fed out once for each revolution. If this machine is a page printer it will also include mechanism for "shift" and "unshift" functions relative to the type bars. For this type of machine each individual punching in the tape is incomplete so that the punched-out portion remains hinged to the body of the tape with sufficient give to permit the sensing pins to enter the hole. Thus the entire surface of the tape is retained to facilitate reading of the characters printed thereon.

The system includes two timing circuits 1850 and 1950 for control of the duration of certain functions. Thus the circuit 1850 controls the transmission of a series of "space" combinations at the beginning of each message transmission and the circuit 1950 controls the transmission of a series of "letters" combinations at the end of each message transmission. By proper adjustment the number of repeated characters in each series may be varied as desired.

Each timing circuit includes a timing condenser 1854 or 1954 connected in series with a resistance 1853 or 1953 between ground and minus potential. The circuit also includes a vacuum tube 1852 or 1952 of any well-known design and having three essential elements: filament, grid and plate. A gas-filled tube may obviously be used instead of the vacuum tube. The plate circuit includes the winding of a polar relay 1851 or 1951. The grid is connected to the point between condenser and resistance to receive a negative potential from relay contacts 1861*a* or 1941*d*, at which the tube will be non-conducting, so that the polar relay will be in spacing position. The said negative potential will also serve to substantially short-circuit and discharge the timing condenser. When the minus potential is removed from the grid by the relay contacts 1861*a* or 1941*d*, the timing condenser gradually becomes charged and the potential applied to the grid becomes more and more positive. After an interval, determined by adjustment of the resistance 1853 or 1953, the grid will reach a potential at which the tube becomes conducting and operates the polar relay to marking. By reapplication of the negative potential to the grid the tube will again become non-conducting and the polar relay operates back to spacing. Thus the contacts of the polar relay may be connected to exert successive controls separated by predetermined time intervals.

As it is shown in the drawing the station is arranged for full-duplex operation. However, by the provision of terminal blocks, such as 1937, 1938, 1939, 1947 and 1948, at which connecting straps may be switched to an alternate position, the circuit may readily be converted to half-duplex operation.

The circuit will first be described as connected for full-duplex operation with the connecting straps in the position shown in the drawing.

*a. Full-duplex operation.*—The receiving circuit may be traced as follows: Incoming conductor 1901, terminal block 1939, line windings of polarized relays 1940 and 1938, terminal block 1938 to the incoming conductor 1902. In this circuit relay 1940 acts as the receiving relay and repeats the signals over its contacts to the receiving machine 2060. Relay 1930 is the break relay. The transmitting circuit may be traced from the outgoing conductor 1903, terminal block 1937, break key 1935, conductor 1903*a*, wiper and stop segment of distributor 2050 to the outgoing conductor 1904.

The four conductors 1901 to 1904 are in communication with the switching center over a communication channel which may be of any desired kind. The conductors 1901 and 1902 are associated with corresponding conductors at the switching center connected to suitable sending equipment at the switching center. Similarly, the conductors 1903 and 1904 are associated over the channel with a corresponding pair of conductors at the switching center connected to suitable receiving equipment. It should be understood that the line circuits or the channel between the outlying station and the switching center may include repeater equipment at one or more points and that equipment is also provided in the line circuits for supplying operating currents to the receiving and transmitting equipments at both ends of the channel. These equipments have been omitted from the drawings for the sake of simplicity, since they may be of well-known design and do not form a part of the invention embodied in the system.

The transmitting circuit over conductors 1903 and 1904 is normally closed directly over the stop segment of the distributor 2050 in stop position. This circuit will be open while the distributor brush 2051 passes over the start segment for transmission of the start pulse and as the brush continues its travel over the five selecting segments I, II, III, IV, and V, the line circuit will be closed over the group of five conductors 1706, through the code relay circuit shown at the top in Fig. 17 and over the group of five conductors 1705 connected to the transmitter contacts I, II, III, IV, and V. With all the transmitter contacts in spacing position, that is, in engagement with the spacing bar *s*, during transmission of a message, an all spacing or "blank" signal will be transmitted over the normally closed relay contacts in the code relay circuit. Under the control of the perforations in the tape any one or more of the transmitter contacts may be operated into the marking position, that is, into engagement with the marking bar *m*, and corresponding marking and spacing pulses will be transmitted over the line, as will be more fully explained hereinafter.

It will be noted that the marking bar of the transmitter normally is directly connected to the transmitter contacts over conductor 1701, contacts of relay 1815 and the group of conductors 1705. These relay contacts are normally closed for the purpose of permitting the distributor 2050 to operate without signals being transmitted from the transmitter contacts under certain conditions; however, under these conditions signals may be transmitted under control of the channel numbering circuit shown in Fig. 17. The transmitting and receiving circuits for full-duplex operation are shown more simply in Fig. 23.

It will now be assumed that a message has been manually recorded on tape by the keyboard perforator 2030. The tape will have the following records thereon starting from the leading end: A plurality of "letters" combinations, the symbol for the addressed station, a "space" and then the message, which in turn is followed by a plurality of "letters" combinations fed out by the operator to permit tearing the tape off without mutilating the message.

The leading end of the tape is then inserted in the transmitter 2040 whereby the sixth pin contacts 2048 are closed.

Three non-locking start keys are provided, namely, the "number" key 2071 for starting the sending machine and for insertion of channel numbering, the "repeat number" key 2072 for repeating a message with the same channel numbering, and the "no number" key 2073 which also is for starting the sending machine but omits the channel numbering.

It will be assumed that the message is to be preceded by channel numbering. Thus the key 2071 will be temporarily operated.

Key 2071 at its contacts *a* closes a circuit from minus battery through relay 2075, contacts *a* of key 2071, contacts *a* of key 2074, conductor 1999*a*, sixth pin contacts 2048, conductor 1999 and contacts *b* of normally operated relay 1931 to ground. Relay 2075 operates and locks over its contacts *a*, sixth pin contacts 2048 to the ground at relay contacts 1931*b*.

While the start key 2071 is still depressed, relay 2075 over its contacts *b* closes a circuit which may be traced from ground over the normally closed universal contacts 2057, conductor 1898, relay contacts *a* of relay 1871, conductor 1898*a*, relay contacts 2075*b*, key contacts 2071*b*, conductor 1891, break contacts *e* and winding of "number" relay 1821 to minus. In this circuit relay 1821 operates and locks over its continuity contacts *e*, conductors 1894 and 1999*a*, sixth pin contacts 2048, conductor 1999, to ground at relay contacts 1931*b*, independently of the universal contacts and of key 2071.

It will be noted that relay 1931 is normally locked operated over contacts *b* of break key 1935 and the marking contact of polar relay 1930. Relay 1930 is the break relay and responds to incoming signals. Relay 1931 is slow releasing and is timed to release after a spacing interval of several character signals, so that this relay will remain energized during ordinary transmission, but will release when the armature of the break relay 1930 remains in spacing position for about one second or longer in response to an incoming break signal. Thus relay 1931 will remain operated under normal operating conditions, thereby maintaining the locking circuit at its contacts *b* for relays 2075 and 1821, 1822 or 1823, as the case may be, until the end of the message when the sixth pin contacts 2048 open.

The universal contacts 2057 are closed in rest position of the distributor 2050 and will be open whenever the distributor is out of its normal or stop position. The contacts 2057 normally apply ground over conductor 1898 for the normal operation of polar relay 1810 to marking. Every time the distributor is started, the contacts 2057 open and relay 1810 will be operated to spacing by its biasing winding, which position the relay will occupy except when the distributor passes through or stops in its stop position.

Relay 1821, operated, closes another locking circuit for itself over its contacts *f* and relay contacts 1832*i* to ground.

Relay 1821, operated, now applies ground over its contacts *c*, conductor 1895 over two paths, one leading over relay contacts 2075*c* through the winding of feedout relay 1941, which operates, and the other over the locking contact *c* of relay 1941, which thus remains locked up independently of the sixth pin contacts 2048 until relay 1821 releases at the end of the message.

Relay 1821, operated, also applies ground over its contacts *d* and relay contacts 1832*b* to the armature of polar relay 1810 for control of the numbering circuit in Fig. 17. With relay 1810 in marking position this control ground is now extended over relay contacts 1831*c*, conductor 1795*a*, relay contacts 1861*e*, conductor 1795 and through the winding of rotary magnet 1711 of the stepping switch 1710 in the numbering circuit, thereby operating magnet 1711 and starting the numbering sequence.

Feedout relay 1941, operated, at its contacts *a* opens one of the energizing circuits for the tape feed magnet 2043 of the transmitter 2040. This magnet, however, remains energized at this time over conductor 1897 and relay contacts 1832*g*. This magnet, when deenergized, permits the tape to be advanced once for each operation of the distributor, but when energized, as at the present instant, the tape feed mechanism is prevented from feeding tape even though the machine is operating. The object at this time is to prevent the message tape from advancing while the channel number is being transmitted by the numbering circuit.

Relay 1941, operated, at its contacts *d* applies minus potential to the circuit 1953, 1954 for the vacuum tube 1952, and at its contacts *e* applies ground for the operation of relay 1942.

The tube 1952 is normally conducting, but with minus potential now applied to the grid circuit, the tube is rendered non-conducting for the time being. Condenser 1954 will become discharged. With tube 1952 non-conducting, polar relay 1951 operates to spacing. The timing circuit 1950 performs no other function at this time.

Relay 1942, operated, at its contacts *b* closes a locking circuit for itself over contacts *a* of relay 1931 and the spacing contact of polar relay 1951 to ground.

Relay 1942, operated, further extends ground from its contacts *c* over two parallel paths, one extending over closed contacts *b* of stop key 2074 to the start magnet 2052 and the other over conductor 1896, closed relay contacts 1832*h* and conductor 1896*a* to the start magnet 2052. The start magnet operates in this circuit and causes the distributor to start rotating, causing relay 1810 to operate alternately to spacing and marking once during each revolution by the opening and closing of the universal contacts 2057.

*b. Channel identification and message numbering.*—The numbering circuit includes the code relays 1750 to 1759 and the stepping switches 1710, 1720, 1730 and 1740 shown in Fig. 17 and also the control relays shown in Fig. 18.

The ten code relays 1750 to 1759 control two sets of contacts, one set being shown above and the other below the relay windings. The upper contacts are normally closed and are connected in series in different combinations between the groups of five conductors 1705 and 1706. The lower contacts of the code relays are normally open and when closed connect conductor 1701 to any one or more of the five conductors in group 1706.

While the numbering circuit is functioning relay 1832 remains released, thereby keeping the operating circuit for relay 1815 open at its contact *f*. Thus relay 1815 will maintain the short-circuit across the marking bar and transmitting contacts of transmitter 2040 so that the combination set up in the transmitter by the tape punchings cannot interfere with the transmission from the numbering circuit.

Normally, all the code relays will be released and complete transmitting circuits may be traced from the outgoing conductor 1903, conductor 1903*a*, the distributor brush 2051, any one of the distributor segments I to V, conductor group 1706; various upper contacts in series of the code relays, conductor group 1705, the closed contacts of relay 1815, conductor 1701 to the outgoing conductor 1904. Thus when the distributor is rotating an all-marking or "letters" signal will be transmitted. This condition is utilized only for the tape feedout operation at the end of an outgoing message, as will be described hereinafter.

After the numbering circuit has completed its operation, relays 1832 and 1815 will be operated, thereby opening the bridge between the transmitting contacts and the marking bar. Under this condition normal transmission of signal pulses from the transmitter contacts takes place over the normal transmitting circuit, as already traced, which includes the five circuits through the normally closed upper contacts of the code relays in released condition.

The upper and lower contacts of the code relays are connected in accordance with the requirements of the standard teletypewriter code so that by the operation of one or two of these relays any one of thirty-one code combinations can be established. The thirty-second or blank condition is not produced although it is obvious that it could be produced by the addition of another relay.

Thus considering one of the relays, such as relay 1756, when this relay is operated its contacts *f* and *g* are closed, thereby placing a marking condition from conductor 1701 upon conductors II and III of the group 1706. At the same time the contacts *a, d, e* open-circuit the remaining three conductors I, IV, V for the spacing condition. Thus when the distributor 2050 makes a revolution a complete circuit in marking condition may be traced over outgoing conductors 1903 and 1903*a*, the brush 2051 of the distributor, segment II and conductor II of the group 1706 over contact *f* of relay 1756, conductor 1701 to outgoing conductor 1904. This circuit thus is independent of the transmitter contacts. A circuit in marking condition may also be traced from conductor II in group 1706 over a plurality of contacts *b* of the code relays, conductor II of group 1705 and contact of relay 1815 to conductor 1701. This circuit is of no particular significance at this time. When the brush 2051 passes over segment III similar circuits may be traced. When the distributor brush 2051 passes over segments I, IV and V, the transmitting circuit is open at contacts *a, d, e* of relay 1756 so that spacing pulses will be transmitted.

As another example, relay 1754 when operated will, by its contacts *f* establish a marking condition on conductor V and segment V of the distributor and by its contacts *a, b, c, d* it will establish a spacing condition on the remaining conductors I, II, III, IV and the corresponding segments of the distributor.

Two relays such as 1751 and 1758 when operated will, by their lower sets of contacts, cooperate in establishing a marking condition on conductors I, III, IV and will insure a spacing condition for conductors II and V by means of their upper contacts. These transmitting circuits may be more readily apparent from the simplified showing in Fig. 23.

Since the code combination representing "figures" may be set up on the code relays it is evident that code combinations transmitted after the "figures" may be recorded in the upper case on the distant receiving machine and that therefore sixty different combinations may be obtained by the proper selection of these code relays. A "letters" combination will restore the lower case for subsequent characters.

It will be noted that when all the code relays are released all the lower contacts are open; this does, however, not result in the sending of an all "blank" combination since all the upper contacts of the relays are closed. Thus when all the code relays are released the "letters" combination will be transmitted by the numbering circuit during each revolution of the distributor. It will therefore be noted that the numbering circuit, as arranged, does not send the "blank" combination.

Figure 23:
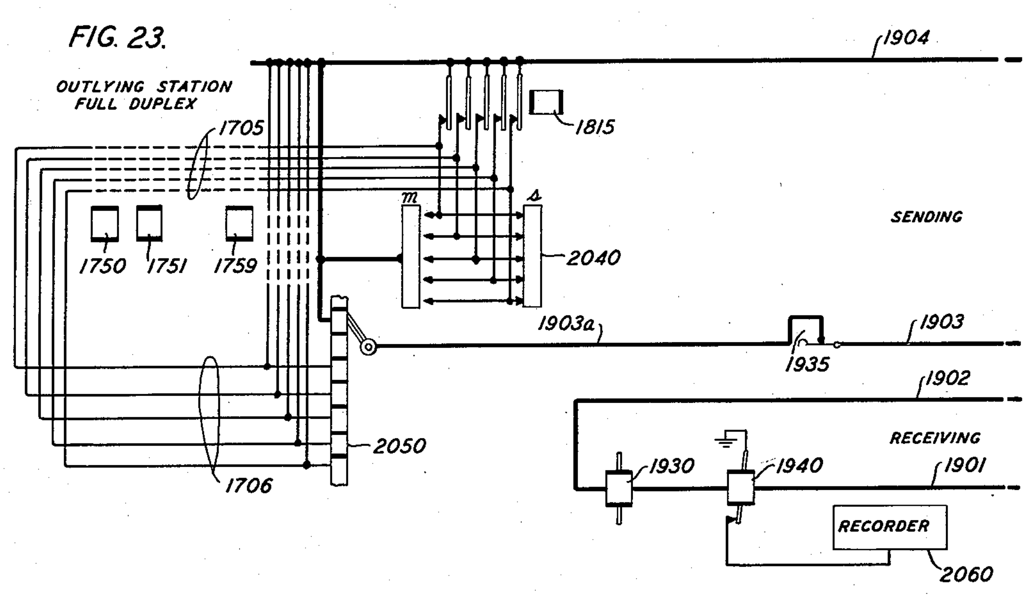
Figs. 23 to 26 show simplified diagrams of the main transmission circuits of typical equipments at the switching center and outlying stations.

In Fig. 23 the code relays have been shown in simplified form. The horizontal dotted conductors from the transmitter contacts are intended to represent the upper normally closed contacts of the code relays and the vertical dotted conductors from the distributor contacts are intended to indicate the lower normally open contacts of the code relays.

The switches 1710, 1720, 1730 and 1740 of the numbering circuit are of the stepping type. Each switch has two banks of terminals cooperating with contact wipers which are made to travel over the terminals one step at a time by means of a rotary magnet. A set of off-normal contacts will be operated out of their normal position as soon as the wipers leave their normal position. A release magnet is provided for returning the wipers to their normal or initial position. Switch 1710 has eleven positions and the other switches have ten positions.

These switches serve to operate the code relays in different combinations as the switches are advanced to their different positions under the control of the control circuit in Fig. 18 and the universal contacts 2057.

The switch 1710 is particularly connected to establish the proper sequence of operations, and to operate the code relays for transmission of the fixed channel letters assigned to the particular channel with which the numbering circuit is associated, whereas the switches 1720, 1730 and 1740 are particularly connected to operate the code relays for transmission of the units, tens and hundreds digits of the message number after the transmission of the "shift" or "figures" combination, under control of switch 1710.

The sequence switch 1710 is cross-connected in certain positions to operate certain code relays for the transmission of the code letters designating the channel. Thus in the present instance the channel may be identified by the symbols NY for the switching center followed by the symbol A for the channel designation. The symbols are transmitted before the message number in accordance with the present arrangement.

*c. Repeat character.*—The control circuit shown in Fig. 18 includes a timing circuit 1850 and relays 1861 and 1862 which constitute a "repeat character" circuit. This circuit is provided for the purpose of controlling the numbering circuit to repeatedly send a predetermined character before the channel identification and message number are transmitted. This character is preferably any character which will produce a single symbol punching in the tape at the distant station, in this case at the switching center. One object is to prepare the leading end of the tape at the distant station by a series of single punches so that the tape end may be adapted for insertion in any of the different tape transmitters encountered in the present day telegraph plant.

In the present system the repeat character circuit will cause relay 1751 to repeatedly transmit a marking pulse over conductor III and distributor segment III during a time interval which may be predetermined by the timing circuit 1850 and which may conveniently cover seven revolutions of the distributor. By adjustment of the timing circuit the number of single punches may be increased as desired so that a longer tape end may be prepared at the switching center. With the machines used which employ standard code, this code combination spaces out or steps the tape of a tape printer but ordinarily does not print a character, however, it may print a character if desired.

*d. Detail operation.*—Now continuing the description of the operation it will be remembered that as soon as "number" relay 1821 operated, the control ground over its contacts *d* was extended via contact *b* of relay 1832, via the armature and marking contact or polar relay 1810, relay contacts 1831*c*, conductor 1795*a*, contacts 1861*e*, and conductor 1795 to the winding of rotary magnet 1711 of the sequence switch 1710.

Switch 1710 operated one step to place the contact wipers of the terminal banks *a* and *b* on terminals #1. At this time the off-normal contacts 1713 are also operated to their upper position which, however, has no immediate effect.

It will be realized that, at the beginning of a rotation of the distributor 2050, the sequence switch 1710 must complete its stepping operation in time to select and operate code relays before the distributor brush 2051 reaches the first selecting segment I. The rotary magnet 1711 will receive the control pulse at the beginning of the stop pulse and the time available for adjusting switch 1710 in each step will be during the interval of the combined stop and start pulses. The winding of magnet 1711 is in series with a suitable condenser 1714 and resistance 1715 which cause the operating current to increase rapidly, thereby quickening the stepping operation. The wipers therefore will be in their new position in ample time for the operation of a code relay and for the consequent circuit change to be completed before the distributor brush reaches the selecting segment I.

It will also be remembered that the start magnet 2052 was operated by relay 1942 to start the distributor, as soon as relay 1821 was operated.

When the universal contacts open immediately after starting, the operating circuit for relay 1821 is opened. However, as already described, the relay is locked both over contacts *b* of relay 1931 and over contacts *i* of relay 1832. As already stated relay 1832 remains released until the numbering circuit has completed its operations. Therefore the control ground applied to the armature of relay 1810 will be maintained even in the case of an incoming break signal releasing relay 1931 during the transmission of the channel numbering. Relay 1821, operated, at its contacts *c* further insures that relays 1941 and 1942 are held operated for the continued rotation of distributor 2050 until the numbering circuit has completed its function, even though an incoming break would cause relay 1931 to open the locking circuit of relay 1942. Therefore the circuit for the start magnet 2052 will be maintained over contacts *c* of relay 1942 until the numbering circuit has completed its operation.

As soon as the universal contacts open, relay 1810 operates to spacing, thereby applying the control ground to both contact wipers of switch 1710. One circuit may be traced from the spacing contact over conductor 1793 to the wiper *b* and the other over relay contact 1832*b* and conductor 1794 to wiper *a*.

As explained above, the wipers were advanced to terminals #1 before the outgoing start pulse. The control ground from the spacing contact of relay 1810 is therefore now extended over terminal #1 of bank *b* to code relay 1751, which operates and applies marking condition to distributor segment III and spacing condition to the remaining segments, in the manner described. As the distributor 2050 continues its rotation a "space" combination will be transmitted over the line. In fact, a series of "space" combinations will be transmitted by subsequent rotations until the timing circuit 1850 cuts off. The control ground is also extended over terminal #1 of bank *a* to conductor 1798 over relay contacts 1862*a*, spacing contacts of polar relay 1851 and winding of relay 1861, which operates.

Relay 1861, operated, locks itself over its contacts *d* to ground on conductor 1895, and at its contacts *e* opens the operating circuit for rotary magnet 1711.

Relay 1861, operated, closes a circuit from ground over relay contacts 1862*d*, 1861*b* and 1821*b* through the winding of relay 1841, which operates.

It will at this point be assumed that the digit switches 1720, 1730 and 1740 have been advanced to different positions by previous transmissions. Thus the hundreds switch will be on terminals #5, the tens switch will be on terminals #0 and the units switch will be on terminals #8. Consequently the off-normal contacts 1743 and 1723 will be in their upper position and contacts 1733 will be in their lower or normal position.

Now when relay 1841 operates, ground is extended over its contacts *g* to advance the message register 1875 one step for display of the next message number 509.

Relay 1841, operated, also extends ground over its contacts *f*, over break contacts *a* of relay 1842 through the winding of rotary magnet 1721. Consequently, the units switch is advanced from terminals #8 to terminals #9, so that the new number to be transmitted will be 509. These operations of the digit switch take place in ample time before the circuit is otherwise in condition for transmitting the digit.

When relay 1861 operated, it removed minus at its contacts *a* from the circuit 1853, 1854 connected to the grid circuit of vacuum tube 1852.

In the timing circuit 1850 the condenser 1854 is normally short-circuited by the minus potential at contacts *a* of relay 1861, so that the potential normally applied to the grid of tube 1852 is sufficiently negative to render the tube non-conducting. When now relay 1861 removes negative battery from the timing circuit, the condenser 1854 commences to charge over resistance 1853 to ground. Thus the potential on the grid will gradually increase until a potential is reached at which the tube becomes conducting and causes the operation to marking of polar relay 1851, which is normally biased to spacing. As stated above the time interval established by the timing circuit 1850 is about equal to the time occupied by seven revolutions of the distributor. During this interval the entire numbering circuit is in waiting condition, except relay 1810 which responds to the ground pulses from the universal contacts. The operating circuit for the rotary magnet 1711 remains open at contacts *e* of relay 1861. As relay 1810 opens and closes its spacing contact, the control ground will cause relay 1751 to release and reoperate in time for each transmission, so that a series of marking pulses will be transmitted over the distributor segment III until the timing circuit 1850 completes its timing. Relay 1861 being locked operated, it will not be affected by the operations of relay 1810. Thus a series of "space" combinations will be transmitted.

If at the end of the time interval, when polar relay 1851 operates to marking, relay 1810 happens to be in marking position, the circuit will await the next opening of the universal contacts and the operation of relay 1810 to spacing, in which case relay 1751 would be operated once more. In either case, the control ground will be extended over terminal #1 of bank *a*, conductor 1798, relay contacts 1862*a*, marking contacts of relay 1851, through the winding of relay 1862 which operates. Relay 1852, before its delayed contacts *a* open, closes a locking circuit for itself over its contacts *b* and closed contacts *c* of relay 1861 to ground.

Relay 1862, operated, at its contacts *d* removes ground from the operating circuit for relay 1841 which releases and prevents further advance of the digit switches.

Relay 1862, operated, at its contacts *a* opens the circuit for the control ground to the armature of polar relay 1851, thereby stopping further control by the "repeat character circuit." Relays 1861 and 1862 will remain locked up until the numbering circuit has completed its operation.

Relay 1862, operated, at its contacts *c* now again completes the operating circuit for rotary magnet 1711 so that, when the universal contacts momentarily close, the control ground will be extended from the marking contact of polar relay 1810, relay contacts 1831*c* and 1862*c*, conductor 1795 through the winding of magnet 1711.

The sequence switch 1710 therefore is advanced to terminals #2.

During the start pulse relay 1810 operates to spacing and the control ground is extended over terminal #2 of bank *b*, conductor 1791, relay contacts 1823*b*, conductor 1791*a* through the winding of code relay 1751, which operates. At the same time control ground is extended over terminal #2 of bank *a*, conductor 1792, break contacts *a* of relay 1823, conductor 1792*a* through the winding of code relay 1750, which operates. Code relays 1750 and 1751 now place marking condition on conductors III and IV and segments III and IV of the distributor and put the remaining conductors I, II and V in spacing condition. In accordance with the standard teletypewriter code this code combination represents the letter N, which thus is transmitted over the line circuit 1903, 1904 during the current revolution of the distributor.

When relay 1810 next operates to marking the control ground is again extended to rotary magnet 1711, which advances the switch 1710 to the terminals #3.

When relay 1810 thereafter operates to spacing the control ground is extended over terminal #3 of bank *b* to again operate code relay 1751 and over terminal #3 of bank *a* to operate code relay 1753. These two relays will apply marking condition to the distributor segments I, III and V. This code combination represents the letter Y. The letters NY have been arbitrarily chosen as the identification letters for the switching center. By connecting the conductors 1791*a* and 1792*a* from the break contacts *a* and *b* of relay 1823 to other code relays any desired code may be transmitted when the sequence switch is in the positions 2 and 3.

When the distributor again passes through stop position the sequence switch 1710 is stepped to the terminals #4.

Thereafter the control ground passes over terminal #4 in bank *b* to operate code relay 1751, which again applies marking condition to distributor segment III for the transmission of a "space" signal.

When the distributor again passes through stop position sequence switch 1710 operates to position 5.

Thereafter the control ground is applied over bank *b* to operate code relay 1757. The control ground is also applied over bank *a* to operate code relay 1752. These two relays apply marking conditions to distributor segments I and II. This code combination represents the letter A which has been arbitrarily chosen to identify the outlying message originating station. By proper connections to terminals #5 of switch 1710 any other one or two relays may be permanently assigned for operation in position 5 of the switch. It will be noted that the two station designations have been separated by a "space" signal transmitted in position 4 of the sequence switch. The arrangement for the terminals #2, #3, #4 and #5 of the sequence switch may be changed in any desirable manner to send one or two code combinations for identification of the sending station and the associated channel, with an intervening "space" signal.

When the distributor again passes through the stop position switch 1710 is operated to position 6.

The control ground is thereafter extended over the two terminals #6 to operate code relays 1752 and 1759. These two relays apply marking condition to segments I, II, IV and V of the distributor which code combination represents the "figures" signal.

When the distributor again passes through the stop position switch 1710 is advanced to position 7.

Thereafter the control ground is extended over bank *b* to the contact wiper of bank *b* of hundreds switch 1740 without any effect. The control ground is also extended over bank *a* of switch 1710 to the contact wiper of bank *a* of switch 1740. This latter wiper being in position 5 code relay 1754 will be operated, which applies marking condition to segment V of the distributor for the transmission of a code combination, which in the upper case will produce the numeral 5 at the switching center.

When the distributor next passes through the stop position switch 1710 will be advanced to position 8.

Ground will now be extended to the two wipers of tens switch 1730 and further over terminals #0 to operate code relays 1756 and 1754. These two relays place marking condition on segments II, III and V of the distributor, which code combination represents the numeral 0 in the upper case.

When the distributor again passes through stop position switch 1710 is advanced to position 9.

Thereafter the control ground is extended to the wipers of units switch 1720, which now is in position 9. The control ground over terminal #9 of bank *a* operates code relay 1755, which applies marking to distributor segments IV and V. This combination represents the numeral 9 in the upper case. The control ground extended over terminal #9 in bank *b* of switch 1720 causes the operation of relay 1842, which locks itself over its contacts *b* to ground at off-normal contacts 1723*a*. Relay 1842 operated, at its contacts *a* opens the operating circuit for rotary magnet 1721 and instead prepares the operating circuit for release magnet 1722.

It may be noted here that the release magnet 1722 is not operated until the numbering circuit is used for the next message when relay 1841 is again operated in position 1 of sequence switch 1710. At such time relay 1841 operates register 1875 to show numeral 510 and at its contact *f* completes the operating circuit for release magnet 1722. Switch 1720 therefore returns to position 0 wherein the later part of the sequence it will send the numeral 0. When relay 1841 operated and while relay 1842 is still operated, rotary magnet 1731 is operated over relay contacts 1843*a*, 1842*d* and 1841*e* to ground. Switch 1730 therefore operates to position 1 for sending the numeral 1 at the proper time in the sequence. Upon complete release of switch 1720 the off-normal contacts 1723*b* open, and upon completion of the operation of the "repeat character circuit" relay 1841 is released. Thus relay 1842 will have its locking circuit opened and will release, thereby restoring the stepping circuit for unit switch 1720. For subsequent messages the unit switch will be advanced as already described, and when it again reaches its position 9 the operations just described will be repeated for advancing the tens switch to position 2 and returning the units switch to position 0. Similar operations also take place when the tens switch reaches position 9, resulting in the advance of hundreds switch 1740 to position 6 and the return of the tens and units switches to their position 0.

Returning now to the operations for sending the numeral 509, when the distributor again passes through its stop position the sequence switch is advanced to its position #10.

Thereafter the control ground is extended over bank *a*, conductor 1796 through the winding of relay 1831, which operates and locks itself over its contacts *a* to ground at the make contacts *b* of off-normal contacts 1713. Relay 1831 at its contacts *b* extends an additional holding ground to the holding conductor 1895 for maintaining feed-out relay 1941 operated. It will be noted that in position 10 of sequence switch 1710 no code relay is operated, thereby causing a "letters" combination to be transmitted which in turn will cause an unshift operation by the distant printer.

When the distributor again passes through its stop position the control ground is extended over the marking contacts of relay 1810, make contacts *c* of relay 1831, winding of relay 1832 to minus. Relay 1832 operates.

Relay 1832, operated, closes a locking circuit for itself over its contacts *e* to the holding conductor 1895.

Relay 1832, operated, at its contacts *b* opens the circuit for the control ground from contacts *d* of relay 1821 to the armature of polar relay 1810 and thereby prevents further operation of the sequence switch 1710 and the code relays.

Relay 1832, operated, at its contacts *d* extends ground over conductor 1797, off-normal contact 1713*a* through the winding of release magnet 1712 to minus. The release magnet operates and returns the sequence switch 1710 to its initial position.

Relay 1832, operated, at its contacts *f* connects the winding of relay 1815 over conductor 1899 to the ground on the sixth pin contacts. Relay 1815 operates and opens the short-circuit across the transmitting contacts before the dstributor brush reaches the first selecting segment. Thus the transmitter will be free to transmit signals under control of the tape without any interference from the code relays, since these relays thereafter will remain unoperated.

Relay 1832, operated, at its contacts *g* disconnects minus battery over conductor 1897 from the tape feed magnet 2043 of the transmitter. The magnet deenergizes and renders the tape feed mechanism active, so that at the end of the current revolution the tape will be advanced one step.

Relay 1832, operated, at its contacts *h* opens one of the operating circuits for start magnet 2052, with no effect at this time.

Relay 1832, operated, at its contacts *i* opens one of the locking grounds for relays 1821, 1822 and 1823 without any effect at this time.

In due course the switch 1710 will return to its initial position thereby operating its off-normal contacts to their lower position. When contact 1713*a* opens the operating circuit for release magnet 1712 is opened; when the make contacts 1713*b* are opened the locking circuit for relay 1831 is opened and this relay releases, thereby extending the operating circuit for rotary magnet 1711 from the marking contact of relay 1810. The control ground has, however, been removed from the armature of relay 1810 by opening of the relay contact 1832*b*.

The numbering circuit shown in Figs. 17 and 18 has now been restored to its normal condition, except that relays 1821, 1832, 1861 and 1862 remain operated awaiting the opening of the sixth pin contacts 2048 at the end of the message or the release of relay 1931 in response to an incoming break signal, and except that relay 1842 in this particular case remains operated until the next message, as already explained.

The transmitter-distributor continues operating and feeding tape for each revolution, first transmitting a few letters signals due to the previous manual feedout and then transmitting the message, as already explained.

When the end of the tape is reached the sixth pin contacts 2048 open, thereby removing the holding ground for relays 2075 and 1821, both of which release. Relay 2075, released, at its contacts *b* opens the operating circuit for relays 1821, 1822 and 1823 and at its contacts *c* opens the operating circuit for feedout relay 1941. Relay 1821 released at its *b* contacts removes the locking ground from conductor 1895, thereby releasing relays 1832 and 1941. The release of relay 1821 further causes the release of relays 1861 and 1862 and thus the entire numbering circuit, including the repeat character circuit, is restored to its normal condition, except that relay 1842 remains locked up.

Relay 1815 also having been released, now restores the short circuits across the transmitting contacts of transmitter 2040, for the subsequent transmission of feed-out signals.

Feed-out relay 1941, released, at its contacts *a* extends negative battery to the tape feed magnet 2043, which operates and prevents further operation by the tape feed mechanism.

Relay 1941 released, at its contacts *d* removes minus from the timing circuit 1953, 1954 and at its contacts *c* opens the operating circuit for relay 1942 which, however, remains locked over contacts *a* of relay 1931 and the spacing contacts of polar relay 1951.

*e. Automatic tape feed-out.*—While relay 1941 was operated the timing condenser 1954 was short-circuited and discharged by battery over make contacts *d* of relay 1941. Under that condition the potential applied to the grid of vacuum tube 1952 was sufficiently negative to render the tube non-conducting. Now with relay 1941 released, negative battery is removed from the grid circuit and the timing condenser charges over resistance 1953. The rate of charge may be so adjusted that the potential on the grid of tube 1952 will reach the less negative value at which the tube becomes conducting after an interval equal to the time of 42 revolutions of the distributor.

During this time interval the transmitter-distributor continues to rotate with all the transmitter contacts in spacing position and short-circuited by the contacts of relay 1815 so that the transmitting circuit is conditioned for transmission of "letters" signals. The transmitting circuit may be traced as follows: outgoing conductors 1903 and 1903*a*, distributor 2050, the conductor group 1706, the upper closed contacts in series of all the code relays, conductor group 1705, contacts of relay 1815, conductor 1701 and outgoing conductor 1904. The object of transmitting this series of about 42 "letters" signals is to cause the tape at the switching center to be fed out a certain distance, whereby it will be insured that the end of the message will amply clear the tearing edge on the receiving machine.

At the end of the feedout interval tube 1952 in conducting condition operates relay 1950 to marking, thereby opening the holding circuit for relay 1942, which thus releases.

Relay 1942, released, opens its own locking circuit and at its contacts *c* removes ground from the operating circuit for magnet 2052 of the distributor. The distributor stops at the end of the current revolution.

The tube 1952 remains conducting after relay 1941 has released and relay 1951 remains in marking position until relay 1941 is operated for the next message. Thus the feedout control circuit is restored to normal.

The circuit of the outlying station thus is restored to normal, ready for the next message to be sent.

The numbering circuit in Figs. 17 and 18 is not restored to normal until the sixth pin contacts 2048 are opened. For this reason it is advisable to have only a single message on a given piece of tape, so that a second message on a second piece of tape may be preceded by channel identification and message numbering when transmitted to the switching center.

Since the tape feed mechanism of transmitter 2040 is rendered inactive immediately after a tape has been ejected, a succeeding tape may be inserted while the automatic tape feedout circuit is still causing "letters" signals to be transmitted by the distributor 2050. If now a start-key is operated while the automatic feedout is still functioning the entire system would be started up in the manner already described. Thus, the sixth pin contacts having been closed, relays 2075 and 1821 will operate, in turn operating relay 1941 which again applies minus to the grid of tube 1952 and prevents the tube from becoming conducting until the end of this new message.

The circuit for the start magnet 2052 remains closed by operated relay 1942, so that the distributor will continue to rotate. The circuit for the feed magnet 2043 remains closed by the released relay 1832, thus keeping the tape stationary.

Thus when the universal contacts 2057 close for the first time after operation of relay 1821 the control ground from relay contacts 1821*d* will be applied over the marking contact of polar relay 1810 to operate the sequence switch 1710 to its position 1, and the entire system will proceed thereafter in the manner described above until the new message has been transmitted followed by automatic feedout transmission of "letters" signals.

During the first rotation of the distributor under the assumed condition polar relay 1810 will be in spacing position, so that when relay 1821 operates the control ground will be extended to the two contact wipers of sequence switch 1710. However, with the switch in normal position the control ground will not be extended further.

If relay 1821 operates while the universal contacts 2057 are closed and polar relay 1810 is in marking position the sequence switch 1710 may or may not be advanced to position 1. If it is not, the distributor will send another "letters" signal as part of the preceding automatic feed-out and when the universal contacts again close, switch 1710 will be advanced in the normal manner.

*f. No message numbering.*—In the case of certain messages, such as service messages, the channel identification and message numbering are usually omitted. In this case the start-key 2073 for no numbering is operated instead of the key 2071 for numbering, after the tape has been inserted in the transmitter.

Relay 2075 is operated and locked as before, but the contacts *b* of key 2073 in this case close an operating circuit for the no numbering relay 1823, instead of for the numbering relay 1821. This circuit may be traced from minus through the winding of relay 1823, break contacts *a* of the relay, conductor 1893, relay contacts 2073*b* and 2075*b*, conductor 1898*a*, relay contacts 1871*a*, conductor 1898 and inversal contacts 2057 in stop position to ground. Relays 1941 and 1942 are operated as before from contacts *c* of relay 2075.

Relay 1823, operated, closes a locking circuit for itself over its continuity contacts *e*, conductor 1894 to the locking circuit over the sixth pin contacts and contacts *b* of relay 1931 to ground. Relay 1823 also closes a locking circuit for itself over its contacts *f* and the contacts *i* of relay 1832 to ground, which will insure that the relay remains operated until the numbering circuit has completed its function.

Relay 1823, operated, at its contacts *d* applies the control ground over contacts *b* of relay 1832 to the armature of relay 1810 for control of the stepping switches and code relays of the numbering circuit.

Relay 1823, operated, applies ground over its contacts *c* to the holding conductor 1895 for the operation of relays 1941 and 1942 in the feedout control circuit.

With the control ground applied to the armature of polar relay 1810 in marking position, the operating circuit for rotary magnet 1711 is completed, as described in the case of numbering, and the switch 1710 is advanced to position 1.

The transmitter-distributor is started by the operation of relay 1942 and when the universal contacts open, relay 1810 operates to spacing and extends the control ground over the two banks of switch 1710 to operate code relay 1751 and also relay 1861 in the repeat character circuit, as already described. The repeat character circuit thus starts its timing operation, permitting the distributor to make about seven revolutions for the transmission of "space" signals. At the end of the time interval, relay 1862 operates and when relay 1810 thereafter operates to marking the operating circuit for rotary magnet 1711 is again completed, so that the switch 1710 will step to its position 2.

When now the universal contacts open and relay 1810 operates to spacing, the control ground is extended over the two banks of the switch 1710, the two corresponding conductors 1791 and 1792 to the break contacts *a* and *b* of operated relay 1823. These break contacts *a* and *b* now being open, relays 1750 and 1751 will not be operated, as in the case of numbering described above, but the control ground is further extended from conductor 1792 over make contacts *a* of relay 1823, and through the winding of relay 1831 to minus. Relay 1831 operates to discontinue the functions of the numbering circuit at this point. Thus in position 2 of the switch 1710 for no numbering, the control ground has the same effect as in position 10 for numbering. The switch will be returned to normal from its position 2.

Relay 1831 operated, opens the operating circuit for rotary magnet 1711 and extends the control ground for operation of relay 1832, as previously described, thereby restoring the entire numbering circuit to normal, except for relays 1823, 1832, 1861 and 1862, which remain operated during the transmission of the message until the sixth pin contacts open at the end of the message. If switch 1720 is in position 9, as described above, relay 1842 will still remain operated. With contacts *f* of relay 1832 closed, relay 1815 will be operated and the transmission circuit is now in condition for transmission of the message.

At the end of the message the tape feedout operation, controlled by the timing circuit 1950, will take place, as already described, and thereafter the entire circuit will be restored to normal.

*g. Repeat message number.*—At times it becomes necessary to repeat a message or to restart it, in which case it is usually desirable to also repeat the message number, assigned to the message at its first transmission. This is possible even though one or more service or other messages may have intervened which were not numbered.

In this case the start-key 2072 for repeat numbering is operated, which in turn will result in the operation of repeat number relay 1822. This relay locks to conductor 1894 and to relay contact 1832*i*, as in the case of relay 1821. Relay 1822 also extends locking ground to conductor 1895 and control ground to the armature of relay 1810.

The distributor 2050 is started, switch 1710 is advanced to position 1 and the repeat character is started, as before.

Relay 1822 not having contacts corresponding to contacts *b* of relay 1821, it fails to operate relay 1841 for advancing the message register 1875 and for advancing the units switch one step.

After the repeat character circuit has completed its operation, switch 1710 advances to position 2.

Relay 1822 not having contacts corresponding to contacts *a* and *b* of relay 1823, it will not return the numbering circuit to normal at this stage. Consequently, the numbering circuit will proceed with its sequential functions, as described above, for numbering of the message, and will retransmit the last number.

The conditions for transmission of the message, for feedout operation and return to normal are established in the manner described above.

*h. Resetting numbering circuit.*—For the purpose of resetting the numbering circuit to position 000, relay 1871 and non-locking key 1872 are provided. When the key is operated relay 1871 operates and locks itself over its contacts *c* to the contacts *b* off-normal contacts 1723, 1733 and 1743. At any time at least one of these contacts will be closed.

Relay 1871, operated, at its contacts *a* opens the operating circuit from the universal contacts for relays 1821, 1822 and 1823 thereby preventing the numbering circuit from going into action.

Relay 1871, operated, at its contacts *b* closes the operating circuit for relay 1841 from break contacts *b* of off-normal contacts 1713. Relay 1841 operates, unless switch 1710 is in off-normal position, in which case resetting would await restoration to normal of the numbering circuit.

Relay 1871, operated, applies ground over its contacts *d*, *e* and *f* for the operation of relays 1842, 1843 and 1844, which lock themselves to ground over contacts *c*, *b* and *a* of relay 1841. With the switches in the positions shown, relays 1842 and 1844 also lock over off-normal contacts 1723*a* and 1743*a*.

At the contacts *a* of relays 1842, 1843, 1844 the operating circuits are now switched from the rotary magnets to the release magnets of the three digit switches, so that these switches will return to their position 0. The off-normal contacts then open the locking circuits for relays 1842, 1843, 1844 and 1871. Relay 1871 releases relay 1841 and the numbering circuit is restored to normal.

When next the numbering circuit is started relay 1861 will operate relay 1841 during the repeat character interval, and relay 1841 will advance unit switch 1720 to position 1, so that the number subsequently transmitted will be 001.

The message register 1876 may be reset by hand by known means to also read 000, and will of course, also be advanced to read 001 when the numbering circuit is started.

*i. Break signals.*—In case an incoming break signal arrives over the receiving circuits 1901, 1902 some time after the channel numbering has been sent, relay 1930 will remain in spacing position long enough to permit relay 1931 to release, as already explained.

Relay 1931, released, at its contacts b removes the locking ground from the sixth pin contacts, thereby releasing relays 2075 and 1821, 1822 or 1823.

Relay 2075, released, at its contacts c opens the operating circuit for relay 1941. Relay 1821, released, at its contacts c removes ground from holding conductor 1895 for relays 1832, 1861 and 1941. Relay 1941 now releases and opens the operating circuit for relay 1942. The locking circuit for relay 1942 also having been opened by relay 1931, released, relay 1942 releases and removes ground from the start magnet 2052. Thus the transmitter distributor stops.

The release of relay 1821, or of relays 1822 or 1823, as the case may be, causes relays 1832 and 1861, 1862 to release.

The entire system at the outlying station thus is restored to normal, except that relay 1931 remains released. Upon taking cognizance of the break signal, the operator temporarily operates the key 1932 for reoperation of relay 1931, which extinguishes the break lamp 1933 and stops the buzzer 1980.

To continue the message without sending a new number the no number start-key 2073 must be operated. If a break signal should arrive while the numbering circuit is still in operation, relay 1931 will release as before. Relay 2075 will release, as before. However, since in this case relay 1832 has not yet been operated, relay 1821, 1822 or 1823 cannot be released by removal of the locking ground at contacts b of relay 1931, because the locking circuit from contacts i of relay 1832, over contacts f of these relays is still closed.

Therefore relays 1821, 1941 and 1942 remain operated, and the distributor continues rotating. Thus the numbering circuit will continue operating to position #18 of the sequence switch. Now relay 1831 operates, and the control ground from the spacing contacts of relay 1810 will operate relay 1832. This relay opens the last locking circuit for relay 1821, which releases, in turn releasing relays 1941 and 1942. The distributor stops and the entire circuit is restored to normal, as before. By this particular circuit arrangement it is insured that the numbering circuit will not be interfered with and will be restored to its normal condition.

A break signal may be transmitted from the outlying station by operation of the break key 1935 for opening the outgoing line circuit for the prescribed length of time. Locally this will have the same effect as an incoming break signal in releasing relay 1931. In this case the sending equipment will be disabled until relay 1931 is restored by operation of key 1932.

*j. Resetting transmitting tape.*—At times it is desirable to repeat a portion of a message which is in the course of transmission. For this purpose the locking stop key 2074 will be operated, which at its contacts b opens the start circuit for magnet 1952 to stop the transmitter during the resetting of the tape. The channel numbering having been sent, relay 1832 is locked operated and has at its contacts h opened the alternate operating circuit for the start magnet. If the numbering has not been completed, relay 1832 non-operated will cause the distribution to continue, and further sending must wait until the numbering has been completely sent. In this latter case another message might be substituted for the one already in the machine, to follow the number already sent.

Contacts a of operated key 2074 close the locking circuit from contacts b of relay 1931 independently of the sixth pin contacts. Thus all circuits including the numbering circuit will be held in abeyance until the tape has been reset and the key 2074 restored, at which time the transmitter will start and transmission will proceed from the resetting point without numbering.

It will be noted that the stop key 2074, when operated, at its break contacts a opens the operating circuits for relay 2075 through the contacts a of start keys 2071, 2072 and 2073. Thus the system cannot be started if the stop key has been inadvertently left operated.

*k. Half-duplex operation.*—In this case the straps on terminal blocks 1937, 1938, 1939, 1947 and 1948 should be swung to the alternate position of that shown in the drawing.

The transmission circuit may then be traced as follows: outgoing conductor 1903, block 1839, windings of polarized relays 1940 and 1930, blocks 1938 and 1937, break key 1935, wiper and stop segment of distributor 2050 to the outgoing conductor 1904.

The two conductors 1903 and 1904 are in this case associated over the channel with corresponding conductors at the switching center for sending and receiving messages, alternately, to and from suitable receiving and sending equipment arranged for half-duplex operation at the switching center.

Suitable repeater equipment and power supply are included in the channel or line circuits between the two stations, though such equipments have been omitted in the drawings for the sake of simplicity.

Figure 24:
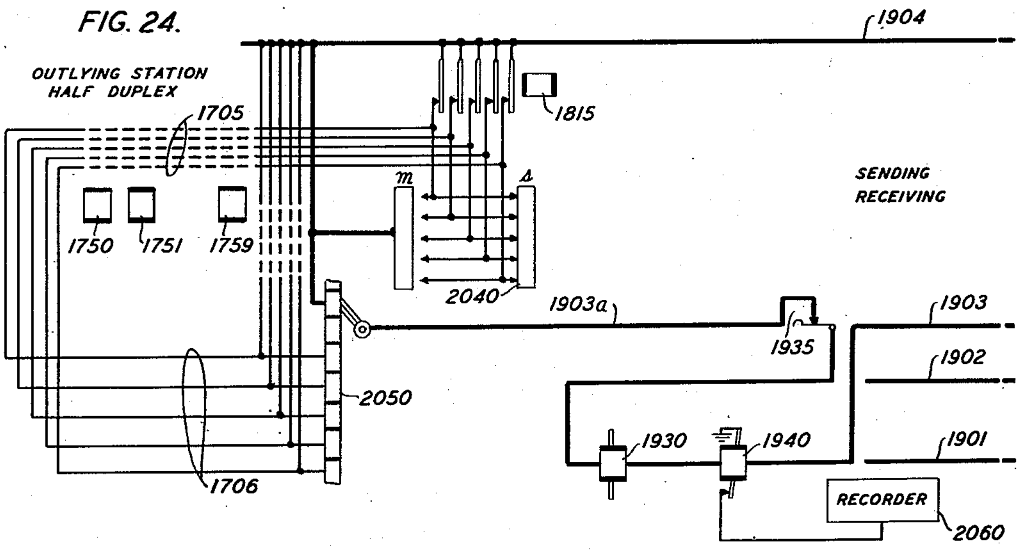

The transmission circuit for half-duplex operation is shown in simplified form in Fig. 24.

The sending equipment including the channel numbering circuit may be operated in the same manner as for full-duplexing operation, when no message is incoming from the switching center.

Since the receiving relay 1940 is permanently included in the transmission circuit this relay will follow the outgoing signals. The marking contacts of relay 1940, which otherwise would produce a home record on the reperforator 2060, are connected over terminal blocks 1947 and 1948 to contacts d of relay 1942 and thus will be bypassed whenever relay 1942 is operated, that is, whenever the distributor 2050 rotates.

The receiving equipment will, of course, also operate as under full-duplex operation, provided no message is being transmitted at the same time.

With the provision at the switching center of a contention circuit it is assured that no message will be incoming to the outlying station while it is sending over the half-duplex circuit. However, a break signal may, of course, arrive at break relay 1930 during transmission, which will stop further sending, in the manner described for full-duplex operation. If the break signal happens to arrive while the numbering circuit is active, this circuit will complete its operation before the transmitter can be stopped. The number would be garbled at the switching center, but may be repeated by operation of the repeat number start-key 2072, when sending is to be resumed. In the meantime service messages may be exchanged without numbering by operation of the no number start-key 2073.

*Switching center*

In the following description of the circuit operation and equipment at the switching center, reference will be made to Figs. 1 to 18, arranged as indicated in Fig. 22. The circuits are shown in detail in these drawings and reference will also be made to Figs. 25 and 26, which show in a more simplified form the transmission circuits at the switching center that are assigned to outlying stations.

With Figs. 1 to 18 arranged as indicated in Fig. 22 the equipment for two outlying stations is shown in two horizontal rows. Thus the lower horizontal row, including Figs. 3, 6, 8, 10, 13, 16 and 18 and also including Fig. 17 represents the terminal equipment for a full-duplex line connected to an outlying station over a suitable channel. The equipment shown in these figures corresponds to that shown in Fig. 27 for line #2 or #3. The outlying station connected to this equipment may be equipped as shown in Figs. 19, 20, 18, and 17 arranged for full-duplex operation and thus may correspond to the stations B or C in Fig. 28.

Figure 4:
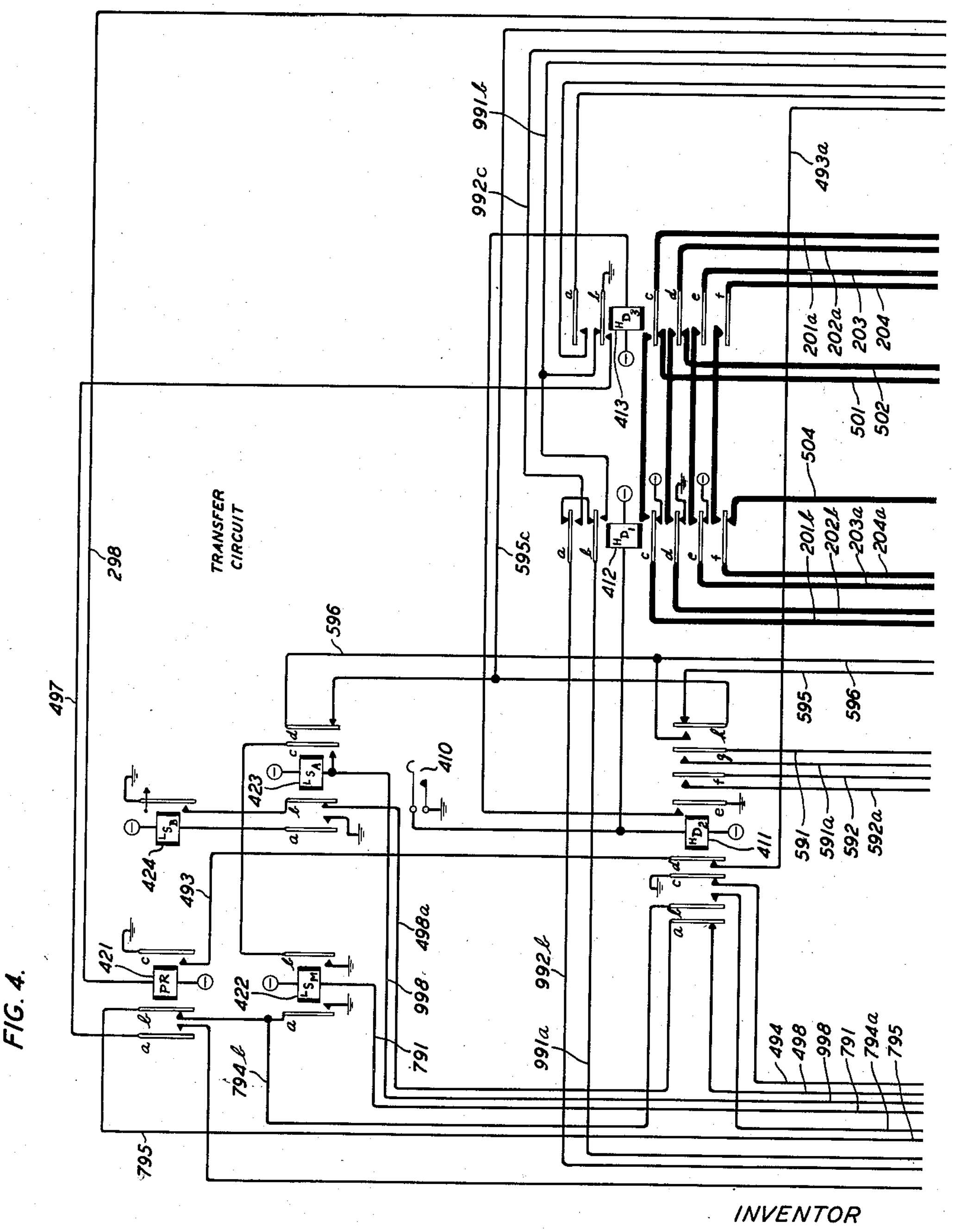
Figure 15:
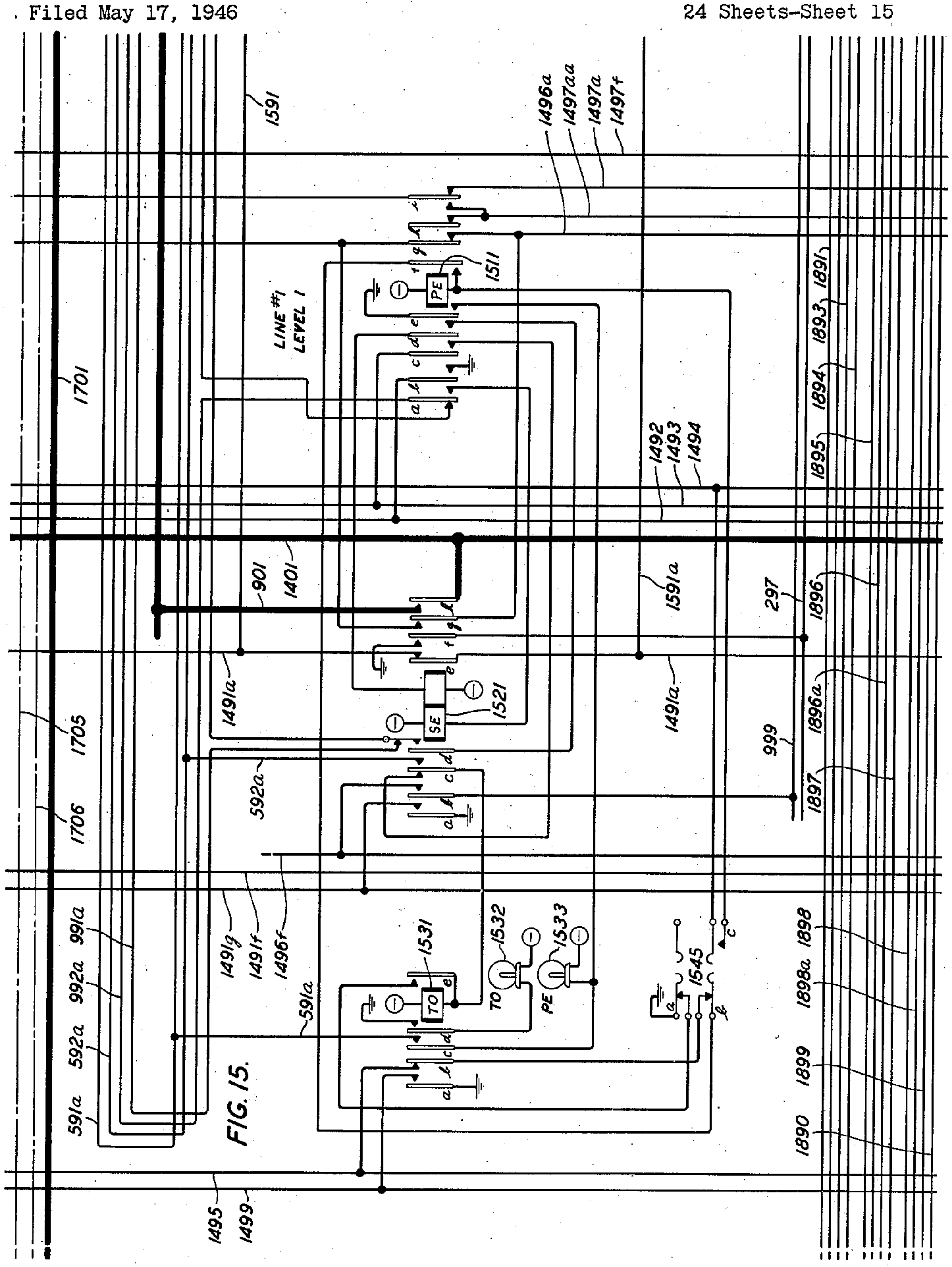
Figure 16:
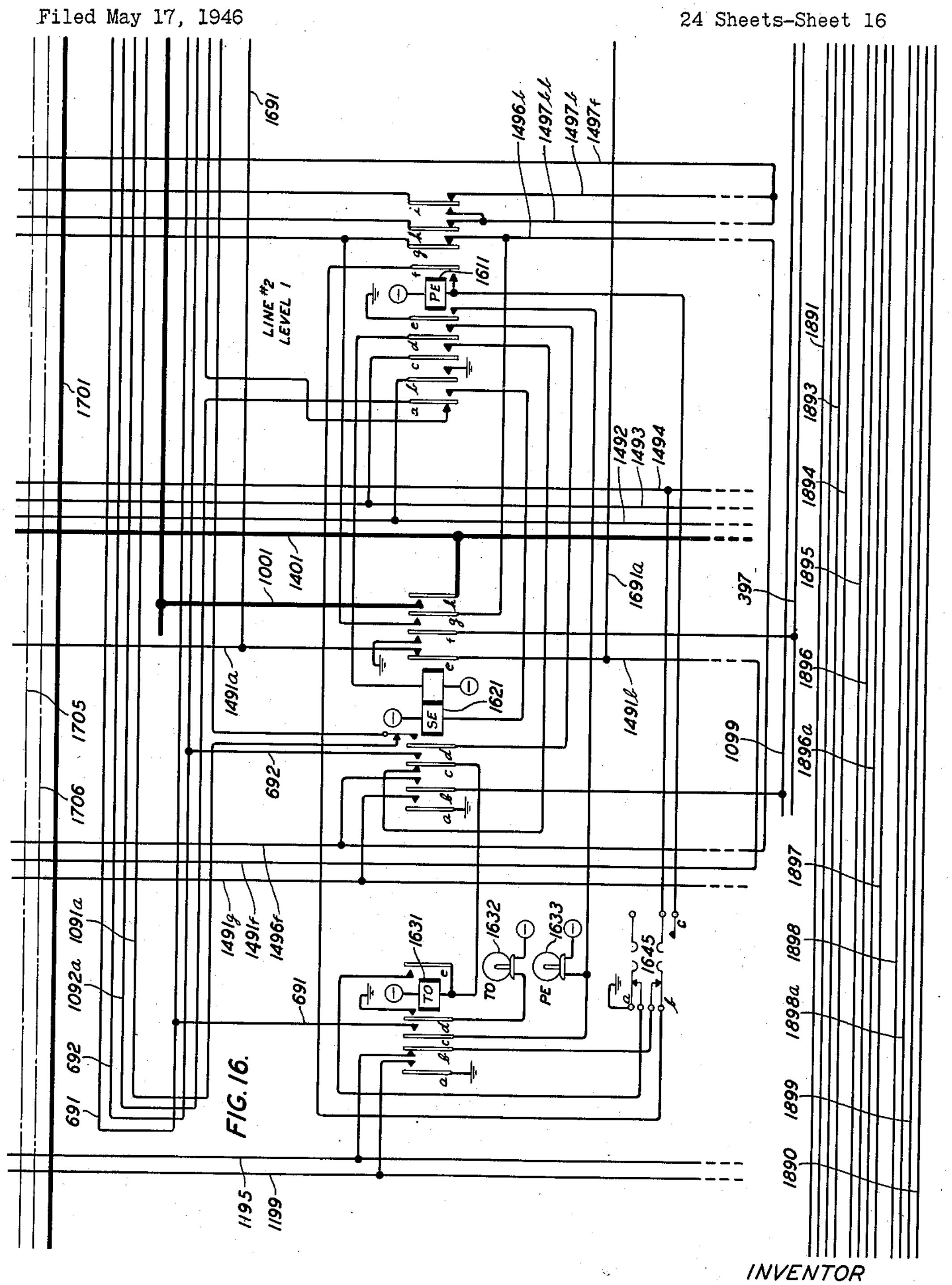

The upper horizontal row, including Figs. 2, 5, 7, 9, 12 and 15 and also including Figs. 18 and 17, shifted upwards for connection of Fig. 18 with Fig. 16, and also including Fig. 4 represents the terminal equipment arranged for half-duplex operation and connected over a suitable channel to an outlying station also arranged for half-duplex operation. This equipment thus corresponds to that shown for line #1 in Fig. 27 and the outlying station corresponds to station A shown in Fig. 28. The outlying station would be similar to the one shown in Figs. 19 and 20, 18 and 17 arranged for half-duplex operation.

The switching center includes a supervisory or service board, shown in Fig. 1 as being common to all the line circuits. The board is connected over suitable link circuits carried down through Figs. 2 and 3 which show the individual service positions for the lines; the link circuits may be extended through other similar line circuits to other individual service positions, not shown.

Figure 11:
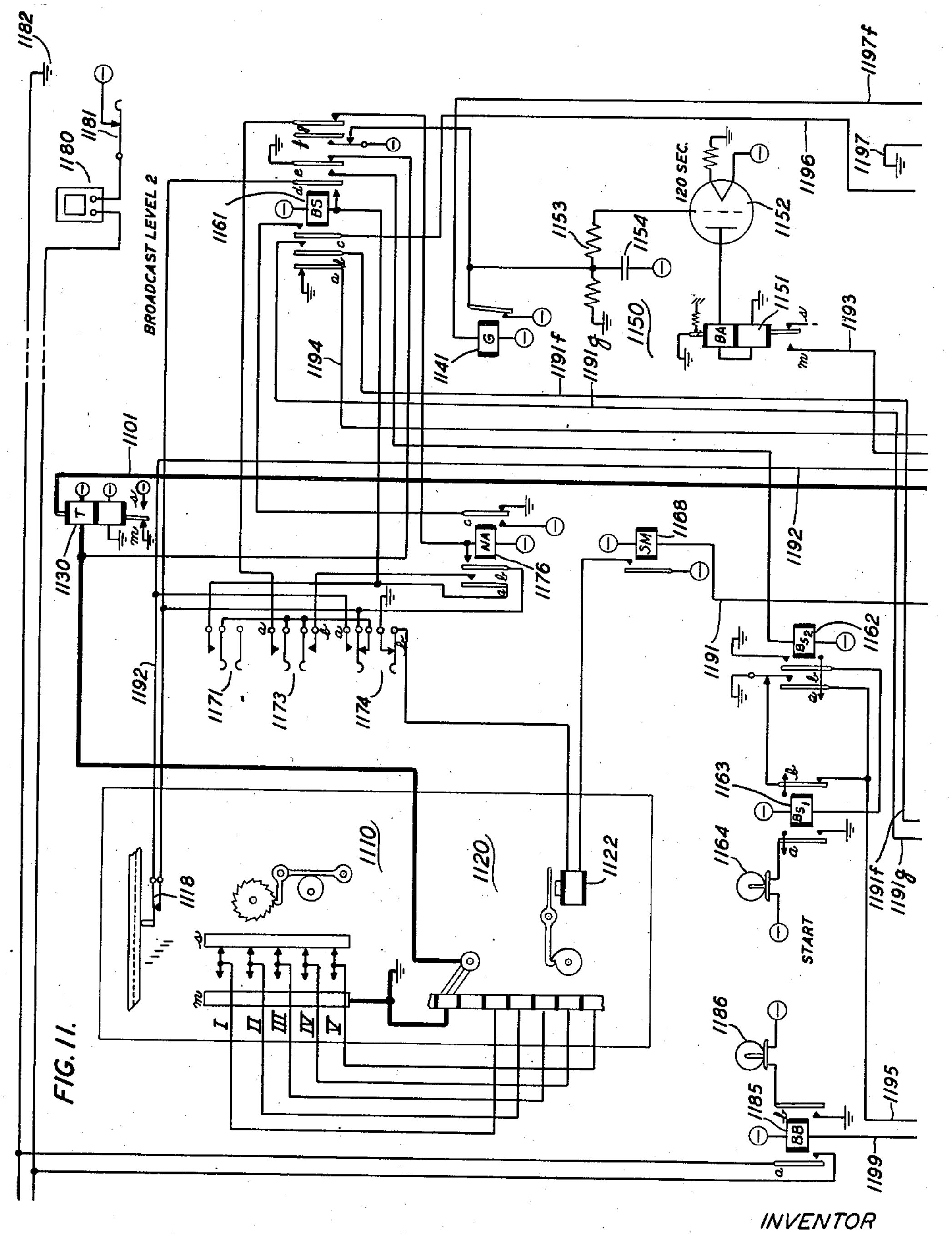
Figure 13:
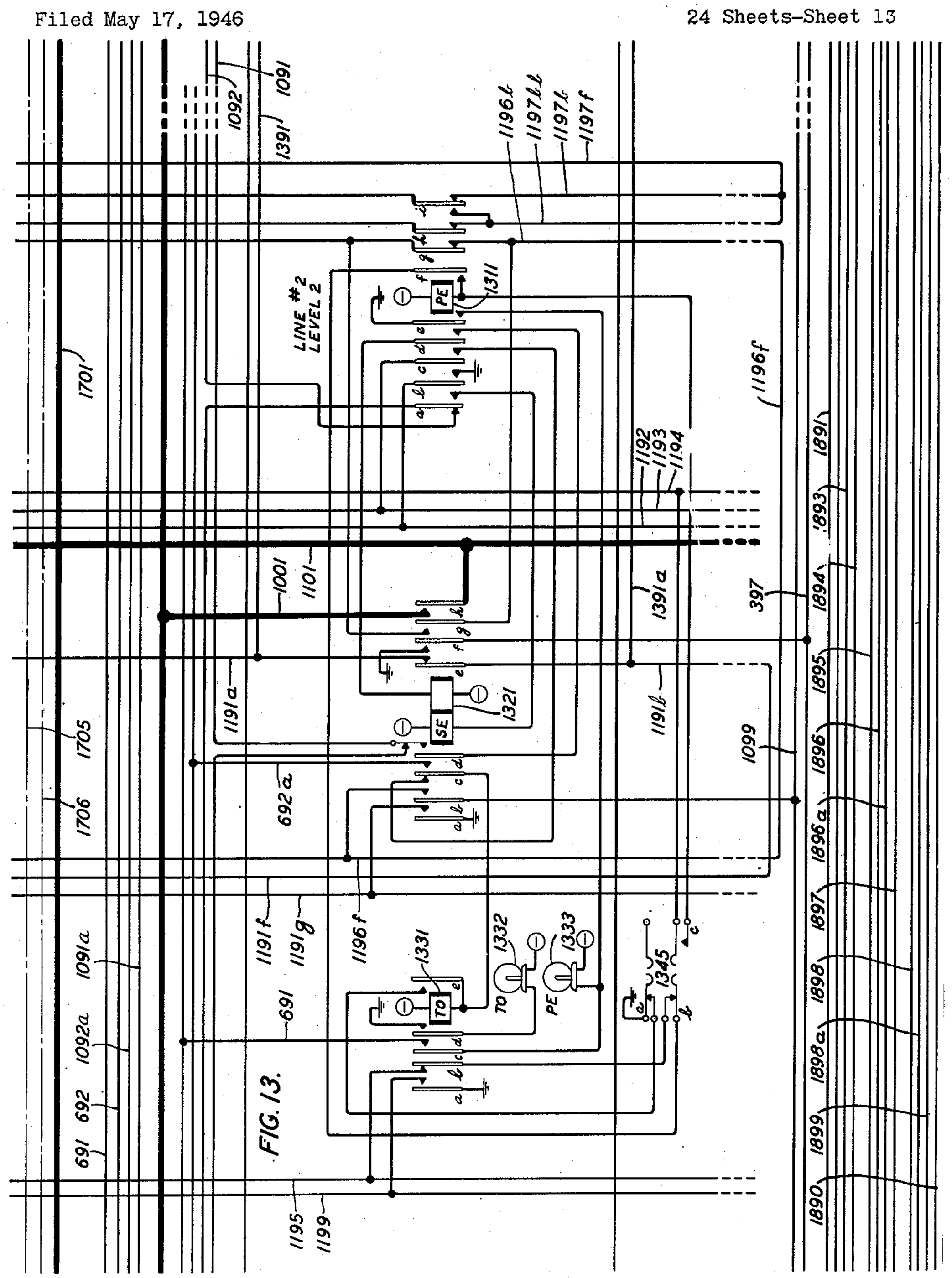
Figure 14:
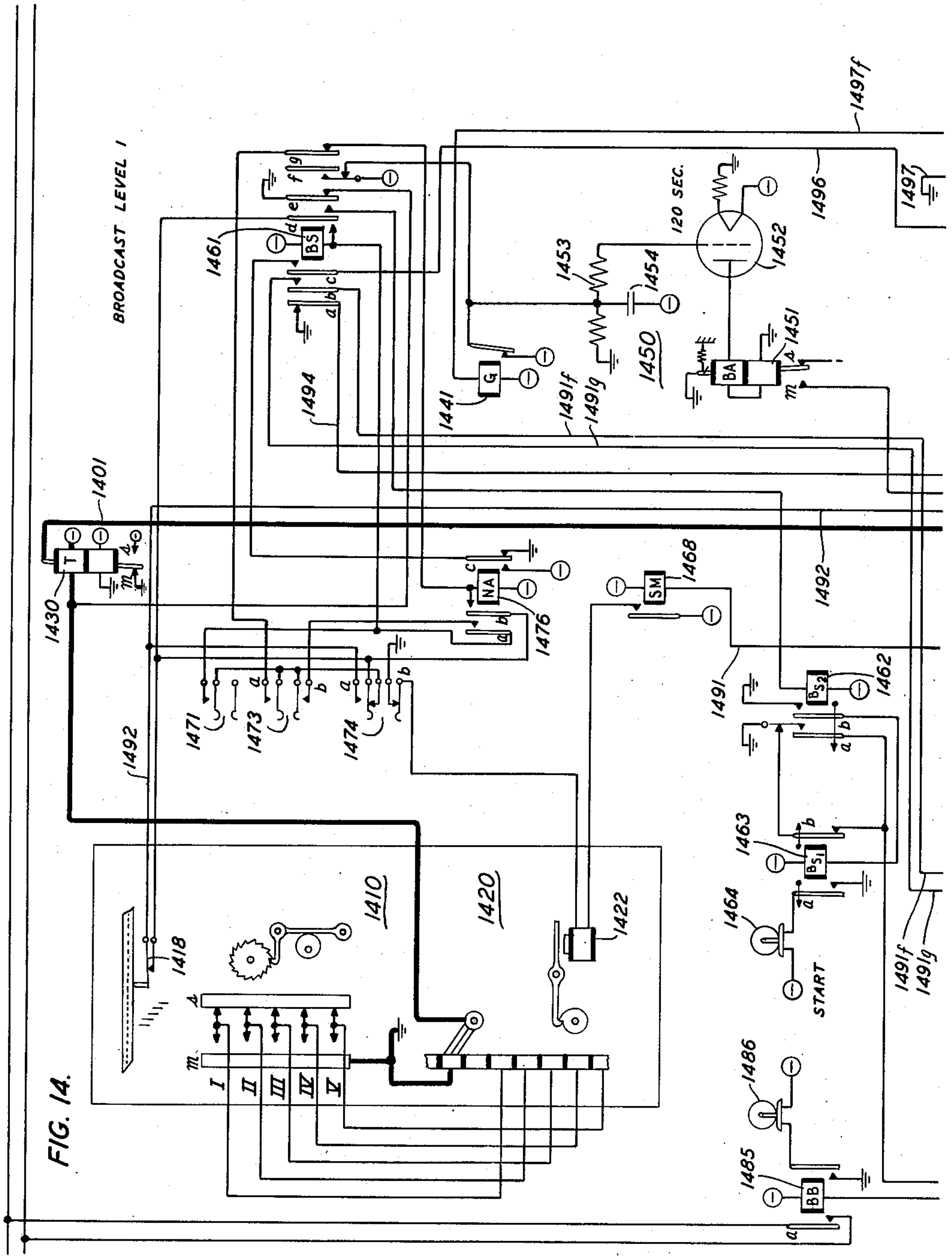

The switching center also includes a broadcasting board, whereby a plurality of broadcast levels may be individually associated with one or more of the line equipments for simultaneous transmission to any desired number of outlying stations. For example, Fig. 14 shows the equipment for one broadcast level and Fig. 11 shows similar equipment for another broadcast level. These broadcast equipments, being common to all the line circuits at the switching center, suitable link circuits are extended therefrom down through Figs. 15 and 16 and through Figs. 12 and 13, respectively, which show the cross-connection circuits between the broadcast levels and the line equipments. These link circuits may be further extended through similar cross-connection circuits in other line equipments not shown in the drawing.

Each line equipment at the switching center includes a channel identification and message numbering circuit, such as that shown in Figs. 17 and 18, and similar to that included in the outlying stations, as described above. These channel numbering circuits are substantially identical in the different line circuits and outlying stations and therefore have been shown only once in the drawings, namely, in Figs. 17 and 18; these figures may be moved to different positions for association with the different line equipments so that Fig. 18 will connect to Fig. 16 or to Fig. 15 as required. Their association with the circuit at the outlying station has already been explained. It should, however, be noted that all the numbering circuits, though similar, are individualized by having the terminal banks of the sequence switch 1710 cross-connected in different ways to the code relays in accordance with accepted symbols designating the stations at opposite ends of the individual channels.

It will be apparent from the following description that the transmitting and receiving equipment as well as the feedout control, the break circuit and the numbering equipment included in each terminal equipment at the switching center closely resemble the corresponding elements at an outlying station, which have already been described. It should, however, be understood that the circuits for these elements are modified to some extent from the arrangement in the outlying stations for the purpose of securing proper cooperation with the broadcasting board and the service board, as will appear from the following detailed description.

In the following description the equipment in the upper row of drawings referred to above will be described as being assigned to a line #1 and the equipment in the lower row of drawings as being assigned to line #2. The broadcasting level shown in Fig. 14 will be referred to as level 1 and that shown in Fig. 11 will be referred to as level 2. Other levels 3, 4, etc., may be associated with the line circuits through cross-connection circuits similar to those shown for lines #1 and #2.

Line #2 as shown in Figs. 3, 6, 8, 10, 13, 16, 18 and 17 is a typical example of a full-duplex line. Line #1 as shown in Figs. 2, 3, 4, 5, 7, 9, 12, 13, 18 and 16 is arranged for operation either as a full-duplex line or as a half-duplex line. The circuit portion shown in Fig. 4 is a transfer circuit whereby the line equipment for line #1 may be changed from half-duplex to full-duplex operation or vice versa, the transfer circuit being shown in condition for half-duplex operation.

The two lines include receiving typing reperforators 760 and 860 which perforate and type a tape in accordance with an incoming message; they are similar to the recorder 2060. After the message has been completely recorded the tape is torn off and the leading end is inserted in the sending machine which in line #1 includes the tape transmitter 740 and the distributor 750 and in line #2 includes the tape transmitter 840 and the distributor 850; they are similar to the sending machine 2040, 2050. The transmitter-distributor transmits the received message over the associated line or loop to the outlying station to which it is addressed.

When the incoming message includes more than one address the piece of tape is inserted in one of the broadcast tape transmitters, such as the transmitter-distributor 1410, 1420 or 1110, 1120 for broadcasting, as will be described hereinafter.

In the line illustrated as half duplex line, the conductors 201 and 202 (Fig. 2) only are employed for transmission. Conductors 203 and 204 are idle in a half-duplex condition but are provided so that the half-duplex circuit can be converted to full-duplex by operating the transfer key 410. The transmission path between the terminals of conductors 201 and 202 in the case of half-duplex system may consist of channels of voice frequency carrier telegraph system or any other wire or radio carrier system, subject only to the condition that a marking condition and a spacing condition, respectively, placed across the path 201, 202 appears as a corresponding condition on the conductors of an outlying intercommunicating station such as 1903, 1904 and vice versa. In the case of full-duplex line in which conductors 301, 302, 303 and 304 are employed, it is understood that the transmission system may be any system such as open wire line, carrier, or radio capable of transmitting in both directions simultaneously. Thus, one skilled in the art would understand that the transmitting conductors 301, 302 will extend to the transmission side and the receiving conductors 303, 304 would extend to the receiving side of a full-duplex system of any well-known type, for example, that shown in S. D. Wilburn Patent 1,744,063, January 21, 1930, and, similarly, conductors 1901, 1902 would be connected to the receiving side and conductors 1903, 1904 would be connected to the transmitting side of the other end of the full-duplex systems.

Each full-duplex line such as line #2 also includes a monitoring typing reperforator 830 which follows all outgoing messages and produces a home record on tape which may be wound on any suitable tape winder.

Each line adapted for half-duplex operation, such as line #1, includes in a single unit a typing reperforator 730, a transmitter 710 and a distributor 720. In this case the reperforator follows the outgoing message, but the punched tape is fed directly into the tape transmitter 710 which retransmits the message over the distributor 720. The arrangement is such that for duplex operation the message is simply recorded on the tape by the recorder 730 and passes through the transmitter 710 to a tape winder; under this condition the signals from the distributor 720 are not impressed upon the outgoing line circuit. On the other hand, when line #1 is operated half-duplex, the signals from the distributor 720 are impressed upon a contention circuit, shown in the center of Fig. 5, which repeats into the outgoing half-duplex line. This has the advantage that if a message should arrive over the line it can be received immediately on the recorder 760, and the outgoing message from distributor 750 will be stored in the tape between the recorder 730 and the distributor 710. The contention circuit will prevent the stored message from reaching the line and cause the incoming message to be properly forwarded to receiving reperforator 760. For a general disclosure of the machine, including reperforator 730, transmitter 710 and distributor 720, see Branson et al. Patent 2,430,447, granted November 11, 1947. For a further detailed disclosure, should such be necessary, see Gubisch Patent 2,348,214 filed May 9, 1944.

The transmitter-distributors 740, 750 and 840, 850 being similar to the machines 2040, 2050, used at the outlying stations and described above, are equipped with sixth pin contacts 748 and 848, tape-feeding magnets 743 and 843, starting magnets 752 and 852 and universal contacts 757 and 857, respectively.

*a. Full-duplex operation.*—Line #2, arranged for full-duplex operation, will first be described.

The receiving circuit may be traced as follows: Incoming conductor 303, operating windings of polar relays 630 and 340 to outgoing conductor 304. In this circuit relay 340 acts as the receiving relay and repeats the incoming signals over its contacts and conductor 803 to the receiving machine 860.

The transmitting circuit may be traced as follows: From the outgoing conductor 301, break contacts *a* of relay 352, operating winding of polar relay 330, conductor 301*a*, the operating winding of the selector magnet 831 of the monitoring recorder 830, conductor 301*c*, spacing contacts of polar relay 1010, conductor 301*d*, the stop segment and wiper 851 of distributor 650, conductor 302*a*, contacts *a* of break key 335 to the outgoing conductor 302. In this circuit the sending relay 330 is used for repeating the outgoing signals to the service board.

The four conductors 301 to 304 are in communication with an outlying station A over a communication channel which may be of any desired kind. The outlying station may be the one shown in Figs. 19 and 20. Thus the outgoing conductors 301, 302 will be associated over the channel with the conductors 1903 and 1904 connected to the receiving equipment at the outlying station. The incoming conductors 303, 304 are associated over the channel with the conductors 1901 and 1902 connected to the sending equipment at the outlying station. As stated under the description of the outlying station the line circuits or the channel between the outlying station and the switching center may include repeater equipment as required and also equipment for supplying operating currents.

The transmitting circuit over conductors 301, 302 is normally closed over the stop segment of the distributor 850 in stop position. This circuit will be opened as the distributor brush 851 passes over the start segment for the transmission of the start pulse and as the brush continues its travel over the five selecting segments I, II, III, IV, V, the line will be closed over the group of five conductors 1706 through the code relay circuits shown at the top in Fig. 17 and over the group of five conductors 1705 connected to the transmitter contacts I, II, III, IV and V. With the transmitter contacts all in spacing position, that is, in engagement with the spacing bars, during transmission of a message an all spacing or "blank" signal will be transmitted. Under the control of the perforations in the tape any one or more of the transmitter contacts may be operated into the marking position, that is, into engagement with the marking bars *m*. and corresopnding marking and spacing pulses will be transmitted over the line, as will be more fully explained hereinafter.

As at the outlying station the marking bar of the transmitter 740 is normally directly connected to the transmitter contacts over conductors 301*d* and 1701, contacts of relay 1815 and the group of conductors 1705. These relay contacts are normally closed for the purpose of permitting the distributor 850 to operate without signals being transmitted from the transmitter contacts under certain conditions; however, under these conditions signals may be transmitted under control of the channel numbering circuit shown in Fig. 17. The transmitting and receiving circuits for duplex operation are shown more simply in Fig. 25.

*b. Full-duplex receiving.*—An incoming message arriving under normal conditions over incoming conductors 303, 304 will traverse the following circuit: incoming conductor 303, polar relays 630 and 340 to outgoing conductor 304. The polar relays respond to the incoming signals.

Receiving relay 340 over its marking contacts applies the signals over relay contact 361*a*, conductor 803 to the selecting magnet in the recorder 860 for recording of the message on the tape.

The first time relay 630 operates to spacing in response to the incoming signals, ground will be applied over its spacing contact through the winding of relay 382, over relay contacts 381C and key 383 to minus. Relay 382 operates and locks itself over its contacts *c*.

Relay 382 at its contacts *a* closes the circuit from intermittent ground at break relay 630 to the receive flash lamp 378. This lamp thus will flash during reception of the message. Relay 382, operated at its contacts *d*, lights the message lamp 385.

Thus the operator at the service board will be notified that a message is incoming on line #2 for retransmission. At the end of the message relay 630 remains in marking and the receive flash lamp 378 is extinguished thereby notifying the operator that the message has been completely received. The operator then removes the tape from the recorder 860, notes the address given at the beginning of the message and inserts the tape in the send transmitter for the addressed station.

On having removed the tape from the machine 860 the operator momentarily operates key 383 thereby releasing relay 382 and restoring the message lamp circuit to normal.

*c. Full-duplex sending.*—Assuming now that a message has been received at the switching center from an outlying station and that the message is addressed to station B connected to line circuit #2, the tape will have the following records thereon starting from the leading end: a plurality of "letters," a symbol for the switching center, which already has been assumed to be the letters NY, a space, a symbol for the message initiating station, which will be assumed to be the letter A, then a space, then the message number, then a space, then the symbol for the message receiving station which may be assumed to be the letter B, then a space followed by the message, which in turn is followed by a plurality of feedout "letters" combinations.

When the message has been completely received the tape is torn off at the recorder and the leading end of the tape is inserted in the transmitter 840. The sixth pin contacts 848 close.

As at the outlying station a plurality of nonlocking start keys and a locking stop key are provided. As shown in the drawing, the start key 871 is the "number" key which will cause the numbering circuit to function for the insertion of channel identification and message numbering. The key 873 is the "no number" key, which also will start the sending machine but will omit the channel numbering. If desired, a "repeat number" key may also be provided and connected for control of the "repeat number" relays 1822 in the numbering circuit. The stop key 874 is connected to open the operating circuit for the start magnet 852 and is also connected to the start keys for the purpose of preventing accidental starting of circuit functions, while the stop key is operating, the circuit details being substantially similar to those described in connection with the outlying station.

Assume for the purposes of the following detailed description that line #2 is idle and that its cross-connection points with the broadcast board as well as its service position in the service board are in normal or idle condition, as shown in the drawing.

Also assume that the message to be retransmitted is to be preceded by channel numbering, in which case the start key 871 will be temporarily operated.

The closing of the sixth pin contacts 848 extended ground from relay contact 631*e* and conductor 694 to conductor 694*a* and over break contact of key 874 to the *a* contacts of the start keys; this same ground was further extended from conductor 694*a* to the locking contact *b* of relay 875 and further to the locking contacts *c* of relay 1041 and further over the relay contacts 1022*k* and 1023*g*, conductor 1899 over the open relay contacts 1832*f* to the winding of relay 1815; relay 1815 does not operate at this time because the contacts *f* of relay 1832 are open; relay 1815 will not be operated until relay 1832 closes its contacts *f* upon completion of the function of the numbering circuit, as described in connection with the outlying station.

When now the key 871 is operated, the holding ground will be extended over its contact *a* through the winding of relay 1041 which operates and locks itself to the holding ground on conductor 694*a*.

Relay 1041, operated, at its contacts *d* opens the operating circuit for relay 875 thereby insuring against accidental operation of this relay by the "no number" start key 873.

Relay 1041, operated, at its contacts *a* prepares a locking circuit for relay 1042, and at its contacts *b* closes an operating chain circuit for relay 1042, as follows: from minus over relay contacts 1023*e*, left-hand operating winding of relay 1042, the contacts *b* of relay 1041, conductor 1092, passing over normally closed relay contacts 1311*a* and 1611*a* and other similar contacts in the cross-connection circuits for the different broadcast levels, conductor 1092*a*, relay contacts 1031*a*, conductor 1092*b*, relay contacts 351*c* normally closed, relay contacts 352*d*, conductor 1091*a* and through normally closed relay contacts 1621*d* and 1321*d* and through other similar contacts in other cross-connection circuits for other broadcast levels over conductor 1091 and relay contacts 1042*g* to ground. In this circuit relay 1041 is operated by its left-hand operating winding and is locked over its make contact *g*, closed relay contact 1041*a*, through its right-hand locking winding before the operating circuit for its left-hand winding is opened by the removal of ground at its break contact *g*.

A sequence chain circuit is provided in each line equipment whereby a certain preference is established according to which some portions of a line equipment may be started for operation before other portions when access to a busy line circuit is desired. For line #2 the sequence chain circuit has just been described for the operation of relay 1042. Further details of this sequence chain circuit and its operations will be described hereinafter.

Relay 1042 at its contacts *a* prepares an operating circuit for relay 1043 over conductor 1890 to the normally open grounded contact of relay 1838; relay 1838 is normally operated over relay contacts 1832*a* until the numbering circuit has completed its function. Relay 1043 thus will not be operated at this time.

Relay 1042 at its contacts *d* extends ground over conductor 698 through the winding of relay 641 which operates.

Relay 1042 at its contacts *f* completes a circuit which may be traced from ground over universal contacts 857 of the distributor 850, conductor 1898, relay contacts 1871*a*, conductor 1898*a*, contact *f* of relay 1042, conductor 1898*b*, break contact *a* of relay 875, conductor 1891, over break contacts *e* and through the winding of number relay 1821 to minus. The number relay 1821 operates in this circuit.

Relay 1042 at its contact *e* extends ground through the winding of relay 1031 to minus. Relay 1042 operates Relay 1821, when operated, prepares the numbering circuit in the manner described for the outlying station. The relay locks itself over its contact *e* to conductor 1894 and relay contact 1042*c* to ground. Relay 1821 also locks itself over its contact *f* to ground at relay contact 1832*i*. Relay 1821 over its contact *d* extends the control ground to the armature of polar relay 1810 and also extends holding ground to holding conductor 1895.

Feed-out relay 641 operated, locks itself to the holding conductor 1895 and over its contact *d* operates relay 642. The feed-out relay 641 at its contact *a* removes minus from conductor 897 leading to the tape withholding magnet 843 of the transmitter 840; this magnet however remains energized over conductor 897, 1897 and contacts *g* of relay 1832 until the numbering circuit has completed its function, so that the tape-feed mechanism of the transmitter 840 will remain inactive during the transmission of the channel numbering, as described for the outlying station. Relay 641 also applies negative potential to the grid of the normally conducting tube 652 thereby rendering the tube non-conducting and causing polar relay 651 to operate to spacing and close the locking circuit for relay 642 over conductor 696, relay contacts 352*e*, conductor 695*a*, relay contacts 631*a* and 642*b*. When relay 642 operated, it connected the timing condenser 654 to the grid circuit of tube 652. The tube 652 is similar to the tube 2052 in the outlying station and the entire feed-out circuit operates substantially as described for the outlying station. Thus the feed-out circuit is preconditioned at this time for its subsequent feed-out control. The main function of the feed-out circuit at this time is to extend ground over relay contact 642*c*, conductor 896*b* over two multiple paths, one extending over relay contact 1042*b*, conductor 896*a*, contacts *b* of stop key 1874, conductor 896 and through the winding of start magnet 852 to minus, and the other path extending over conductor 1896*a*, relay contacts 1832*h*, conductor 1896 through the winding of start magnet 852 to minus.

The start magnet 852 is energized and releases the distributor 850 for rotation. It will be noted that while the distributor is still in stop position the ground from universal contacts 857 is extended over conductor 1898 to the operating winding of polar relay 1810 which thus is normally held in marking position. When now the universal contacts open, relay 1810 will operate to spacing and the relay will follow the openings and closings of the universal contacts during the continued rotation of distributor 850 for control of the numbering circuit shown in Figs. 17 and 18 and the repeat character circuit shown to the left in Fig. 18, as described for the outlying station. Thus, the numbering circuit in Figs. 17 and 18 will first transmit a series of "space" combinations, then the channel identification symbols and then the message number in the manner described for the outlying station. The transmission circuit for all these combinations may be traced as follows: Outgoing conductor 301, relay contacts 352*a*, winding of polar relay 330, conductor 301*a*, the selector magnet 831 of the monitoring reperforator 830, conductor 301*c*, spacing contacts of polar relay 1010, conductor 1701, over the lower contacts of the variously selected numbering relays 1750 to 1759, the group of conductors 1706, the distributor segments I—V, brush 851, conductor 302*a*, contacts *a* of break key 635 to outgoing conductor 302.

When the last number digit has been transmitted and the distributor 850 passes through its stop position the ground from universal contacts 857 is extended over the marking contact of relay 1810 and the make contact *c* of relay 1831 through the winding of relay 1832 to negative battery. Relay 1832 operates and disables the numbering circuit, as described for the outlying station.

Relay 1832 at its contact *f* extends the locking ground on the universal contacts 857 to the winding of relay 1815 which operates and opens the bridge across the transmitting contacts of transmitter 840. It may be noted at this time that due to the short circuit of the transmitter contacts by relay 1815, the accidental setting of the sensing pins in accordance with the punchings in the tape will not interfere with the numbering signals. At relay contact 1832*g*, minus is removed from conductors 1897 and the tape withholding magnet 843 which deenergizes and thereby permits the tape-feed mechanism to become active during the next succeeding rotation. At relay contact 1832*h* the second multiple path traced above from ground at relay contact 642 to the start magnet 852 is opened; the first multiple path over the contacts *b* of stop key 874 and over relay contacts 1042*b* remains closed, so that the distributor will continue its rotation. At relay contacts 1832*b* the control ground is disconnected from the armature of polar relay 1810, so that the subsequent responses of this relay to the continued operations of the universal contacts will have no effect. The relay contacts 1832*a* open the operating circuit for relay 1833 which now commences to release. This relay is slow releasing to permit the distributor to come to a full stop before effecting its circuit changes.

Relay 1833, released, extends ground over its contact *a*, conductor 1890, operated relay contacts 1042*a* through the winding of relay 1043 to minus. Relay 1043 operates and locks itself directly to conductor 1890 and thus remains operated until the message has been completely sent, at which time relay 1832 in releasing reoperates relay 1833 which in turn removes the holding ground from conductor 1890 and relay 1043. Relay 1043 operated, at its contacts *a* and *b* open operating circuits related to the broadcasting equipment for purposes which will be described hereinafter, one principal object being to prevent a broadcasting message from interfering with the local message which is in course of transmission.

With the bridge across the transmitting contacts opened by the operation of relay 1815 and with the code relays 1750 to 1759 remaining unoperated, the message will now be transmitted over the following transmission path: Outgoing conductor 301, relay contacts 352*a*, winding of relay 330, conductor 301*a*, spacing contacts of relay 1010, conductor 301d, transmitting contacts I—V, the group of conductors 1705, over the upper closed contacts of the code relays 1750 to 1759, and the group of conductors 1706, distributor segments I—V, brush 851, conductor 302a, key contacts 635a and outgoing conductor 302.

When the message has been completely transmitted the end of the tape passes out of the transmitter 840 thereby permitting the 6th pin contacts 848 to open and remove the locking ground at relay contact 631f from the holding contacts of relay 1041 and from the operating winding of relay 1815. Relay 1815 releases and restores the bridge across the transmitting contacts.

Relay 1041, released, at its contacts a and b, opens the operating and locking circuits for relay 1042 which releases; at contacts d the operating circuit for relay 875 is restored for purposes which will be described hereinafter.

Relay 1042, released, causes the following circuit changes: At contact f the operating circuit for relay 1821 is opened; at contact c the only remaining locking circuit for relay 1821 is opened, thereby releasing relay 1821. At contact d, the operating circuit for relay 641 is opened; at contact e the operating circuit for relay 1031 is opened; at contact g the preference chain circuit through the broadcasting levels is restored for the operation of relay 1042 in response to a subsequent message.

When relay 1821, released, it removed the holding ground from holding conductor 1895 thereby releasing relay 1832, relay 1031 and feed-out relay 641.

The release of 1832 restores the numbering circuit in Figs. 17 and 18 to normal with relay 1833 reoperated. At relay contacts 1832g minus is applied over conductor 1897 to the tape withholding magnet 843, which again renders the tape-feed mechanism inoperative; minus is also extended to magnet 843 from contact a of relay 641, released. The start magnet 852 was temporarily deenergized by the opening of the first multiple path referred to above at relay contact 1042b; this magnet will be reoperated during the current revolution over the second multiple path by the closing of contacts h of released relay 1832. The distributor 850 therefore continues its rotation.

Relay 641 released, removes negative potentials from the timing circuit 653, 654 and condenser 654 begins to charge.

In the meantime the distributor 850 continues to rotate and send "letters" combinations over the upper contacts of the code relays 1750 to 1759 and into the outgoing line 301, 302. After about 42 revolutions of the distributor the condenser 654 will have acquired a potential sufficiently positive to render the tube 652 conducting for operation of polar relay 651. Thus relay 651 opens the locking circuit for relay 642 which releases and at its contact c removes the ground from the two multiple paths leading to the start magnet 852. Magnet 852 is deenergized and stops the distributor.

The entire operating circuit for line 2 thus is restored to normal.

The transmission of a message from the transmitter-distributor 840, 850 may be interrupted by the operation of the stop key 874, as described for the outlying station. While the stop key is operated the tape may be removed or reset without restoration of the line circuit by the opening of the 6th pin contacts 898; the start keys are also rendered ineffective, as described for the outlying station.

*d. Message with no number.*—In the case of an incoming message which is to be retransmitted to an outlying station without being preceded by channel identification and message numbering the tape will be inserted in transmitter 840 as before but in this case the no number start key 873 will be operated. Thus, a circuit may be traced from the locking ground at relay contact 631e, conductor 694, 6th pin contacts 848, conductor 694a, break contacts a of stop key 874, contact a of no number key 873, relay contact 1041d and through the winding of relay 1075 to minus. Relay 1075 operates and locks itself over its contact b to the locking ground on conductor 694a.

Relay 1075 operated at its contact c extends the locking ground from conductor 694a through the winding of relay 1041 to minus. Relay 1041 operates and locks as before and starts a similar series of operations as in the case described above when the start key 871 was operated. The only difference in the two cases is to be found in the circuit change caused by the operation of contacts a of relay 875, where the conductor 1891 leading to number relay 1821 is disconnected from conductor 1898b leading to the universal contacts 857 and ground, and is replaced by conductor 1893 leading to the no number relay 1823. Thus, upon operation of relay 1042 and the closure of its contacts f relay 1823 will be operated which, as described for the outlying station, will start the repeat character circuit. Upon completion of the repeat character function the make contact a of relay 1823 will cause the operation of relays 1831 and 1832 and thereby prevent further operation of the numbering circuit, as described for the outlying station. The message will thereafter be transmitted, as described before, but without numbering and the circuit restored to normal after the feed-out operation at the end of the message. Relay 875 releases, when the 6th pin contacts 848 open at the end of the message properly.

Figure 6:
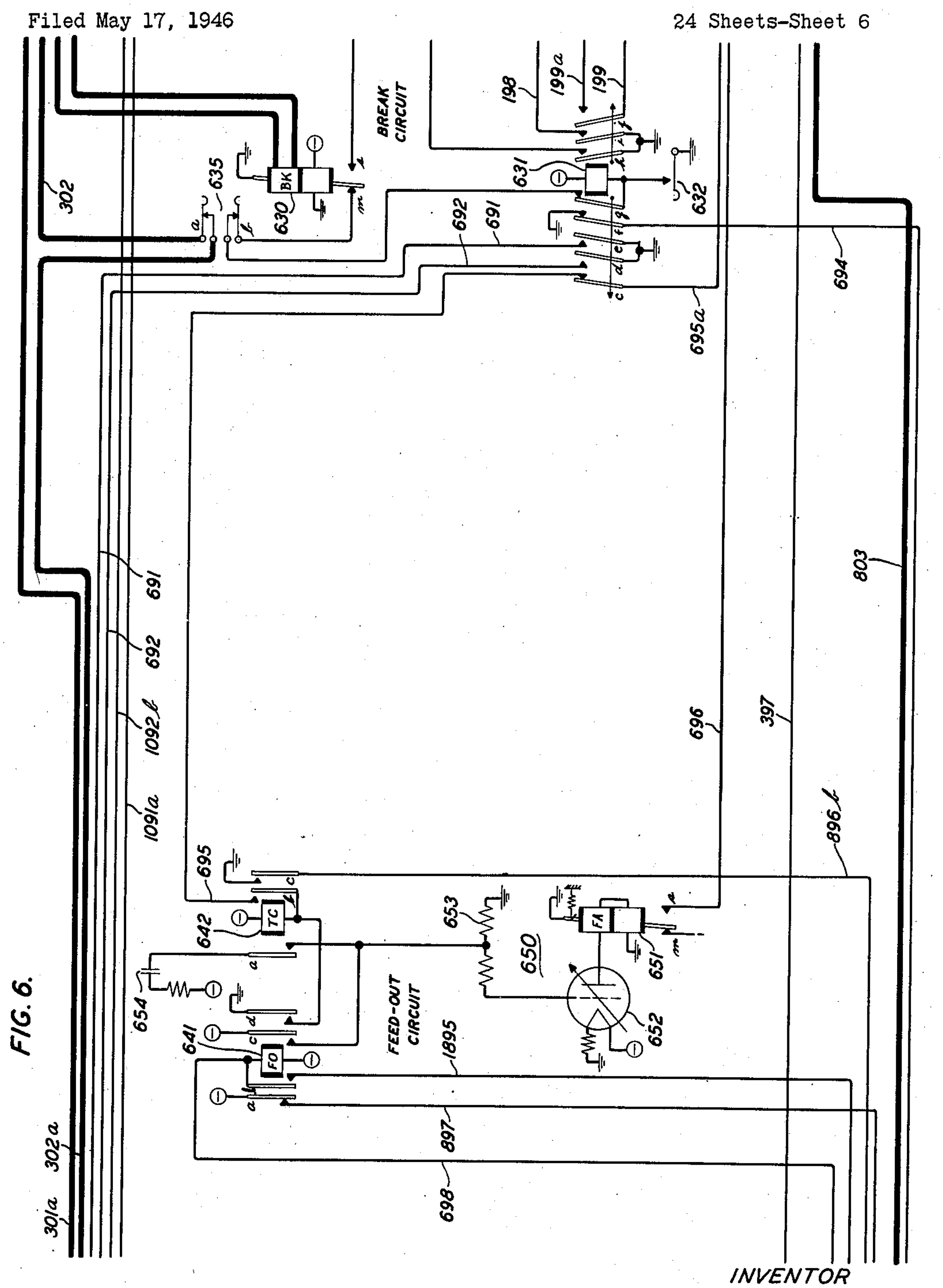
Figure 7:
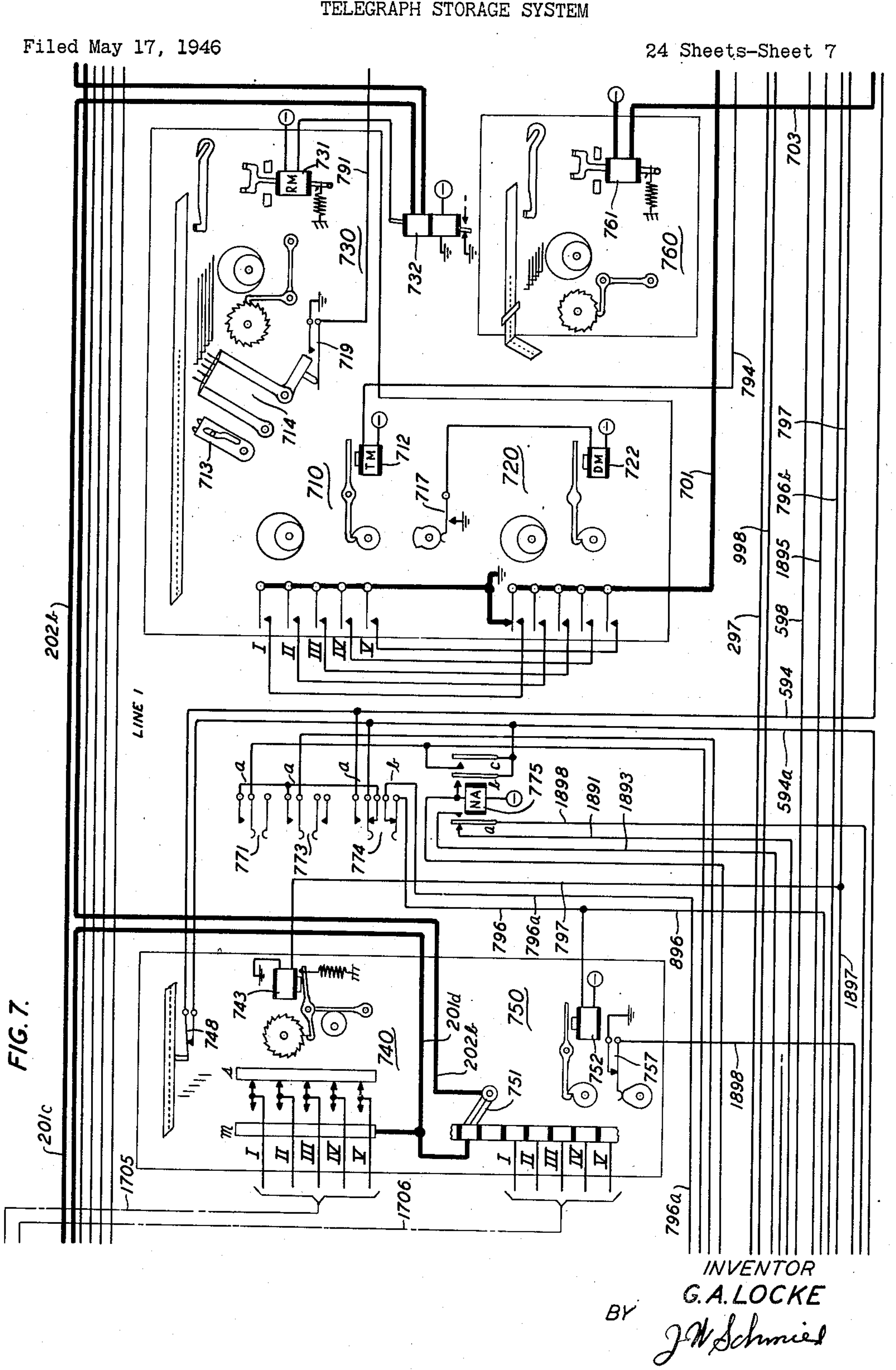

*e. Break signals.*—The break circuit shown to the right in Fig. 6 operates substantially as described for the outlying station. Thus, the break key 635 may be operated for sufficient time to bring the break circuit at the outlying station into action, while a message is incoming over conductors 303, 304. The operation of the break key 635 releases relay 631. Relay 631, released, has no significant effect upon the transmission circuit which is assumed to be idle at this time. However, at its contacts h steady ground is directly connected to the receive flash lamp 378, which will show a steady signal. Steady ground will also be applied over contacts i, conductors 198 to light the common break lamp 185. An alarm circuit may also be closed from minus over key 181, in closed condition, through buzzer 180, conductor 199, contact j of relay 631, conductor 199a to ground at 182. These signals serve to draw attention to the fact that the break circuit in Fig. 6 is in abnormal condition. To restore the circuit to normal condition the key 632 is momentarily operated to operate relay 631. Relay 631 operated, locks itself over the marking contact of break relay 630 to ground and thereby extinguishes the various signals and restores the control circuits for the sending equipment of line #2.

In the case of an incoming break signal arriving over conductors 303, 304, to the break relay 630 while line #2 is sending, relay 630 will open its marking contact long enough to permit relay 631 to release. In this case the same signals will be lighted on the service board and the left-hand contacts of relay 631 will variously effect the control circuits in line #2. Thus, the locking ground will be disconnected at contacts *f* from the 6th pin contacts causing relay 1041 to release; and in case relay 1815 is operated after the numbering has been transmitted, this relay will also be released. At contacts *d* and *e* ground is applied to conductors 691, 692 for impressing the break condition upon the broadcast levels, as will be described hereinafter. At contacts *c* of relay 631 the locking circuit for relay 642 is opened.

If the break signal arrives while the numbering circuit is functioning relay 641 will still be locked up over the holding conductor 1895 to the holding ground either on relay 1821 or relay 1823; the release of relay 1041 by the break signal and the consequent release of relay 1042 will have no significant effect at this time. The distributor will continue operating, the second multiple path for the start magnet 852 remaining closed at relay contacts 1832*h* until the numbering circuit has completed its function. Once the numbering circuit has completed its function the release of relays 1041 and 1042 will cause relays 1821 or 1823 to release, which will remove the holding ground from conductor 1895 thereby in turn releasing relay 641 and then relay 642. Relay 642 at its contacts *c* removes the operating ground from both multiple paths to the start magnet 852, which deenergizes and stops the distributor before transmission of the message. As will be described hereinafter, a two-way back and forth transmission may now be carried on between the service position and the outlying station, whereupon the transmission from transmitter-distributor 840, 850 may be resumed, for example, with the tape reset for repetition of parts or all of the already transmitted portion of the message. For this purpose, relay 631 will be reoperated by means of key 632 thereby extinguishing the break signals and restoring the control circuits for line #2. Thereafter the no number start key 873 should be operated which causes the repeat character circuit to send a series of "space" combinations; upon completion of this function the transmitter will start sending the message from the resetting point.

*f. Half-duplex operation.*—Line #1 is arranged for half-duplex or full-duplex operation as desired. With the key 410 in the transfer circuit, shown in Fig. 4, in its normal position, line #1 is conditioned for half-duplex operation. When the key is operated the transfer circuit will condition line #1 for full-duplex operation.

Figure 5:
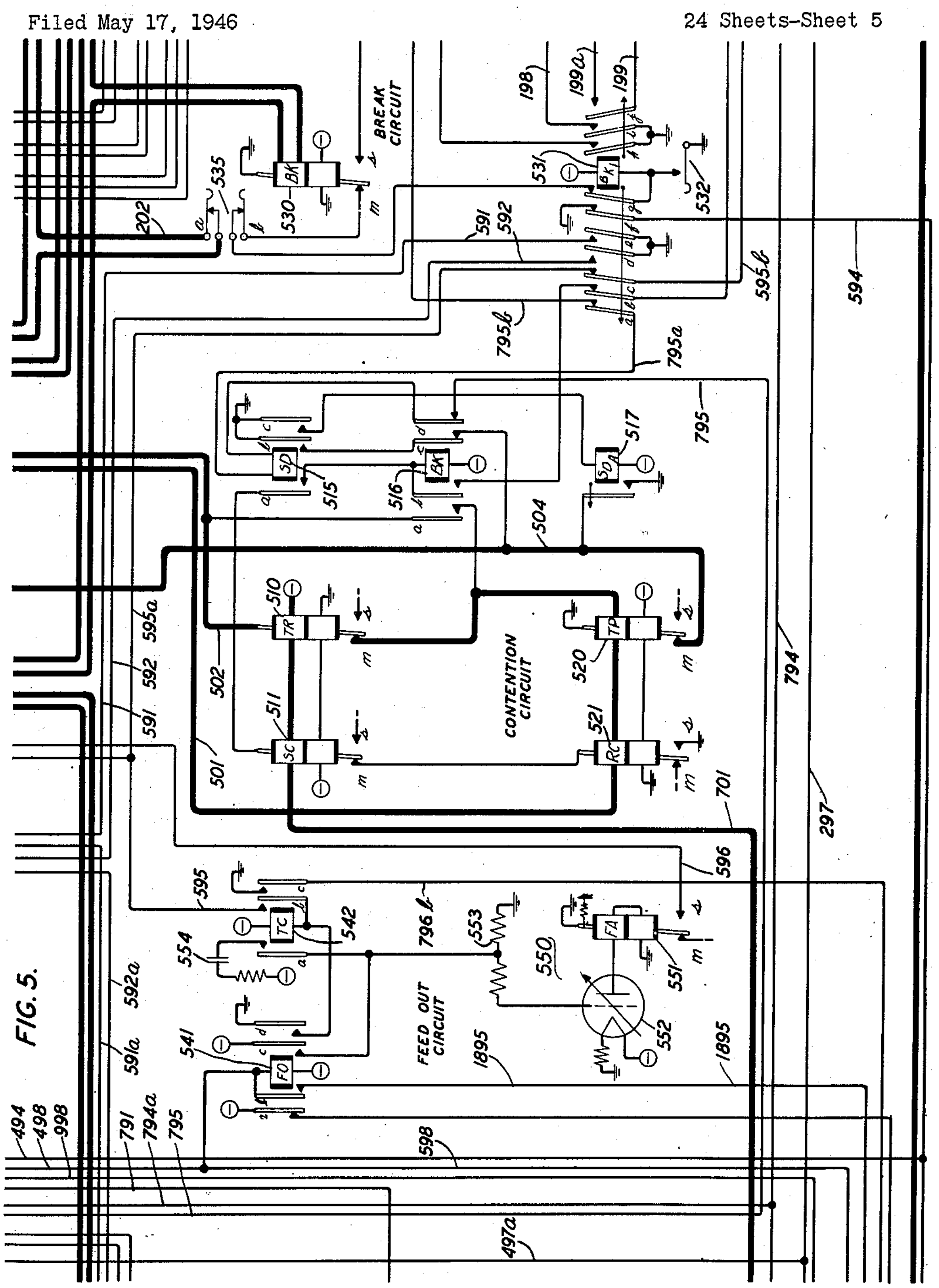

With the circuit in the condition shown in Figs. 2, 4, 5 and 7 the outgoing conductors 201, 202 are connected over the transmission channel to the outlying station with the channel designation A. The incoming conductors 203, 204 may or may not be connected over the channel to the outlying station, but they will not be used in half-duplex operation. Thus, incoming and outgoing messages will pass in alternation over the conductors 201, 202. It is therefore necessary to take precaution against interference between incoming and outgoing messages. For this purpose a circuit contention equipment, as shown in the center of Fig. 5, is provided so that an incoming message may be received and recorded on the typing reperforator 760 whether or not an outgoing message is in the course of transmission. The monitoring machine 730 which records all outgoing messages on a tape for monitoring purposes is combined with a transmitter-distributor 710, 720 so that, when an incoming message interrupts the transmission of an outgoing message, the outgoing message will be stored on the tape between the receiver 730 and the transmitter 710 until the incoming message has been completely received, whereupon the transmitter-distributor 710, 720 will retransmit the stored message through the contention circuit in Fig. 5 to the outgoing conductors 201, 202.

The elements 710, 720 and 730 are combined into a single integrated machine. As already stated, the details of this machine are disclosed in prior patents, but for the purposes of more graphically illustrating the invention, certain mechanical elements of this machine are shown in the drawing.

Thus the typing reperforator 730 includes the selecting magnet 731 which controls the selection of type bars and punch levers and starts the rotation of the reperforator; the tape is fed out automatically once for each character. The transmitter 710 has its own starting clutch and start magnet 712 and is equipped with a special tape-feed mechanism indicated at 713. The sensing pins are mounted in a rocker or cradle indicated at 714 and the arrangement is such that the row of sensing pins and the row of tape punches are normally brought close together so that the last row of punchings produced by the punching pins will be aligned with the sensing pins after the last advance of the tape by the tape-feeding mechanism in the recorder 730, thereby insuring that the last signal combination punched by the recorder 730 will be sensed and retransmitted immediately. In order to permit storing of tape between the punching pins and the sensing pins when the transmitter 710 is stopped, the cradle 714 with the sensing pins is mounted so that, as the tape is being advanced by the recorder 730 at the beginning of a message, the cradle and the tape-feed 713 will be pushed away from the punching pins through a small angle, sufficient to provide space for the formation of a bight in the tape and, when necessary, permit storage of considerable tape between the reperforator and retransmitter elements. When the cradle 713 is moved out of its normal position close to the punching pins the contacts 719 will close. As the transmission proceeds feed-mechanism 713 and cradle 714 remain in position away from the punching pins until the recorder 730 stops, at which time the transmitter will use up the tape stored between the two sets of pins and, when the tape becomes taut, the feeding device 713 by its normal feeding action will cause the cradle to "climb up" the tape, step-by-step to its normal position with the sensing pins sensing the last row of punchings in the tape; in this position the contacts 719 will again open. The distributor 720 has its own starting clutch and start magnet 722 which is controlled once during each revolution of the transmitter 710 by the contacts 717 in the transmitter. The transmitter and distributor contacts I—V are cam-operated and are directly interconnected. The stop segment in the distributor is normally grounded thereby applying the marking ground to the retransmission circuit 701 for the stop pulse.

Figure 8:
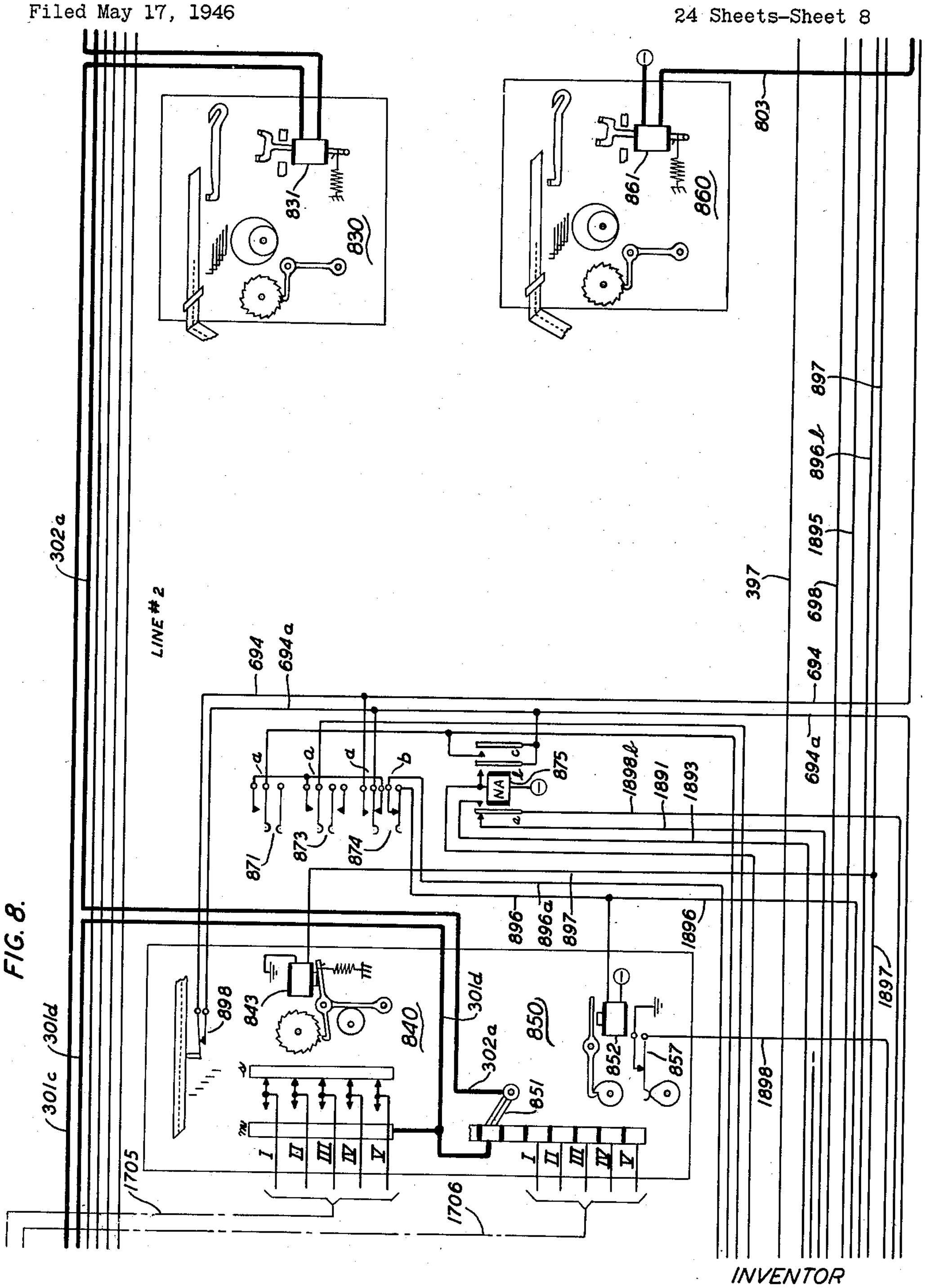
Figure 9:
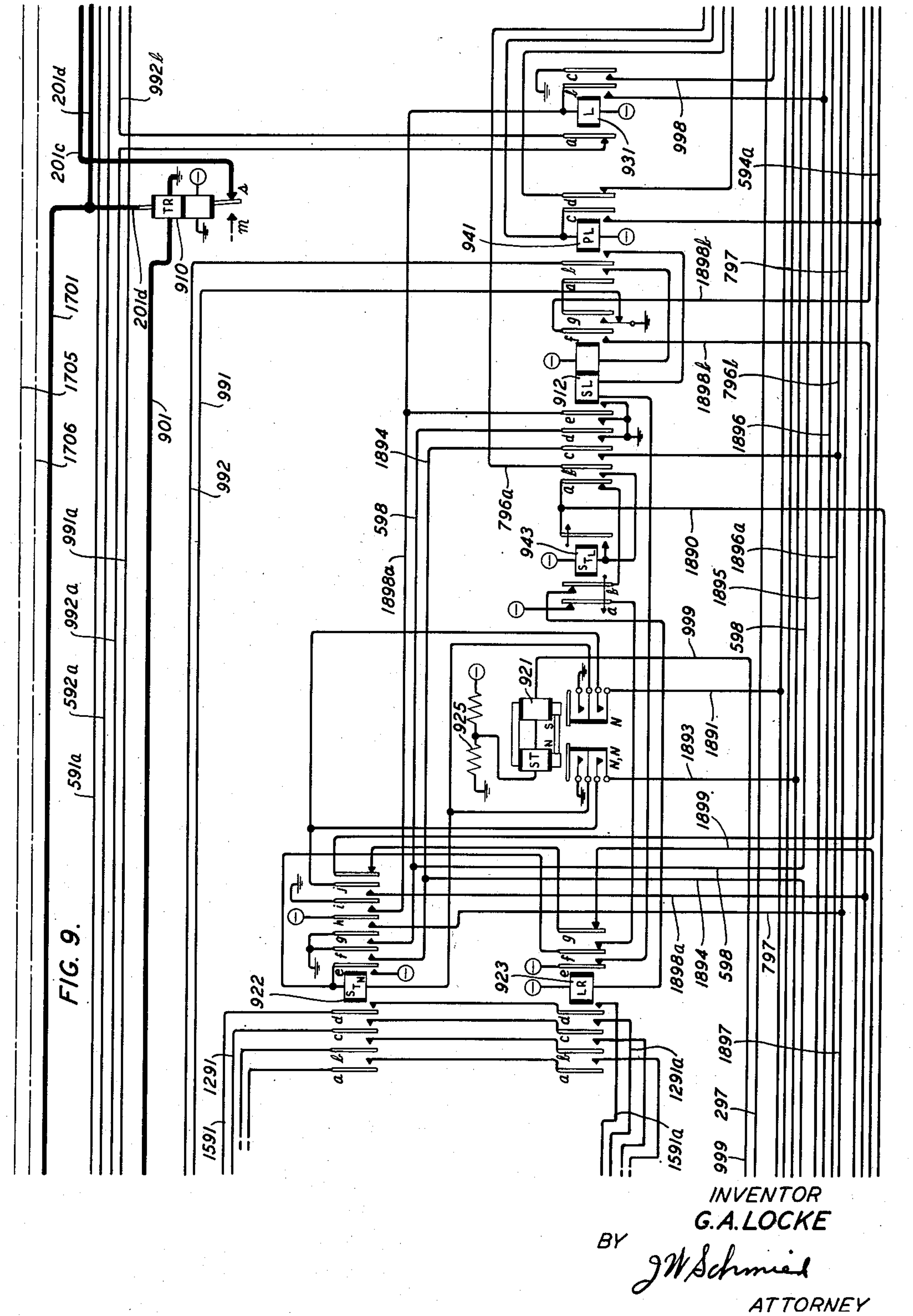
Figure 10:
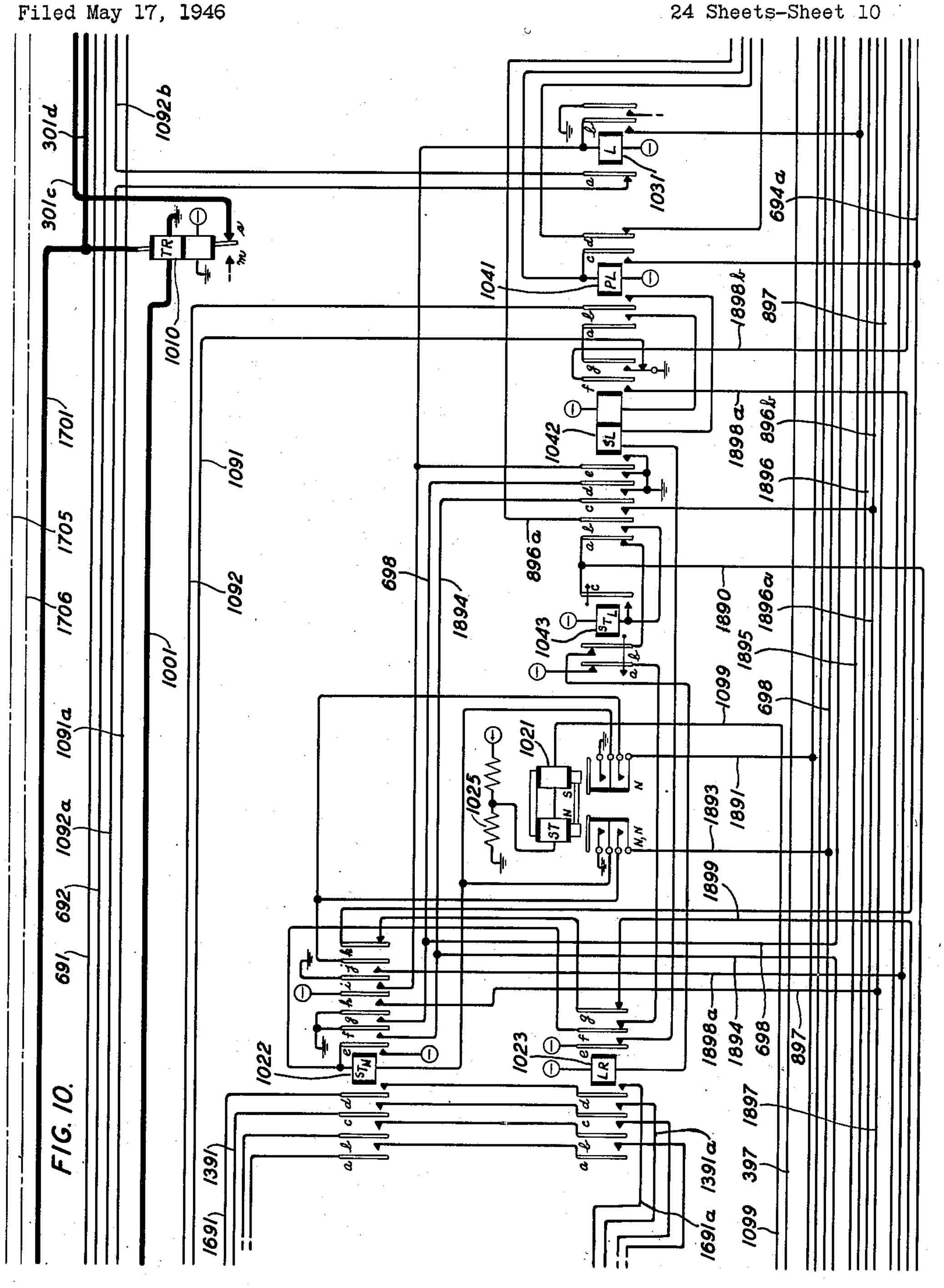

The transmitter-distributor 740, 750 and the start keys 771, 773 and stop key 774 are similar to the corresponding elements shown in Fig. 8 for line #2. The receiving typing reperforator 760 is similar to the machine 860 for line #2.

Figure 2:
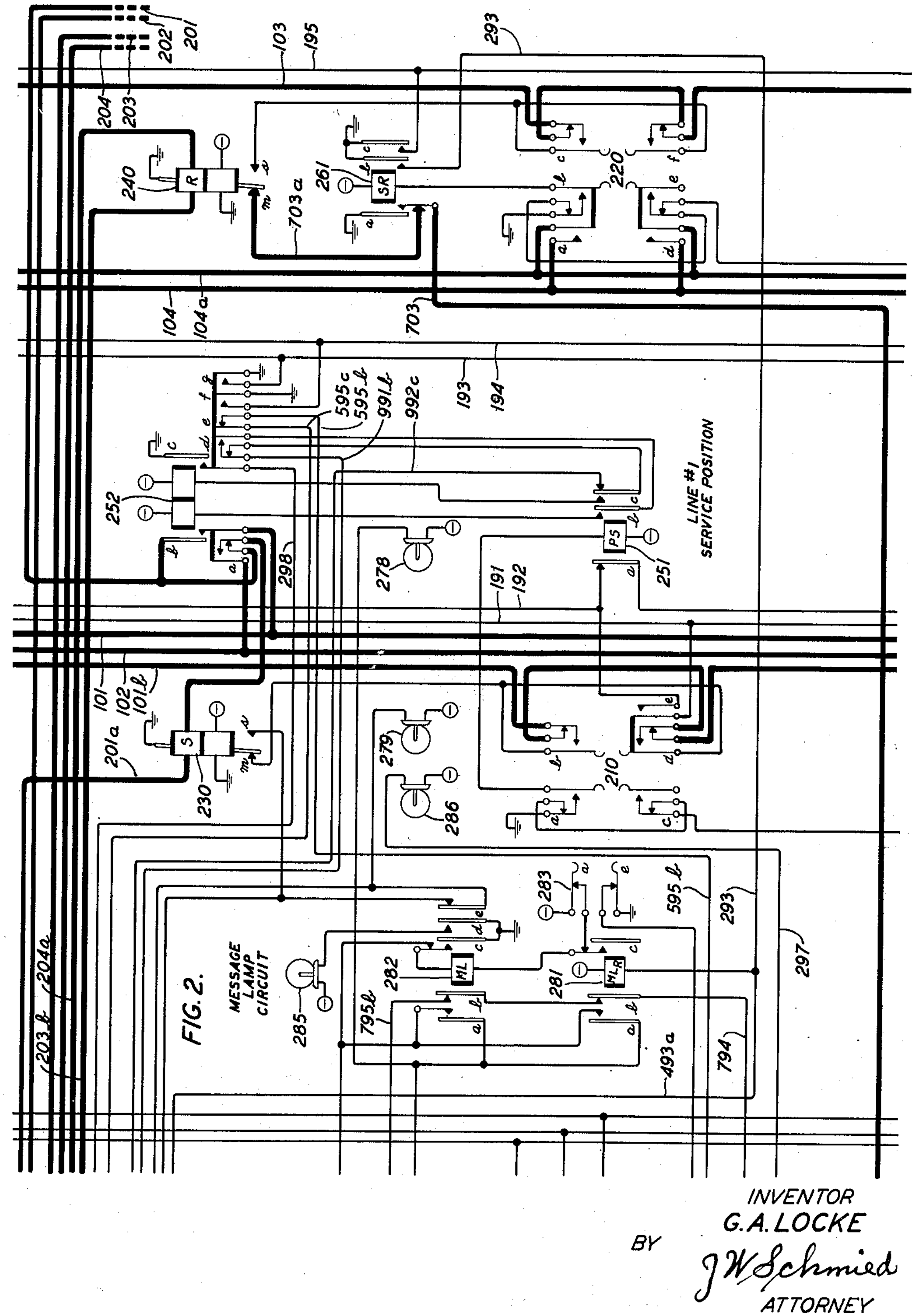
Figure 3:
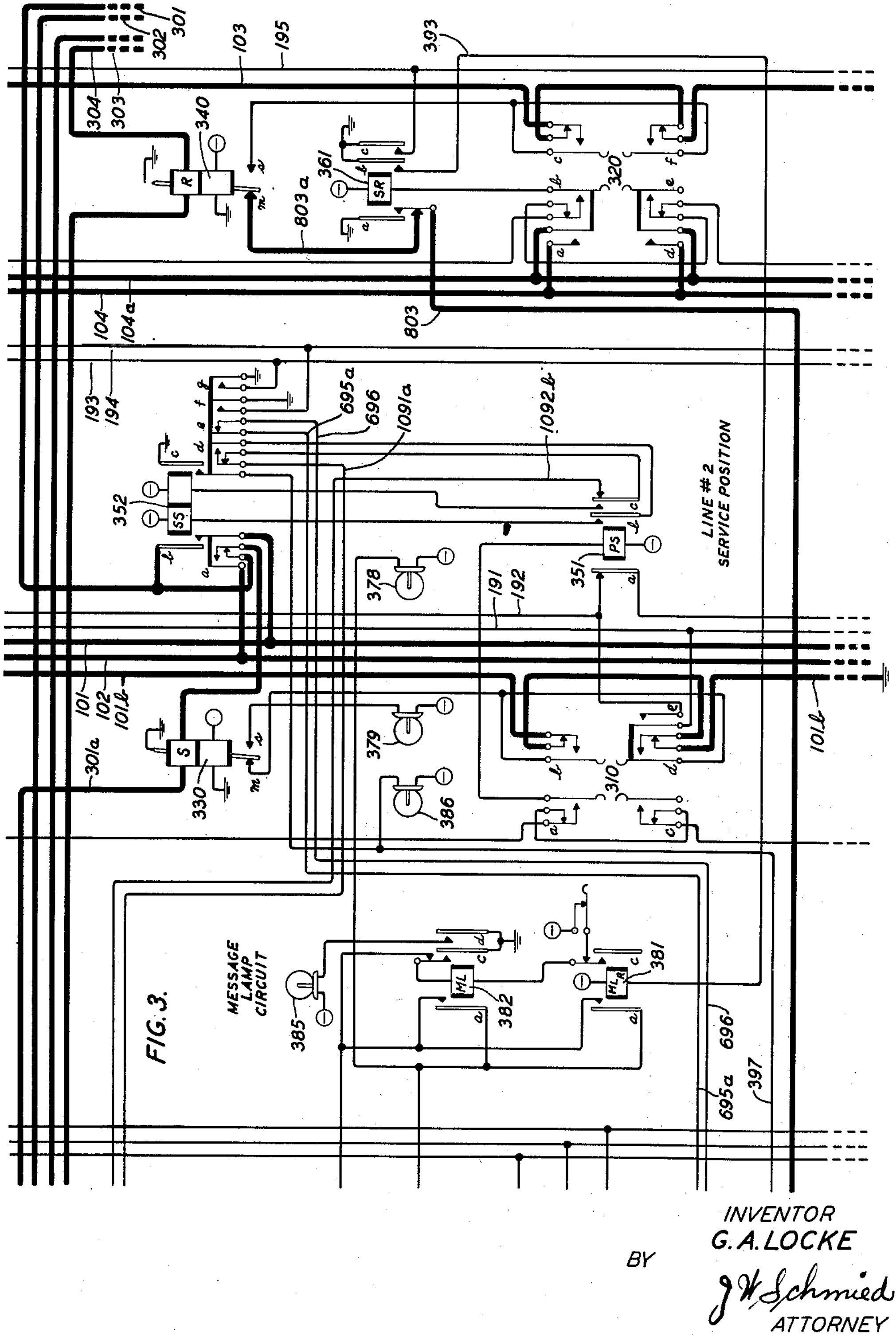

Line #2 is equipped with a feed-out circuit and a break circuit, shown in Fig. 5, similar to those shown in Fig. 6 for line #2, which in the case of full-duplex operation will operate substantially as described for line #2, but which are somewhat modified in their function under half-duplex operation, as will be described hereinafter. The message lamp circuit in Fig. 2 is substantially similar to that shown in Fig. 3 for line #2.

*g. Half-duplex receiving.*—It will be assumed that line #1 is idle and is conditioned for half-duplex operation. It will further be assumed that the service board and the broadcast levels are in normal idle condition.

An incoming message arriving under these conditions over outgoing conductors 201, 202 will traverse the following circuit: Outgoing conductor 201, break contacts *a* of relay 232, operating winding of polar relay 230, conductor 201*a*, relay contacts 413*c*, conductor 501, operating windings of polar relays 521 and 520, marking contacts of polar relay 510, conductor 502, relay contacts 413*d*, conductor 202*a*, key contacts 535*a* and outgoing conductor 202. In this circuit the polar relays 230, 521 and 520 will respond to the signals. For a simplified showing of this transmission path reference may be had to Fig. 26.

Every time relay 230 operates to spacing ground will be applied over the spacing contact and relay contacts 282*e* to the send flash lamp 279 which will flash.

Relay 521 has no significant function at this time.

Relay 520, in responding to spacing pulses, removes the marking ground from a circuit that may be traced from the marking contact of relay 520, conductor 504, relay contacts 412*f*, conductor 204*a*, operating winding of polar relays 240 and 530, conductor 203*a*, relay contacts 412*e* to minus. Thus, the incoming signals will be repeated to the receiving relay 240 and the break relay 530. The receiving relay 240 in turn repeats the signals over its marking contacts, relay contacts 261*a*, conductor 703 to the selecting magnet 761 in the receiving reperforator 760 for recording and storing of the message in the tape. The break relay 530 during signaling keeps slow-release relay 531 energized unless a long break signal is received. The break relay at its spacing contact causes the operation of relay 282 which locks itself directly over its own contact *c*.

Relay 282, operated, at its contact *d* applies ground to the message lamp 285, which lights steady, at its contact *e* extinguishes the send flash lamp 279, and at its contact *a* lights receive flash lamp 278 from ground at the spacing contact of relay 530.

The circuit remains in this condition until the message has been completed, the message lamp serving to notify the operator at the service board that a message is incoming from line #1 which is to be retransmitted from the service center.

At the end of the message a series of feed-out "letters" combinations will be received so that the tape may readily be torn off on the machine 760. Thereafter the polar relay 530 stops operating while relay 282 remains energized, and the receive flash lamp 279 is extinguished, indicating to the operator that the message has been completed and is waiting. Upon removing the tape from the recorder 760 the operator operates key 283 thereby extinguishing the lamp 285. The receiving circuit then is fully restored to normal.

*h. Half-duplex sending.*—It will now be assumed that a message has arrived at the switching center addressed to station A on line #1; it will further be assumed that the service board and the broadcasting levels are idle.

The operator may insert the tape in the transmitter 740 and operate the start key whether or not line #1 is busy receiving an incoming message.

First assuming that line #1 is idle the effect of closing the 6th pin contacts 748 and the start key is substantially the same as described for line #2. Thus the numbering circuit will be started and the feed-out circuit conditioned in the same manner and the repeated character "space" followed by channel line identification and message numbering will be transmitted over the distributor 750 into the monitoring recorder 730. This local transmission circuit for marking pulses may be traced from minus over relay contacts 412*c*, conductor 201*b*, polar repeating relay 732, conductor 201*c*, spacing contact of polar relay 910, conductor 1701 to the lower contacts of code relays 1750 to 1759, the group of conductors 1706, distributor segments I—V, brush 751, conductor 202*b*, relay contact 412*d* to ground. In this circuit the repeating relay 732 repeats the signals into the selecting magnet 731 for the monitoring recorder 730 and the message will be recorded on the tape.

Figures 25, 26:
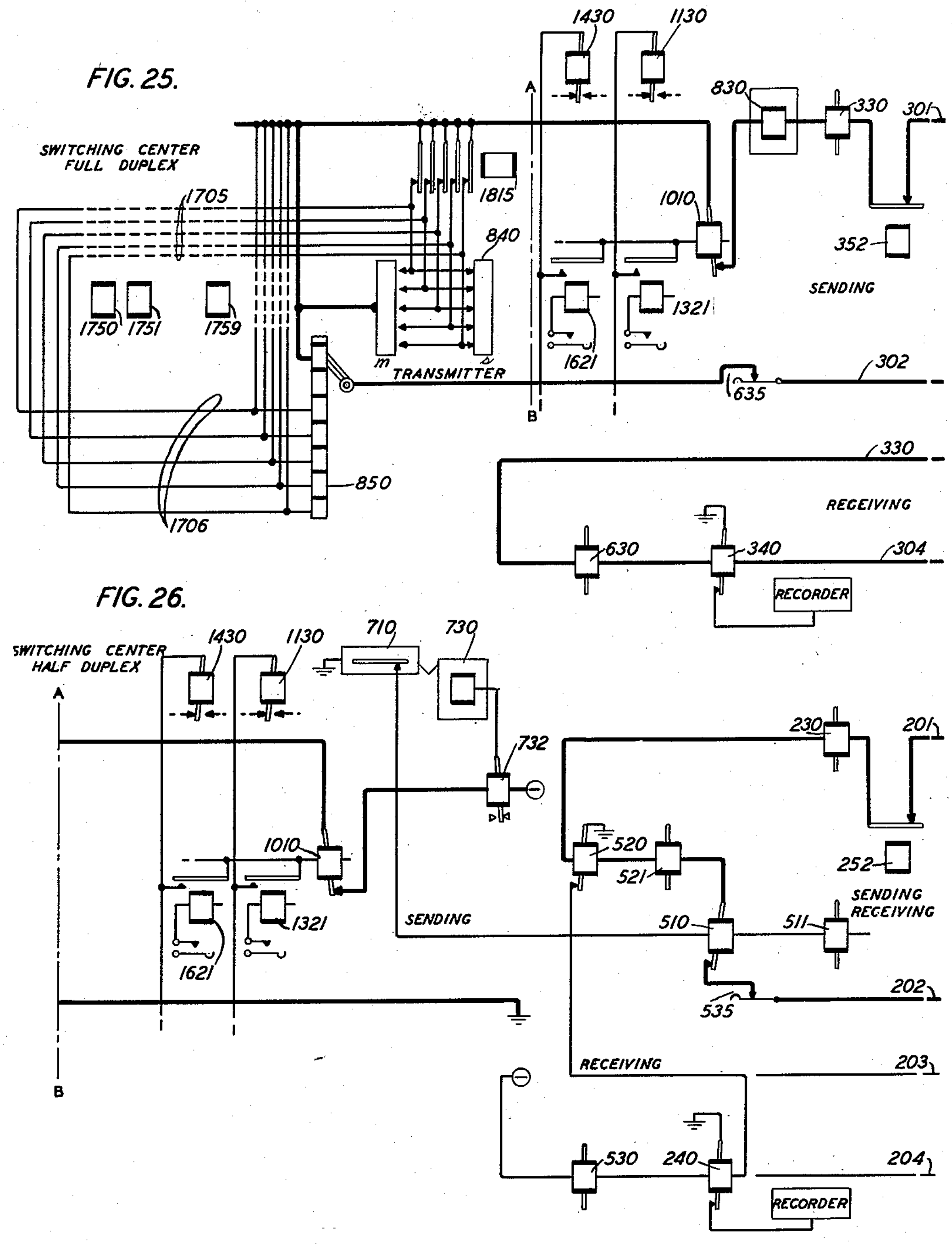

For a simplified diagram of this transmission path reference may be had to Fig. 26. In this figure only the portion to the right of line A—B has been shown. The circuit may be completed by adding at the left of line A—B the identical portion shown to the left of line A—B in Fig. 25.

As soon as the tape in recorder 730 is advanced one step the cradle 714 will be moved a corresponding distance and cause the contacts 719 to extend ground over conductor 791 to relay 422 which operates.

In case the transmitter is not started the cradle will be moved its full distance to the left and thereafter the tape will form a loop between the two machines. In case the transmitter does start immediately, the tape feeds of the two machines will cause the rocker or cradle 714 to rock back and forth and open and close contacts 719 for release and operation of relay 422. To limit this hunting movement between the two feed mechanisms the transmitting pace of the transmitter may be made slightly slower than that of the reperforator. Thus the cradle will move slowly to the left and, after the passing of a few signals, contacts 719 will remain closed and relay 422 operated.

Relay 422, operated, closes the start circuit which extends from ground over relay contact 422*a* and 421*b*, conductor 795, relay contacts 516*d*, winding of relay 515, conductor 795*a*, relay contacts 531*a*, conductor 795*b*, relay contacts 282*b* and 281*b*, conductor 794 to the start magnet 712 of the transmitter 710.

The transmitter 710 thus will be started and its speed may be controlled so that it barely keeps pace with the reperforator 730. For each revolution of transmitter 710, the contacts 717 will start the distributor 720. Thus, the outgoing message is retransmitted into a second local circuit from marking ground over the transmitter and distributor contacts in series, conductor 701 through the operating windings of polar relays 711 and 710 to minus. In this circuit polar relay 511 and 510 follow the signals and relay 510 repeats them into the outgoing circuit, which may be traced from outgoing conductor 201, relay contacts 232a, winding of polar relay 230, conductors 201a, relay contacts 413c, conductor 501, operating windings of relays 521 and 520, marking contacts of relay 510, conductor 502, relay contacts 413d, conductor 202a, key contacts 535a, to the outgoing conductor 202.

Relay 515 was included in the start circuit for magnet 712 in the transmitter 710 and therefore was operated when the transmitter was started. At the contact b of relay 515 ground is extended over relay contacts 516c to bridge the marking contact on relay 520; thus a steady ground will be maintained on conductor 504 extending to the receiving relay 220 and break relay 430 which relays consequently remain steady in marking during the outgoing message. Relay 515, when operated, also extends ground over its contacts c to operate relay 517, which also applies steady ground to conductor 504 independently of operations by relay 516, for purposes to be explained hereinafter. Relay 515, operated, over its contacts a extends an operating circuit for the operation of relay 516 over the marking contacts of relay 511 and spacing contact of relay 521; it will, however, be noted that relays 520 and 521 will be operating in fairly close unison with relays 510 and 511 during the transmission of an outgoing message, so that relays 511 and 521 will be in marking position together and in spacing position together except for the brief operating time of the quick polar relay 521. Relay 516 is of a type that is much slower in operation than the polar relays, and therefore is not able to attract its armature while the polar relays in the contention circuit operate undisturbed in unison.

At the time of the original starting of transmitter-distributor 740, 750 the feed-out circuit was conditioned, as already described for line #2, by the operation of relays 541 and 542 in response to the closure of relay contact 942d. Relay 541 locked to the holding conductor 1895.

At the time of starting, relay 931 was also operated over relay contact 942e and locked itself to holding conductor 1895. Relay 931 at its contacts c extended ground over conductor 998, to relay 423, which operated and locked itself over relay contact 422b.

Relay 423 operated, causes the operation of relay 424 over its contacts a without any significant effect at this time. Relay 423 opens the locking circuit for relay 542 which extends over contact b of relay 542, conductor 595, and over two multiple paths, one extending over relay contact 411h to relay contact 423d and the other extending over conductor 595a, relay contacts 531c, conductor 595c, relay contacts 252e, conductor 595c to the relay contact 423d, which now is opened, the said locking circuit extending beyond this contact over conductor 596 to the spacing contact of polar relay 551.

Relay 541, operated, applied negative battery to the grid of tube 552, which became non-conducting and caused relay 551 to operate to spacing without significant effect at this time. The feed-out circuit therefore is not conditioned to provide a feed-out interval.

When the numbering circuit shown in Figs. 17 and 18 has completed its function, the message proper will be transmitted by the originating transmitter-distributor 740, 750 in the manner described for transmitter-distributor 840, 850 in line #2.

At the end of the message the 6th pin contacts 748 open, thereby causing the release of relays 941, 942 and 931, which in turn restore the numbering circuit to normal.

With the ground removed from the holding conductor 1895, relays 541 and 542 release and the tube 552 immediately becomes conducting and operates relay 551 back to marking.

The circuit will now remain in this condition while the transmitter 710 catches up with the reperforator 730 and causes the tape to become taut, whereupon the cradle with sensing pins will begin to creep up on the tape toward the punching pins. When the sensing pins reach the last signal combination in the tape the contacts 719 will open, thereby releasing relay 422.

Relay 422, released, at its contacts a opens the operating circuit for start magnet 712 thereby stopping the transmitter 710 at the end of the current revolution. Relay 422 released, at its contacts b opens the locking circuit for relay 423 which releases, the operating circuit for relay 423 having been opened at contacts c of the released relay 931.

Relay 423, released, opens the operating circuit for relay 424, which is slow releasing so that ground will be temporarily extended over the contact of relay 424, contact b of relay 423, conductor 498a, relay contacts 411a, conductor 498 to the winding of relay 541, which now again operates long enough to render the tube 552 non-conducting and to operate relay 542. When relay 424 completes its release relay 541 is again released. However, by this time the previously traced locking circuit for relay 542 will have been completed by the return of polar relay 551 to spacing and by the closure of relay contacts 423d. The feed-out circuit is therefore conditioned for feed-out control.

While the timing condenser 554 is charging, relay 542 over its contacts c reoperates the start magnet 752 to start the originating distributor 750 for the transmission of the feed-out character "letters." With relay 541 released, minus is applied over contact a for the operation of the tape withholding magnet 743 which renders the feed mechanism inactive during the feed-out function.

The "letters" combinations are recorded on the monitoring reperforator 730 with the result that the cradle 714 will move away from the punching pins and again close the contact 719 for reoperation of the start relay 422. Relay 422, at its contact a, again operates start magnet 712 for starting the transmitter-distributor 710, 720 which now retransmits the "letters" signal combinations through the contention circuit, which in turn retransmits them into the outgoing circuit.

The circuit now remains in this condition during a time interval corresponding to about 42 revolutions of the transmitter 740, at the end of which time the condenser 554 will have acquired a charge at which the potential on the grid of tube 552 will be sufficiently positive to render the tube conducting for the operation of polar relay 551 to marking.

The opening of the spacing contact of relay 551 opens the locking circuit for relay 542 which releases. As a result, the distributor 750 will be stopped by the opening of relay contacts 542c. With no further "letters" combinations being transmitted by the originating distributor 750, the monitoring reperforator 730 also comes to a stop and the cradle 714 moves to the right and finally opens the contacts 719, while the last "letters" combination is being sensed. Contact 719 again releases relay 422, which in turn stops the monitoring transmitter 710.

It will thus be noted that the feed-out circuit shown in Fig. 5 is ineffective at the end of the message during the period in which the transmitter 710 catches up with the reperforator 730 and is rendered effective at the same time as the transmitter 710 is stopped, thereby initiating the feed-out interval. The original transmission is resumed during the feed-out interval and at the end of the interval the transmitter 710 again catches up with reperforator 730. When now the retransmission is completed the opening of contact 719 will not cause any further operation of the feed-out circuit and the entire system is restored to normal.

*i. Circuit contention.*—It will now be assumed that the outlying station A transmits a message to the switching center while the circuit for line #1 is in the course of sending an outgoing message.

Ordinarily this will not take place except under certain special circumstances. Thus, when an outlying station is receiving a message over a half-duplex line the operator will be aware of such fact and not initiate transmission over such line during reception; when the main office is receiving a message over a half-duplex line (or any line) a receive-flash lamp such as lamp 278 will indicate the fact; moreover, when the half-duplex line is busy sending no multiple address transmitter can seize the line. When the line is busy receiving no actual transmission can be initiated because relay 282 will always be operated and no transmission over the line can be intiated because the path through the start magnet 712 is opened. Consequently, simultaneous transmission and reception will take place (except under possible emergency conditions) when the intiation of transmission at the two termini takes place almost simultaneously. The contention circuit hereinafter referred to may cause an error in ordinarily not more than one character; such an error would be bad telegraph practice but, owing to the circumstances outlined above, these errors (if and when they occur) will ordinarily occur in the seven spacing characters sent at the head end of a message for which reason they are of no significance.

Now returning to the first assumed condition, due to the transmission of the outgoing message the four polar relays in the circuit contention equipment shown in Fig. 5 will be operating in close unison. This unison will be disturbed by the signals of the incoming message. Thus relays 520 and 521, which have been following the outgoing signals, now also will respond to the incoming signals arriving over the circuit 201, 202 and 501, 502. On the first unlike or unsynchronized pair of transmitted and received signals relay 521 will be in spacing while relay 511 is in marking and for a sufficient time to cause the operation of relay 516.

Relay 516, operated, locks itself over its contact *b* relay contact 531*b* and release key 283. Relay 516, operated, at its contacts *a* bridges the marking contacts of relay 510 thereby preventing these contacts from interfering with the incoming message through relays 520 and 521, and at relay contacts 516*c* one of the steady grounds is removed from conductor 504. Relay 516, operated, at its contacts *d*, opens the start circuit through relay 515 and start magnet 712 of the transmitter 710.

Thus the monitoring transmitter-distributor 710, 720 will be stopped.

The release of relay 515 starts the release period for slow release relay 517; when relay 517 completes its release, the last ground is removed from conductor 504, thereby clearing the local receiving circuit for the incoming message. This delay insures that the signal combination in the course of being transmitted by the monitoring distributor will not be impressed upon the local receiving circuit. It may be noted however that one or two characters of the outgoing message may be lost at this time with contacts 719 closed for holding relays 422, 423 and 424 operated.

During the continued operation of the originating transmitter 740 the outgoing message will be stored on the tape between reperforator 730 and transmitter 710 for subsequent retransmission. In the meantime, the incoming message will properly operate relays 520 and 521 which repeat the incoming message through relay 240 to the recorder 760.

During the transmission of the outgoing message relay 230 has intermittently closed a flashing circuit over its spacing contacts and contacts *e* of relay 282 in normal position for the send flash lamp 279. When the incoming message arrives the operations of break relay 530 will operate relay 282, which opens the flashing circuit for lamp 279 and closes the flashing circuit from relay 530 for receive flash lamp 278 which also lights message lamp 285.

Relay 282, operated, at its contacts *b* opens the already opened start circuit over conductors 794, 795 for monitoring transmitter 710, thereby insuring that this transmitter is not restarted until the message lamp circuit, shown in Fig. 2 has been restored to normal.

The operator at the service board observing the lights will wait until the light 278 goes out, indicating the completion of an incoming message, will remove the tape from recorder 760 for insertion in the proper transmitter and thereafter will momentarily operate the key 283. This will restore the lamp circuit and at the contacts *b* of the key 283 the locking circuit for relay 516 will be opened, thereby releasing this relay.

The release of relay 516 immediately opens the bridge across the marking contacts of relay 510, so that relays 520 and 521 will thereafter respond to the operations of relay 510 when the transmission of the outgoing message is resumed. Relay 516, released, at its contacts *d* reestablishes the start circuit for the transmitter 710, which at this time will be closed also at contacts *b* of released relay 282, and thereby reoperates relay 515. Thus relay 517 will be operated and the steady ground on conductor 504 will be reestablished to prevent recording of the outgoing message on the recorder 760.

Thus the transmitter-distributor 710, 720 will operate for the continued transmission of the stored message in the manner already described. If at this time the transmitter-distributor 740, 750 is still in the course of transmitting the message the operations will be completed in the manner already described. If, on the other hand, the transmitter-distributor 740, 750 has finished the message and opened the 6th pin contacts 748 while the transmitter-distributor 710, 720 is still waiting for the incoming message to be completed, relays 931, 942 and 943 will be released as described before and the numbering circuit shown in Figs. 17 and 18 will be restored to normal. The tape withholding magnet 743 will be operated from the numbering circuit and the transmitter-distributor 740, 750 will be in readiness for feed-out operation when the outgoing message has been completely sent by the transmitter-distributor 710, 720. Relay 541 is also released thereby releasing relay 542, the holding circuit of which is kept open at relay contacts 423*d*. The feed-out circuit is thus restored to normal condition, as shown in the drawing.

When monitoring transmitter 710 reaches the end of the outgoing message the contacts 719 will open and the feed-out function will take place as previously described.

The condition of contention just described usually occurs when an incoming message happens to arrive almost immediately after an outgoing message has been started. In such case the numbering circuit would still be functioning when the contention circuit acts. However, the number will be recorded on reperforator 730, though a few symbols may be lost or garbled at the distant station when the retransmission is resumed.

In the case of a break signal arriving from the outlying station A while line #1 is transmitting an outgoing message, this signal will pass through the contention circuit including the relays 520, 521. Relay 521 thus will remain in spacing position and the first time that relay 511 operates to marking relay 516 will operate. Immediately thereafter relays 515 and 517 will be released and the marking contact of relay 520 will be free to retransmit the break signal through relays 240 and 530. The transmitter-distributor 710, 720 will be stopped by relay 516 but the transmitter-distributor 740, 750 will continue its operation, as already described.

Under this condition the slow release relay 531 will have time to release.

Relay 531, released, at its right-hand contacts operates the message lamp circuit in Fig. 2 and the alarm circuits in Fig. 1 in the manner described for line #2. The start circuit for transmitter 710 is further being opened at relay contacts 531*a* and 282*b* and the transmitter stops with contacts 719 closed. At relay contact 531*b* the locking circuit for relay 516 is opened and this relay releases thereby completely restoring the circuit contention equipment to normal. At relay contact 531*f* the locking ground for the 6th pin contact 748 is removed, but since permanent ground is supplied to the 6th pin contacts at relay contacts 411*c* the originating transmitter-distributor 740, 750 will continue passing the message to the monitoring reperforator for storing. Then when the message has been completely stored the opening of 6th pin contacts 748 releases relays 941, 942, 931 and 541. With relay contacts 423*d* being held open, relay 542 also releases. Thus transmitter-distributor 740, 750 stops without feed-out operation at this time.

After the operator has taken cognizance of the break condition the tape in transmitter 740 should ordinarily be reinserted to the beginning of the message for complete retransmission of the message because some outgoing signals may have become disturbed by the incoming break signal. The tape with the stored message in transmitter 710 may be manually reset to a point near the near starting point of the repeated message to avoid unnecessary repetition over the outgoing circuit. The retransmission may thus be started by the operation of the no number start key 773 in the manner already described. The message lamp circuit in Fig. 2 will be restored by operation of key 283 and the break circuit shown in Fig. 5 will be restored by the operation of key 532.

*j. Transfer circuit.*—Assuming now that it becomes desirable to operate line #1 as a full-duplex line, then the locking key 410 will be operated with the direct result of operating the relays 411, 412 and 413. These three relays, when operated, serve to transform the line #1 circuit from half-duplex to full-duplex operation. It is, of course, understood that in such a case the four line conductors 201 to 204 will be properly connected to the channel leading to the outlying station A. Before the transfer it will, of course, be necessary for the operator at the message center to confer with station A, so that station A also may be changed from half-duplex to full-duplex operation in the manner already described.

Relays 412 and 413 in operated condition at their lower contacts complete the outgoing circuit from conductors 201, 202 to the transmitter-distributor 740, 750 and the numbering circuit and complete the incoming circuit from line conductors 203, 204 to receiving relay 240 and break relay 530, these circuits thereby being similar to the two transmission circuits of the full-duplex line #2. Thus the contention circuit is disconnected from the line circuits and signals repeated by the transmitter-distributor 710, 720 to the circuit contention equipment will not be retransmitted further. If desired, the distributor 720 may be prevented from operating under these conditions. However, the monitoring reperforator 730 and transmitter 710 will operate in response to outgoing messages and the tape will be passed through the two machines and will operate the contacts 719 in accordance with the presence or absence of slack in the tape in the manner previously described.

The sequence chain circuit extending from relays 941 and 942 and carried through the broadcast levels is terminated at contacts *a* and *b* of relay 412 for half-duplex operation, and thus is independent of the service position shown in Fig. 2. The reasons for this will be explained hereinafter. Now, with the line circuit converted for full-duplex operation, the sequence chain circuit is extended over relay contacts 412*a* and *b* and conductors 991*b* and 992*c* to include the service position in the preference chain, as in line #2. The ground permanently applied over relay contacts 413*b* to conductor 991*b* for use at the service position under half-duplex conditions, is removed shortly after the extension of the chain circuit, relay 713 being operated over relay contacts 411*e* rather than directly by the transfer key 410 to bring about this sequence.

Relay contacts 413*a* short-circuit relay contacts 282*e*, thereby making the lighting of send flash lamp 279 independent of the message lamp circuit, as in line #2.

Relay 411 in operated position conditions a number of control circuits for the full-duplex operation. Thus at contact *b* the start ground from relay 422 in operated condition is extended over conductors 794*a* and 794 to start magnet 712; this start circuit thus is independent of operations of relays 281, 282, 531, 516 and 421. Thus transmitter 710 will be started automatically and consistently every time contacts 719 operate relay 422 whenever tape is available for the transmitter 710. At relay contact 411c the steady locking ground is removed from conductor 494 and the 6th pin contacts 748, this locking ground now being taken from the relay contacts 531f as in the case of the full-duplex line #2. The chain circuits over conductors 591 and 592 from contacts c and d of relay 531 is now completed at the contacts f and g of relay 411; the functions of this chain circuit will be described hereinafter. At relay contacts 411h the locking circuit for relay 542 will be opened and will extend from relay contact 542b, conductors 595 and 595a, relay contacts 531c and 252e, conductor 595c, make contacts h and relay 411 and conductor 596 to the spacing contact of polar relay 551; this locking circuit thus will be independent of operations of relay 423 and of the starting and stopping of transmitter 710. Thus the feed-out circuit will function in the same manner as described for line #2.

Figure 12:
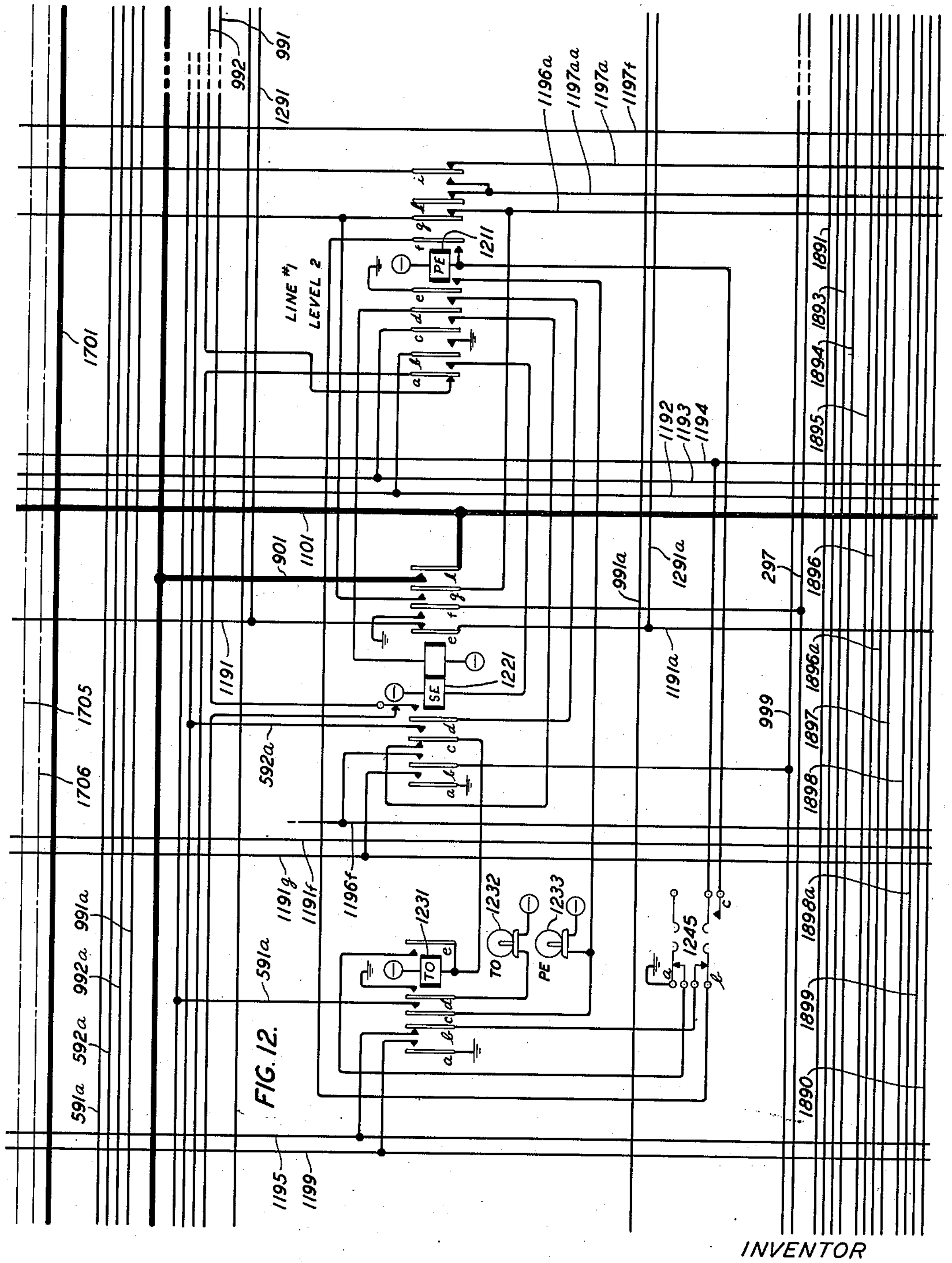

*k. Broadcasting.*—As already stated a plurality of multiple address or broadcast transmitter-distributors are provided, each of which has access to all the lines outgoing from the switching center. The transmitter for broadcast level 1 with its link circuit to lines #1 and 2 are shown in Figs. 14, 15 and 16 with an indication of further extension of the link circuits to other lines. A similar circuit for broadcast level 2 is shown in Figs. 11, 12 and 13. The cross-connection circuit for line #1 is shown extended through levels 1 and 2 in Figs. 15 and 12 with an indication of extension through other broadcast levels. A similar arrangement is shown for line #2 in Figs. 16 and 13.

Referring particularly to level 1 the broadcast transmitter-distributor 1410, 1420 is of the same general type as the transmitter-distributor 840, 850 and is equipped with 6th pin contacts 1418, transmitter contacts, distributor segments and start magnet 1422.

The transmitter-distributor of the broadcast level is not used for the sending of "repeat characters," channel identification and message numbering, nor "feed-out," as will be explained hereinafter, for which reason the universal contacts and the tape withholding magnet may be omitted or at least left unconnected. For this same reason the transmitter contacts I—V are connected directly to the distributor segments and are not in any way associated with the channel numbering circuit in Figs. 17 and 18.

Level 1 is also provided with a number start key 1471, a no number start key 1473 and a stop key 1474 and, if desired, a repeat number start key may also be provided similar to the one shown in the circuit for the outlying station.

Level 1 is also provided with a timing circuit 1450 for delaying the starting of a broadcast for a predetermined interval to permit the inclusion in the broadcast of addressed stations busy at the time of insertion of the tape but become idle within the waiting period, as will be described hereinafter.

Level 2 is equipped the same as level 1.

Assuming now that a message has been received at the switching center which is addressed to a plurality of stations, including line #2 but not line #1, the tape will be inserted in one of the broadcast transmitters which is idle at the moment, for example, transmitter 1110.

It will further be assumed that all the broadcast transmitters are idle and that, at the time the tape is inserted in transmitter 1110, lines #1 and 2 and the remaining addressed stations are idle. It will finally be assumed that the message is to be preceded by channel numbering.

The operator, having observed the various addresses on the tape and having decided to use broadcast level 2, operates the selecting key 1345, and other similar keys for the other addressed stations, to the right. Thus a circuit will be closed from ground at relay contact 1171a over link conductor 1194 and over the various operated selecting keys in multiple through the windings of the corresponding relays 1211, 1311 and others. These relays operate to preempt idle lines and conditionally associate the broadcast transmitter with busy lines.

Relay 1211 operated, locks itself over the selecting key contact 1245b, relay contact 1231b, link circuit 1195, relay contacts 1173b and 1172a. Relay 1311 similarly locks itself over the link circuit 1195 and other similar relays are similarly locked.

*l. Broadcasting full-duplex.*—Considering now particularly the idle full-duplex line #2, the operation of relay 1311 establishes a number of circuit conditions. Thus the sequence chain circuit may be traced from ground over relay contact 1042g, conductor 1091, relay contacts 1321d and 1621d, conductor 1091a, relay contacts 352d and 351c, conductor 1092b, relay contacts 1031a, conductor 1092a, relay contacts 1611a and the make contacts a of relay 1311 through the left-hand operating winding of selecting relay 1321. It will be noted that one side of the preference chain circuit over conductor 1092 is interrupted at the break contact a of relay 1311, so that in this case the operating winding of relay 1042 is disconnected from the chain circuit and the relay will not be able to operate. Similarly other selecting relays in other levels to the right of level 2 will be unable to operate.

Relay 1321 operates and establishes a locking circuit for itself through its right-hand winding over relay contact 1311, the make contact d of relay 1321 over the chain circuit 1091 to ground at relay contact 1042g. Thus the operation of relay 1321 at its break contacts d opens the other side of the sequence chain circuit over conductor 1091, thereby preventing relay 352 in the service position from operating and also selecting relays in other levels to the left of level 2, in this case relay 1621.

From this description of the sequence chain circuit it will be immediately obvious that whenever a line circuit is busy the chain circuit will be open at some point, thereby positively preventing further access to the line circuit. Thus in the case of line #2 the seizure of the circuit by the operation of selecting relay 1321 opens the chain circuit at relay contacts 1311a and 1321d, thereby preventing operation of any selecting relays in other broadcast levels of relay 1042 and of relay 352 at the service position. Similarly the seizure of the line by the operation of relay 1042 opens the chain circuit at relay contacts 1041b and 1042 g.

Thus when an idle line is selected for a broadcast both the preempt relay and the selecting relay such as 1311 and 1321, will be operated, whereas when a line is busy only the preempt relay will be operated. The idle and busy condition of a preempted line may be observed on lamps 1332 and 1333, as will be explained hereinafter.

Relay contact 1311b extends locking ground to the link circuit 1192 and over the sixth pin contacts 1118, contacts a of stop key 1174 to the start keys 1171 and 1173. Therefore when now the number start key 1171 is temporarily operated, this locking ground will be extended through the winding of relay 1161, which will operate and lock itself to the ground on the sixth pin contacts. In case the "no number" start key 1173 were operated, the locking ground from the sixth pin contacts would be extended over relay contact 1161g to first operate relay 1176; this relay would lock itself over the sixth pin contacts. Upon operation of relay 1176 the locking ground would be extended over key contact 1173b and contacts *a* of relay 1176 to operate relay 1161. Thus relay 1161 is operated by either start key but with relay 1176 in normal for numbering, ground would be applied over its contacts *c*, relay contacts 1161c to the link conductor 1196, whereas, with relay 1176 operate for no numbering, minus potential will be applied to the same link circuit 1196, for purposes which will presently be explained.

Relay contact 1311e extends ground for lighting preempt lamp 1333. This lamp serves to indicate that the line has been selected, even after the non-locking key 1345 is returned to normal. The lamp by itself does not indicate whether or not the line was busy before being selected.

When relay 1161 operated, minus was disconnected at its contacts *f* from the grid circuit of tube 1152, without any effect at that time. At relay contacts 1161a ground was removed from conductor 1194 thereby preventing operation of additional preempt relays, such as 1211, after the start key has been operated. At relay contacts 1161e steady ground was removed from the operating winding of the repeating relay 1130 which thus will be free to follow the signals from distributor 1120. At relay contacts 1161e ground was also applied to relay 1162, which operated and in turn operated relay 1163 thereby shifting the holding ground for conductor 1195 to relay contacts 1162a from 1163b, for purposes to be explained hereinafter.

Relay 1141 is normally operated over a circuit which may be traced from its winding, conductor 1197f and over two parallel link circuits connected through relay contacts in all the line circuits corresponding to contacts *h* and *i* of relays 1311 and 1211; the first one of these link circuits passing over conductor 1197b, relay contacts 1311i and 1211i to ground at 1197, and the second link circuit extending over conductor 1197bb, contacts *h* of relays 1311 and 1211, this link circuit ending at the latter contacts.

If, for example, relay 1211 should be operated, the ground at contact *i* would be removed from the first link circuit and switched to the second link circuit and relay 1141 may be temporarily released during this switching but will be reoperated, thereby still maintaining negative potential on the grid of tube 1132. If then relay 1311 should also be operated, the ground on the second link circuit would be disconnected at the *h* contact of relay 1311, and relay 1141 would release, thereby starting the timing circuit 1153, 1154 for the tube 1152. From this description it will be apparent that when only one preempting relay, such as 1211, is operated, relay 1141 will not start the timing circuit; but as soon as two or more relays, such as relay 1211 are operated, relay 1141 will release and the timing-out period will cast. Any interval may be provided for this purpose, for example, two minutes, by the proper choice of resistance 1153 and condenser 1154 in the timing circuit controlling the tube 1152.

During the timing-out period, that is after the release of relay 1141 but before the operation to marking of polar relay 1151, any busy line, say line #1, may become idle and complete its preference chain circuit for operation of relay 1221.

The circuit that is waiting for the proper conditions is one including the minus or ground potentials on link conductor 1196. It will be noted that the link conductor 1196 passes through all the line circuits, having two paths in each. Thus it leads over relay contacts 1211g and 1221g in line #1 then over conductor 1196a and relay contacts 1311g and 1321g in line #2 and so on through other line circuits to conductor 1196f which further connects to relay contacts in all the line circuits, such as 1321b and 1221b which, when closed, extend the ground or minus potential into the individual circuits, for example over conductor 1099 and through the two operating windings in series of polarized relay 1021 to intermediate potential on the potentiometer 1025. Other similar circuits may be traced from conductor 1196f to other polarized relays in other selected line circuits, corresponding to relay 1021, provided they be idle.

This circuit will be incomplete while one or more selected lines are busy. To take line #1 as an example, when not selected relay contact 1211g will provide a path; when selected and busy relay contacts 1211g and 1221g keep both paths open; when selected and idle relay contact 1221 provides a path.

Thus when a line, such as line #1, becomes idle the selecting relay 1221 operates and closes a path for the link circuit, traced above. But if line #1 does not become idle within the timing-out period it will be necessary to release its preempt relay 1211 and similarly for any other line remaining busy, so that the link circuit may be completed and operations started without it. This is what is accomplished by the timing-out circuit 1152 at the end of the timing-out period.

An exception may be noted here, relating to the case of only one line being selected, which might happen in a rebroadcast of a message to an only station that was busy for the previous broadcast. As explained above, the double chain circuit 1197 will not permit relay 1141 to release and introduce the timing-out period when only one line has been selected because there would be no waste of line time on other lines if the selected line remained busy. In this case further operations will await the moment when the selecting relay of the line operates and completes the link circuit through all the line circuits.

But returning to the function of the timing-out circuit, at the end of the time interval the tube 1152 becomes conducting for the operation of polar relay 1151 to marking. Ground will then be applied over the marking contact to the link conductor 1193 and then over individual circuits including contacts *c* of all operated relays similar to relay 1211 and contacts *c* of all corresponding unoperated relays similar to relay 1221 and through the winding of relay plied to relay 1185, which operates to light lamp 1186 individual to level 2 and to start the common buzzer 1180, thereby indicating to the attendant that one or more lines selected for a broadcast remain busy and will not be included in the broadcast. At relay contacts 1231b the holding circuit from conductor 1195 to the preempt relay 1211 is opened for the release of this relay, as required by the circuit. At relay contacts 1231c the lamp 1233, which is extinguished by the release of relay 1211, is connected to conductor 591a for indication of a break signal, as will be explained hereinafter. At relay contacts 1231d the lamp 1232 is lighted to indicate to the attendant, that line #1 is being excluded from the broadcast.

Upon making note of the line, the attendant may extinguish lamp 1232 by operating key 1245 to the left. However, the line can not be preempted at this time for rebroadcast, because relay 1211 cannot be reoperated until the end of the broadcast when relay 1161 releases. On the other hand the attendant may let relay 1231 stay operated and let lamp 1232 stay lighted until it is time for selection for a rebroadcast, at which time the key 1245 is first thrown to the left, to put lamp 1232 out, and then to the right for selection of line #1. Similar operations will take place for other lines excluded from the broadcast.

Thus at the end of the timing-out interval the circuit will be completed for operation of polarized relay 1021 and all other similar relays in line circuits that were selected and idle.

Relays 921 and 1021 and other similar relays are of the type which have been disclosed in United States Patent No. 2,309,945 issued to J. S. Garvin on July 11, 1940. Each of these relays have two armatures for operation of two sets of contacts and the magnetic circuit for the armatures is polarized, so that when current passes from ground through the two windings to the intermediate potential the right-hand armature will be attracted and close its contacts whereas, when negative potential is applied through the two windings to the intermediate potential, the left-hand armature will be attracted and operate its contacts. Thus for numbering, the right-hand contacts will be closed for operating numbering relay 1821 in the numbering circuit and in the case of no numbering the left-hand contacts will be closed for operation of the no-numbering relay 1823 in the numbering circuit, as will be explained hereinafter. Thus the numbering circuit will be controlled in accordance with the operation of the relays 1161 and 1176 by the operation of one or the other of the start keys. Either set of contacts on relay 1021 will apply ground through the winding of relay 1022 over relay contacts 1023f and 1043a to negative battery. Relay 1022 operates in this circuit and locks itself directly to negative battery over its contacts e, independently of relays 1023 and 1043.

When relay 1321 operated, ground was supplied over its contact f to conductor 397 for lighting the broadcast busy lamp 386. Relay contacts 1321h extended the transmission circuit from the broadcast transmitter to the outgoing line circuit, as will be explained hereinafter.

When relay 1161 operated, it prepared a link circuit for start relay 1168 which may be traced as follows: through the winding of relay 1168, link conductor 1191, over normally closed relay contacts 1221e to conductor 1191a, since line #1 is not selected, then over conductor 1391, relay contacts 1022c and 1023c, the latter of which is open at this time, conductor 1391a and link conductor 1191b and then over other similar relay contacts for other selected and non-selected line circuits, conductor 1191f, contacts 1161b, conductor 1191g to ground at relay contacts 1321a and other similar contacts for such lines, as have been selected. However, until now this operating circuit for the start relay 1168 has remained open at relay contacts 1023c and other similar contacts for other selected idle lines. Relay 1168 cannot be operated to start distributor 1120 until all the numbering circuits have completed their function, as will be explained hereinafter.

Now continuing the description of the operations in the line #2 equipment, with the right-hand armature of relay 1021 attracted and relay 1022 operated, a circuit is completed extending from ground over the universal contacts 857, conductor 1898, relay contact 1871a, conductor 1898a, relay contacts 1022j and 1021d, conductor 1891 and contacts e and winding of the number relay 1821 to minus. Relay 1821 operates and locks to conductor 1894, which now is receiving ground at relay contacts 1022f.

With relay 1022 operated ground is extended over its contacts g and conductor 698 to operate feed-out relays 641 and 642. At relay contacts 1022h, battery is extended over conductor 897 to keep tape feed magnet 843 energized. At relay contacts 1022i, relay 1031 is operated to open the chain circuit 1091, 1092. At relay contacts 1022k, the operating circuit for relay 1815 over conductors 1899 and 694 is opened to prevent this relay from operating if a tape should be inserted in transmitter 840 and close the sixth pin contacts after the numbering has been sent.

Now with relay 642 operated the start circuit for distributor 850 is closed, and the distributor starts, thereby sending control pulses to the numbering circuit, which will run through its functions. It will be noted that the transmission circuit for the outgoing identification and numbering signals, as previously traced, has not been effected by the operations in the broadcast level.

These signals are being transmitted from the numbering circuit through the distributor 850, which is operating by virtue of a tape being inserted, not in its associated transmitter 840, but in a broadcast transmitter, namely 1110, and upon a start key being operated for the broadcast transmitter-distributor and not for the transmitter-distributor in the line circuit. In fact the broadcast transmitter-distributor 1110, 1120 cannot be started by operation of either of its start keys, it must await completion of the numbering function. As to the transmitter-distributor 840, 850, once the line circuit was preempted by operation of key 1345, a tape may be inserted therein and a start key operated without being able to start the distributor 850.

The numbering circuits in other line circuits, which ultimately were seized for the broadcast, will be started at the same time as that in line #2 and will all complete their functions at about the same time.

At the completion of the number transmission, relay 1832 operates, as previously described, thereby at its contact a opening the operating circuit for slow release relay 1833, which starts its release period. Relay 1815, as already stated, is not operated by the closure of relay contacts Thus while line #2 is busy by seizure at one point, one or more other points of seizure of line #2 may be conditioned for seizure. When the line becomes idle, the point of any two waiting points that will next seize the line will depend upon the relative location along the chain circuit of the two corresponding relays, such as 352, 1042, 1321, 1621, etc., that are waiting to be operated. Any desired preference may thus be established by the proper relative location of the seizing relays along the chain circuit.

*m. Break during broadcasting full-duplex.*—When a break signal arrives over the incoming conductors of a full-duplex circuit, such as line #2, while a broadcast message is being transmitted over the outgoing conductors, the break relay 630 will cause relay 631 to release. By the release of relay 631 ground will be applied over contacts *d* and *e* to conductors 692 and 691 which extend through the various broadcast levels.

With a message being broadcast over level 2 the ground from conductor 692 will extend over the make contacts *c* of relay 1321 to the winding of relay 1331, which operates and locks and lights the lamp 1332. Ground then is also extended from conductor 691 over contacts *c* of relay 1331 to light the lamp 1333. Thus the lighting of both lamps 1332 and 1333 will serve to indicate to the attendant that a break signal has arrived over line #2.

The release of relay 631 will, of course, also operate the lamp and alarm circuits connected to its right-hand contacts, as already described, to indicate the break condition at the service board. The feedout circuit remains conditioned for feedout.

The operation of relay 1331 opens the locking circuit for relay 1311 which in turn releases relay 1321 by the opening of its contacts *d*. Relay 1321, released, at its contacts *h* removes the transmission circuit for line #2 from the broadcast circuit. At relay contacts 1321*b* the operating circuit from link conductor 1196*f* for relay 1021 is opened. Thus relays 1021, 1022 and 1023 will release and the numbering circuit as well as the feedout circuit will be restored to normal in the same manner as at the end of a message as already described.

The broadcast transmission is not affected in respect to other line circuits by an incoming break signal over line #2. The attendant upon taking cognizance of the break signal may extinguish the lamps 1332 and 1333 by operating the key 1345 to the left.

Upon reoperation of relay 631 by the attendant the entire line circuit will have been restored to normal and if necessary line #2 may be included in a repeated broadcast to lines that were excluded from the first broadcast because they were busy or, if it should be important that the message be retransmitted over line #2 without having a new number assigned thereto, the message may be retransmitted by the transmitter distributor 840, 850 and by operation of the no-number start key 873.

*n. Broadcasting half-duplex.*—It will now be assumed that the idle half-duplex line #1 is to be included in a broadcast over level 2 under conditions similar to those assumed for broadcasting full-duplex, already described.

Thus the selecting key 1245 will be operated to operate relays 1211 and 1221. All the initial operations will be the same as described for the full-duplex line #2 and the distributor 750 will be started in the same manner for transmission of repeat character, channel identification and numbering symbols.

At this time tape will become available between monitoring reperforator 730 and transmitter 710, so that contacts 719 will close and start the transmitter-distributor 710, 720.

The operation of the contention circuit during outgoing transmission will be the same as described under half-duplex transmission. In the case of an incoming message arriving during the outgoing transmission or in the case of an incoming break signal, the contention circuit will operate as already described and if at this time the transmitter-distributor 740, 750 is transmitting numbering, for example, the transmission into the monitoring reperforator 730 will continue but the transmitter 710 will be stopped as already described; also, if at such time the broadcast transmitter-distributor 1110, 1120 is in the course of transmitting a message, that transmission will continue and the remaining part of the message will be stored in the tape before the transmitter 710. Upon the operation of key 263 for restoring the message lamp circuit or of key 532 for restoring the relay 531, transmission of the remaining portion of the message will be resumed by transmitter 710. At the end of the message and when no more tape is available for transmitter 710 the feedout circuit in Fig. 5 will control the distributor 750 for transmission of "letters" for tape feedout and the entire circuit will be restored as already described.

*o. Service board.*—The service board is shown in Fig. 1 with its link circuits extending to line #1 in Fig. 2 and to line #2 in Fig. 3 and with extensions to other similar lines being indicated.

The board includes two combined receiving and transmitting machines. The machine 110, 120 includes a typing reperforator 110 having a receiving or selecting magnet 111 and being adapted for perforating the tape as well as printing on the tape in response to the operations of the selecting magnet 111. The machine also includes a set of keyboard sending contacts 120 controlled by a keyboard-operated cam distributor. The machine 130, 140 includes a receiving or selecting magnet 131. This machine is a tele-typewriter adapted for typing a record in page form in response to the operations of magnet 131. It has keyboard sending contacts 140 controlled by a keyboard-operated cam distributor. The keyboard may be adjusted in well-known manner to operate either the transmitter contacts 140 or to print on the record page or to perform both functions simultaneously.

The board includes two switching relays 161 and 162 controlled by a switching key 163. These elements are shown in normal position. Either machine may have its selecting magnet normally associated with the incoming lines from the outlying stations and the other machine may have its sending contacts normally associated with the outgoing lines to the outlying stations, as determined by the position of the switching key 163.

The service board includes a service position for each line, each position including monitoring keys for the incoming and outgoing circuits respectively, and busy lamps. Each line position also includes repeating relays in the incoming and outgoing line circuits respectively.

With the circuit in the normal condition, as shown in the drawing, a circuit may be traced through the selecting magnet 111, relay contacts 161*a*, 166*b*, 161*f*, keyboard contacts 120, relay contacts 161*g*, conductor 101*a*, relay contacts continue to transmit into the monitoring reperforator 730.

When the receive key 320 in the service position for the full-duplex line #2 is operated to its lower monitoring position, a circuit is closed from ground at the spacing contact of receive relay 340 over key contacts **320*f*, over conductor 103 and other key contacts in series through the upper winding of repeating relay 170, which consequently will follow the operations of relay 340 on an inverted neutral basis. At key contacts 320*d* the conductors 104, 104*a* are connected together so that the signals repeated by relay 170 will pass from ground at the spacing contact, over conductors 104 and 104*a*, relay contacts 161*b* to the selecting magnet 131 of the page printer 130. It will be noted that the main function of the key contacts 320*d* is to short-circuit the keyboard 140 at relay contacts 161*c* and 161*d***.

Thus with the key 320 in its lower position for monitoring on the incoming line 303, 304 the signals will be recorded on the page printer 130 and the keyboard 140 will be cut out.

When the key 320 is thrown to its upper position the same functions take place as in the lower position and in addition thereto a circuit is extended from ground over key contacts **220*b* and 220*e* and key contacts 320*b* for the operation of relay 361. Relay 361** at its contact *a* opens the repeating circuit from receive relay 340 to the receiving recorder 860. At contact *c* ground is applied to conductor 195 for lighting the receive seized lamp 172. At contact *b* ground is extended over conductor 393 to operate relay 381 in the message lamp circuit. Thus, if at the time of the seizure of the incoming line 303, 304 a message had been incoming, relay 382 would be in operated condition and lamp 385 would be lighted. Now on seizure of the incoming line and operation of relay 381, relay 382 is released and the message lamp extinguished.

Relay 382 maintains the flash circuit for lamp 371 which will flash whenever signals arrive over the line circuit. Such signals will be recorded on the page printer 130, but will not be recorded on the receiving recorder 860.

The corresponding operations of the receive key 220 in the receiving side of the service position for the half-duplex line #1 will establish conditions the same as in the case of the full-duplex line.

What is claimed is:

1. A telegraph system comprising a plurality of outgoing paths for transmission of messages, individual transmitters of the storage controlled type respectively associated with said paths, means operable incident to insertion of a message storing medium in each of said transmitters and operation of a start element for functionally associating said transmitter with said path and initiating transmission thereover, a multiple address transmitter, means operable incident to insertion of a stored message medium into said multiple address transmitter to condition said multiple address transmitter for association with any or all of said paths, elements operable independently of the busy or idle conditions of said paths to preempt said paths immediately for the use of said multiple address transmitter, and means thereafter automatically operable for each of said paths, when busy, upon becoming idle, to functionally associate said multiple address transmitter with such paths, in combination with means operable upon all of said paths having become idle to initiate transmission over all of said paths under control of said multiple address transmitter and in further combination with timing means operable after lapse of a predetermined interval of time to release paths not yet idle from subsequent preemption by said multiple address transmitter upon them becoming idle.

2. In combination, an automatic storage controlled telegraph transmitter, a plurality of outgoing channels of transmission, selectively operable means for conditionally associating said incident to the operation of a plurality of said channels, timing means initiated into operation incident to the operation of a plurality of said selecting means to measure a period of time, means automatically operable at the end of said period to release from such conditional association such of said channels as are not yet free, and means automatically operable thereupon to initiate transmission over all such channels not so released.

3. The combination of an automatic storage type transmitter, means for selectively preliminarily associating said transmitter with a plurality of outgoing channels of transmission regardless of their busy or idle condition, means for causing said transmitter to transmit over any or all of said channels if and when they become free within a predetermined period of time, and means automatically operable for causing said transmitter to initiate transmission over certain of said channels if and when they are or become free within said period of time and to disassociate said transmitter from the remainder thereof.

4. An automatic storage type transmitter, means for selectively preliminarily associating said transmitter with a plurality of outgoing channels of transmission regardless of their busy or idle condition, means for causing said transmitter to transmit over all of said channels if and when they become free within a predetermined period of time, and means automatically operable for causing said transmitter to initiate transmission over certain of said channels if and when they are or become free within said period of time and to disassociate said transmitter from the remainder thereof in combination with an indicator for each said channel with means for causing the indicator to give an indication for each disassociated channel.

5. A telegraph transmitter, a plurality of outgoing channels, means other than said transmitter for at times rendering said channels busy, means for selectively associating said transmitter with one or any plurality of said channels independently of their busy or idle condition, timing means, means for inhibiting the operation of said timing means when said transmitter is associated with only one of said channels, means for causing said timing means to operate when said transmitter is associated with two or more of said channels, and means operable upon the measuring of a predetermined period of time by said timing means to disassociate said transmitter from any channel or channels not then idle.

6. In a telegraph transmission and reception system, a half-duplex channel of transmission for transmission and reception, an automatic transmitter associated with said line for transmission thereover, said transmission being relayed through a repeating circuit, relay means in the input side of said repeating circuit and relay means in the output side of said repeating circuit operable in synchronism during normal undisturbed transmission, a circuit closed momenfor transmission from said multiple transmitter when so associated said plurality of channels, and means operated under control of said means for marking for transmission any such channel for preventing initiation of transmission by said transmitters individual to said plurality of channels until initiation of and cessation of transmission by said multiple transmitter which is associated with said plurality of channels, in combination with time measuring means set into operation when said multiple transmitter is provisionally associated with a plurality of channels, and means operable at the end of a measured time to unmark any associated busy line not yet idle and render it available for transmission by its individual transmitter.

16. In combination, an automatic storage controlled telegraph transmitter, a plurality of outgoing channels of transmission, selectively operable means for conditionally associating said transmitter with a selected plurality of said channels, timing means initiated into operation incident to the operation of a plurality of said selecting means to measure a period of time, means automatically operable at the end of said period to release from such conditional association such of said channels as are not yet free, service code storing means, means operable upon said release to transmit service code signal combinations stored by said service code storing means over all channels not released, and means automatically operable thereupon to initiate transmission over all such channels not so released from said transmitter.

17. In combination, an automatic storage type telegraph transmitter, a plurality of channels of telegraph transmission, means capable of being operated selectively to associate said transmitter with said channels of transmission, means individual to each said channel for setting up service code combinations, means operable incident to and under control of the association of said storage type transmitter to call into play and send over each said channel a series of service code combinations under control of its own service code setting up combination, and means operable incident to the end of transmission of said service code combinations over each said channel to transmit the same message over each selected channel under control of said storage type telegraph transmitter.

18. In a telegraph system, outgoing lines, each said line being provided with means operable in cycles for transmitting thereover in each cycle service signals including signals with each message identifying such message, a distributor over which such messages are sent, a transmitter individual to each line, means operable upon said transmitter being supplied with stored message material to first connect said means operable in cycles to said distributor for distribution to said line of a cycle of service signals, means operable incident to termination of a cycle for connecting said transmitter to said distributor for distribution to said line of signals representing said stored message material, a multiple address transmitter, means operable when said multiple address transmitter is supplied with stored message material to seize and associate with said multiple address transmitter a plurality of said lines and their individual distributors as well as their individual means operable in cycles, and means operable incident to termination of the cycles of transmission of all of said means operable in cycles for initiating transmission from said multiple address transmitter over all of said seized lines.

19. In combination, a plurality of outgoing lines available for outgoing message transmission, a plurality of transmitters, means for associating one of said transmitters transmissively with a group of said lines selectively chosen from the whole number for simultaneous transmission of one and the same message thereover, means for associating another of said transmitters transmissively with another group of said lines chosen selectively from the whole thereof, said last-named means including means for excluding those chosen to form the first group, for simultaneous transmission of one and the same message thereover, and interconnecting circuits for causing both of said transmissions to occur in whole or part simultaneously without interference of either with the other.

20. In combination, a plurality of outgoing lines available for outgoing message transmission, a plurality of message transmitters each capable of operating under control of stored message information, means for associating one of said transmitters selectively with a group of said lines chosen selectively from a number thereof for transmitting the same message thereover simultaneously, a service transmitter individual to each said line, start means operable to precede transmission of said stored message information with service information from each said service transmitter appropriate to its individual one of said chosen lines, a circuit for withholding message transmission by said associated message transmitter until conditioned by each service transmitter associated with a chosen line, a conditioner for said circuit individual to and operated incident to each termination of operation of each service transmitter, and circuit connections for maintaining said conditioners operated until after message transmission is under way, whereby differences in time for completion of their operations are permitted to said service transmitters.

21. In combination, a channel of telegraphic transmission, a machine transmitter normally in non-preemptive relation to said channel, means capable of operation to associate said transmitter with said channel in preemptive relation to preempt the same for a following transmission thereover by said transmitter, means for preventing immediate initiation of such transmission, time measuring means for measuring a period of time immediately following said preemption after which said preventing is no longer accomplished, and means operable thereupon to initiate transmission over said channel by said transmitter.

GEORGE A. LOCKE.

REFERENCES CITED

The following references are of record in the file of this patent:

UNITED STATES PATENTS

| Number | Name | Date |
|---|---|---|
| 1,275,559 | Houghtaling | Aug. 13, 1913 |
| 1,958,930 | Singer | May 15, 1934 |
| 1,996,516 | Kiukead | Apr. 2, 1935 |
| 2,088,699 | Hailes | Aug. 3, 1937 |
| 2,193,809 | Dirkes et al. | Mar. 19, 1940 |
| 2,193,811 | Blanchard | Mar. 19, 1940 |
| 2,252,852 | Hoover | Aug. 19, 1941 |
| 2,259,573 | Lewis | Oct. 21, 1941 |
| 2,296,845 | Goetz | Sept. 29, 1942 |
| 2,332,191 | Baughman et al. | Oct. 19, 1943 |
| 2,346,173 | Light | Apr. 11, 1944 |
| 2,464,371 | Blyholder | Mar. 14, 1949 |
| 2,471,712 | Bacon et al. | May 31, 1949 |